United States Patent
Kauffman et al.

(10) Patent No.: US 10,949,270 B2
(45) Date of Patent: Mar. 16, 2021

(54) SYSTEM, APPARATUS, AND METHOD OF SCHEDULING EVENTS AND SENDING NOTIFICATIONS TO ENTITIES

(71) Applicant: Starbright Solutions, LLC, Orange, CA (US)

(72) Inventors: Terry Kauffman, Orange, CA (US); Janelle Kauffman, Orange, CA (US)

(73) Assignee: STARBRIGHT SOLUTIONS, LLC, Orange, CA (US)

( * ) Notice: Subject to any disclaimer, the term of this patent is extended or adjusted under 35 U.S.C. 154(b) by 0 days.

(21) Appl. No.: 16/849,800

(22) Filed: Apr. 15, 2020

(65) Prior Publication Data
US 2020/0326997 A1 Oct. 15, 2020

Related U.S. Application Data

(60) Provisional application No. 62/834,381, filed on Apr. 15, 2019.

(51) Int. Cl.
*G06F 9/54* (2006.01)
*G06Q 10/10* (2012.01)
*H04L 1/18* (2006.01)
*H04W 4/14* (2009.01)

(52) U.S. Cl.
CPC ......... *G06F 9/542* (2013.01); *G06Q 10/1095* (2013.01); *H04L 1/188* (2013.01); *H04L 1/1887* (2013.01); *H04W 4/14* (2013.01)

(58) Field of Classification Search
CPC ....... G06F 9/542; H04L 1/188; H04L 1/1887; G06Q 10/1095; G06Q 10/1097; H04W 4/14
See application file for complete search history.

(56) References Cited

U.S. PATENT DOCUMENTS

| 7,286,817 B2 * | 10/2007 | Provost ................... H04W 4/12 455/412.1 |
| 2010/0082391 A1 * | 4/2010 | Soerensen .......... G06Q 10/1095 705/7.19 |
| 2018/0011984 A1 * | 1/2018 | Rosen ................. G06F 19/3418 |
| 2020/0272114 A1 * | 8/2020 | Grabowski ............ G05B 15/02 |

* cited by examiner

*Primary Examiner* — Brian W Wathen
(74) *Attorney, Agent, or Firm* — Loza & Loza, LLP; Heidi L. Eisenhut

(57) ABSTRACT

Aspects of the disclosure relate to apparatus and methods of event scheduling and notification. According to one aspect, a method, operational at a server, may include determining that a prescheduled event is concluded, sending a first notification message to one or more user communication addresses associated with the prescheduled event, determining if a first acknowledgement to the first notification message is received before a first predetermined period of time elapses, and sending a second notification message to the one or more user communication addresses if the first acknowledgement is not received by expiration of the first predetermined period of time. The method may further include determining if a second acknowledgment to the second notification message is received before a second predetermined period of time elapses and sending a third notification message to the communication addresses and a first alternate contact notification message to an alternate contact communication address.

20 Claims, 45 Drawing Sheets

Cancel, Edit, or Extend Events

SYSTEM, APPARATUS, AND METHOD OF SCHEDULING EVENTS AND SENDING NOTIFICATIONS TO ENTITIES

PRIORITY CLAIM

This application claims priority to and the benefit of provisional patent application No. 62/834,381, filed in the United States Patent and Trademark Office on Apr. 15, 2019, the entire content of which is incorporated herein by reference as if fully set forth below in its entirety and for all applicable purposes.

TECHNICAL FIELD

The technology discussed below relates generally to scheduling and automated message delivery systems, and more particularly, to systems and methods that enable a user to schedule one or more events and have one or more alert notifications automatically sent, via one or more delivery systems, to the user and at least one additional recipient, at an expected conclusion time of an event.

INTRODUCTION

Systems and methods exist today that allow users to schedule events and receive a reminder or notification of the event in advance of the event or at the start of the event. The event may be, for example, a date or date and time of an appointment recorded in a calendar, or an occurrence of a financial balance in a bank account falling below a predefined amount. However, there appear to be no systems or methods directed to confirming the safety of a user and/or the care, for example, of a loved one or pet of the user, once an event has concluded.

As more and more individuals take on the personal responsibility of providing care to a loved one or a pet, and/or as more and more individuals perform activities on their own, where the successful conclusion of the activity (e.g., returning safely from a hike or jog) may not be monitored by a spouse, partner, parent, or friend, systems and methods to verify the safety of a user after an event, or to verify that a caregiver will be present after a given event, are needed.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example a method of event scheduling and notification, operational at a server, is disclosed. The method includes determining that a prescheduled event is concluded, sending a first notification message to one or more user communication addresses associated with the prescheduled event, determining if a first acknowledgement to the first notification message is received before a first predetermined period of time elapses, and sending a second notification message to the one or more user communication addresses if the first acknowledgement is not received by expiration of the first predetermined period of time.

In another example, an event scheduling and notification apparatus, such as a server, is disclosed. The apparatus may include an input-output device, a memory, and a processor communicatively coupled to the input-output device and the memory. The processor and the memory may be configured to determine that a prescheduled event is concluded, send a first notification message to one or more user communication addresses associated with the prescheduled event, determine if a first acknowledgement to the first notification message is received before a first predetermined period of time elapses, and send a second notification message to the one or more user communication addresses if the first acknowledgement is not received by expiration of the first predetermined period of time.

These and other aspects of the invention will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

Various features, nature, and advantages may become apparent from the detailed description set forth below when taken in conjunction with the drawings in which like reference characters identify correspondingly throughout.

DETAILED DESCRIPTION

I. Operational Overview

Figure 1:
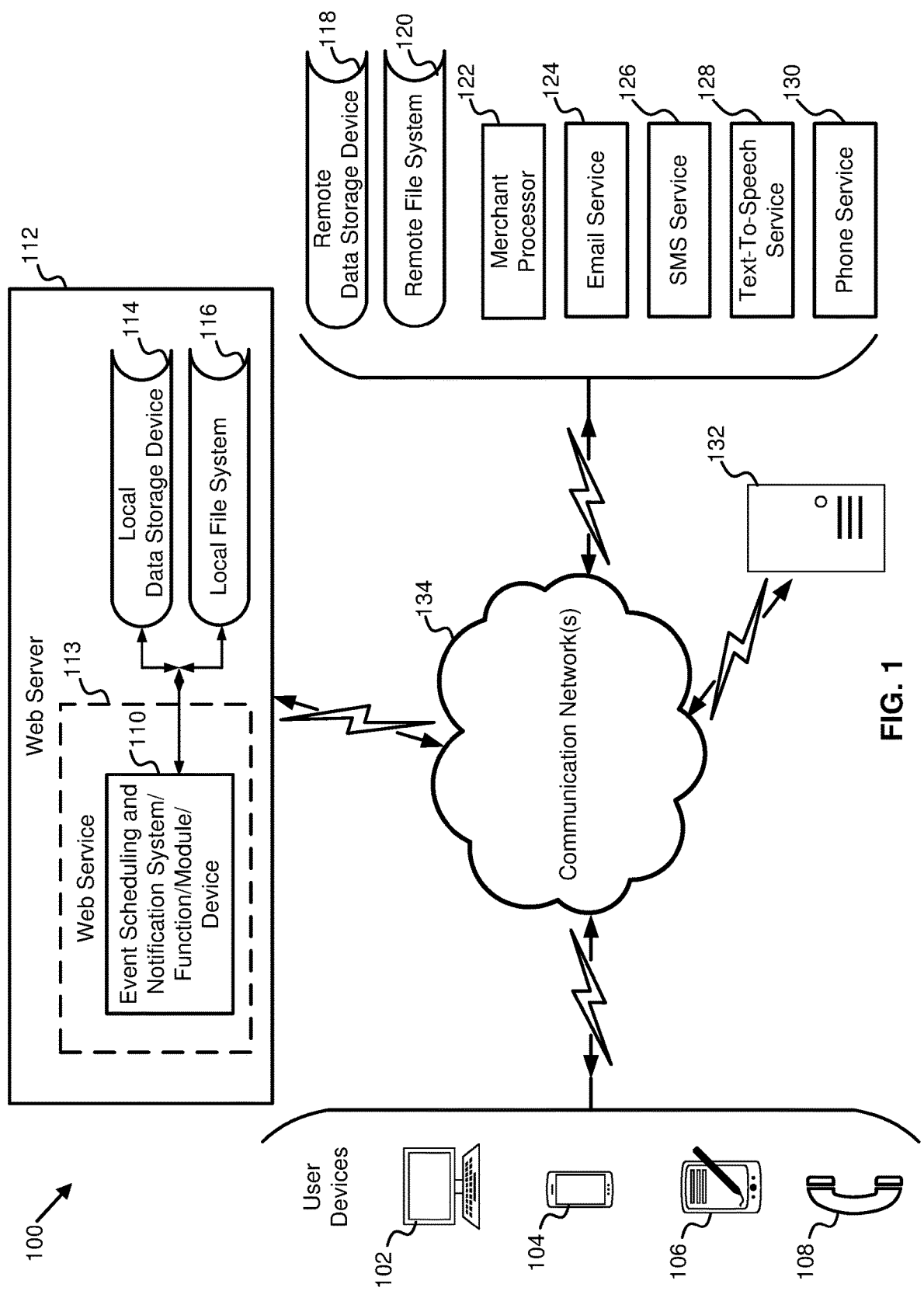
FIG. 1 is a conceptual diagram illustrating an operational environment within which embodiments of present disclosure may be found.

Exemplary systems, apparatus, and methods of scheduling events and sending notifications to entities are described herein. The systems, apparatus, and methods may be configured to send notifications via one or more communication methods to one or more entities after completion of a prescheduled event. The one or more entities may be the user and the user's emergency contacts (also referred to herein as an alternate contact). The prescheduled event may be one-time, daily, weekly, monthly, or another periodic event. As used herein, the word "create" is understood to mean "create" or "create and store." The term "incomplete" refers to a message that has not been received, answered or picked up by a person or a device.

According to one example, the name of the user, as well as a time elapsed from a completion of a prescheduled event may be input to a message sent to the user's emergency contact(s), thereby personalizing the message. Text-to-speech may be utilized for voice notifications. All notifications, including for example, voice, text (e.g., short message service (SMS) text), and email are automated, with no human intervention required.

Several methods described herein may be implemented in hardware, such as a server, and may run independently from the user's device (e.g., a mobile phone) and/or may be used to create the prescheduled events or enter data related to the prescheduled events into a processor and memory of the systems and/or apparatus. Several methods described herein may be implemented in hardware, such as a user's device (e.g., a mobile phone). Implementation of the systems, apparatus, and methods described herein may provide for the safety or care of the user and/or the user's loved ones or pets.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts. As used herein, a reference to an element in the singular contemplates the reference to the element in the plural.

The systems and methods disclosed herein facilitate a user's ability to schedule events in a system, where the system automatically sends one or more notification messages to the user (e.g., a recipient) at the conclusion of the scheduled event. If the system does not receive an acknowledgement of the notification from the user, the system may send an additional one or more notifications (also referred to herein as "alerts") to the user and to at least one predetermined alternate contact (e.g., an emergency contact, an alternate recipient). The system may continue to send notifications to the user and/or the predetermined alternate contact until the user or predetermined alternate contact acknowledges receipt of the notification, or until a predetermined number of notifications have been sent to the user and the predetermined alternate contact.

For example, a first notification to a user may be followed by a second notification to the user, which may be followed by simultaneously sending a third notification to the user and a first notification to a predetermined alternate contact. If neither the user nor the predetermined alternate contact acknowledges these notifications (e.g., by sending an acknowledgement to the system), the system may simultaneously send a fourth notification to the user and a second notification to the predetermined alternate contact. The fourth notification to the user and the second notification to the predetermined alternate contact may be the final notifications sent; however, another total number of notifications may be sent to the user and/or the predetermined alternate contact without departing from the scope of the disclosure.

FIG. 1 is a conceptual diagram illustrating an operational environment 100 within which embodiments of the present disclosure may be found. A user (not shown) may input information to, and receive notifications from, an event scheduling and notification system/function/module/device (hereinafter the system 110) configured to perform aspects of the methods described herein, such as the methods associated with FIGS. 4, 5 7-17, 19, and 21-32. The user's access may be via a client program installed on any client device/user device, such as, for example, a terminal 102, a wireless cellular phone 104 (e.g., a smart phone), and a personal digital assistant or tablet 106. A wired phone 108 may be utilized to receive communications. The system 110 may be configured as hardware and/or software in, for example, a web server 112. The web server 112 may be thought of as a physical (or virtual) machine that may be configured as a web page and/or web site server. In some embodiments the web server 112 may be configured to provide web services. The system 110 may be, for example, a web service 113 of the web server 112.

The system 110 may interact with a local data storage device 114 (e.g., storing a database and/or instruction to perform aspects of the methods described herein) and a local file system 116. The local data storage device 114 and local file system 116 may be configured as part of the web server 112. In some embodiments, the system 110 may interact with a remote data storage device 118 and/or a remote file system 120, or any combination of local and remote data storage devices and file systems.

The local file system 116 (and/or remote file system 120) may control how data in the local data storage device 114 and/or remote data storage device 118 is stored and retrieved. In some embodiments, the structure and logic rules used to manage the groups of information stored as data in the local data storage device 114 and/or remote data storage device 118 may be referred to as a "file system" (e.g., local file system 116 and/or remote file system 120). The local file system 116 and/or remote file system 120 may each have a different structure and logic, properties of speed, flexibility, security, size and more. In some embodiments, the structure and logic of the local file system 116 and/or remote file system 120 provide for improved speed and security over other known file systems. The local data storage device 114 and/or remote data storage device 118 may use the same or different media on which data may be stored. Examples of media include magnetic discs, magnetic tapes, optical discs, and electronic memory (such as flash memory).

The system 110 may also interface with, for example, an external merchant processor 122, an email service 124, a short message service (SMS) (referred to herein as an SMS service) 126, a text-to-speech service 128, and/or a phone service 130 (interfacing with a wireless cellular phone 104 and/or a wired phone 108). All services may be configured on one or more external server(s) 132.

Interfaces to some or all services may be through an application program interface (API). An API may be a set of routines, protocols, and tools used to build software applications. An API may define a set of constraints to be used for creating web services. For example, web services that conform to the Representational State Transfer (REST) architectural style may be termed RESTful web services. Accordingly, in some embodiments, the system 110 may implement or otherwise use a Restful Web API (not shown) to interface with one or more of the external merchant processor 122, the email service 124, the SMS service 126, the text-to-speech service 128, and/or the phone service 130 and/or the server(s) 132 hosting those services. The services are not limited to RESTful web compliant services. Other web services, such as simple object access protocol (SOAP) web compliant services are within the scope of the disclosure.

Communication between any or all of the apparatus, devices, systems, functions, and services and servers described herein may be made through one or more wired and/or wireless communication network(s) 134. Examples of communication network(s) 134 include a public switched telephone network (PSTN), a wide area network (WAN), a local area network (LAN), a TCP/IP data network such as the Internet, and a wireless network such as the 3G, 4G, LTE, and 5G networks promulgated by the Third Generation Partnership Project (3GPP). The communication networks(s) 134 may be any one or combination of two or more communication networks such as, but not limited to, the just-mentioned communication networks.

Web services may include, for example, calendar systems and push notification systems. Calendar systems may, for example, display pop-up messages and/or sound alarms, to notify a user of a start of an event. For example, calendar systems may notify a user of a starting time of a meeting. Calendar systems may allow a user to select a time to display the pop-up message and/or sound the alarm. Push notification systems may send text messages, emails and/or phone calls to users, typically notifying a user of a financial transaction (e.g., a transaction has caused a bank account balance falling below a preset value set by the user), appointment reminder, prescription ready for pick-up, time to get car serviced, etc. These are examples of systems that typically send a message to a user and are of no consequence if the user does not respond to the message. If message reminders are provided, they are limited to the user only.

The exemplary systems and methods disclosed herein differ from the just-mentioned calendar and push notification systems in that the systems and methods disclosed herein are configured to receive scheduling information related to multiple events for each user and automatically send a plurality of notification messages (e.g., alert messages) via multiple communication systems (e.g., via email, text, and/ or wireless or wired phones) to a user and at least one predetermined alternate contact (e.g., an emergency contact, an additional recipient). The systems and methods described herein may insert the name and/or other variable information of a user into an outgoing notification sent to the predetermined alternate contact (e.g., an audible message sent to an emergency contact by phone), in order for the predetermined alternate contact to know to whom the notification pertains.

Figure 2:
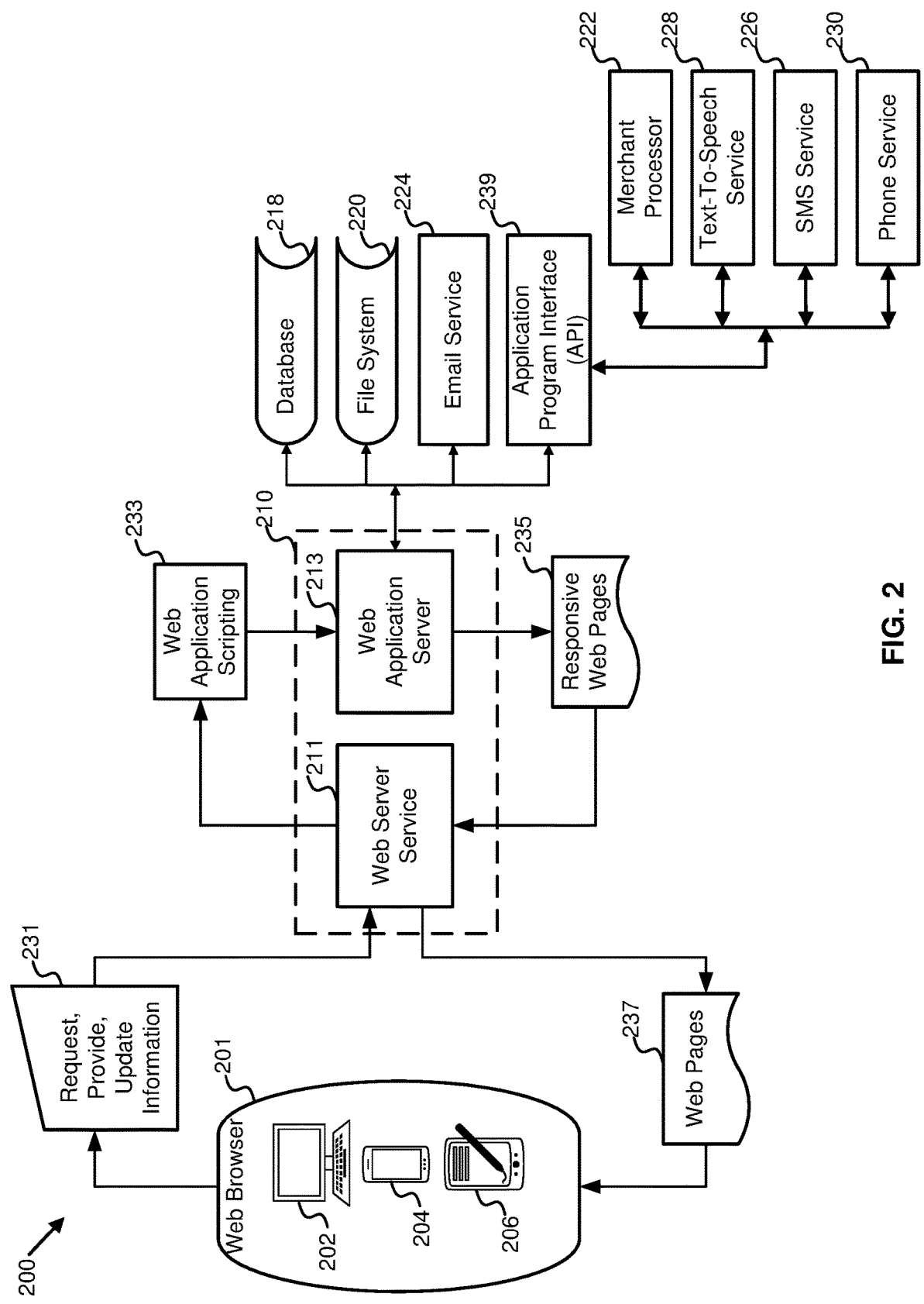
FIG. 2 is another conceptual diagram illustrating an alternative operational environment within which embodiments of the present disclosure may be found.

FIG. 2 is another conceptual diagram illustrating an alternative operational environment 200 within which embodiments of the present disclosure may be found. The alternative operational environment 200 of FIG. 2 may be similar to the operational environment 100 of FIG. 1. A user (not shown) may input information to, and receive notifications from, an event scheduling and notification system/ function/module/device (hereinafter the system 210) that may be configured to perform aspects of the methods described herein, such as methods associated with FIGS. 4, 5 7-17, 19, and 21-32. The user's access may be via a web browser 201 installed on any client device, such as, for example a terminal 202, a wireless cellular phone 204 (e.g., a smart phone), and a personal digital assistant or tablet 206. A wired phone (not shown) may receive communications. The system 210 may be configured as hardware and/or software in, for example, a web application server 213 served by a web server service 211. The system 210 may be implemented in hardware and/or software distributed in any proportion between, for example, the web application server 213 and the web server service 211.

Any device (e.g., terminal 202, wireless cellular phone 204, personal digital assistant or tablet 206) with access to the Internet (e.g., a communication network, not shown) may be used to access the system 210 and benefit from its features. From the Internet (e.g., a communication network, not shown) the user may access the web server service 211, which accesses a web application server 213 via web application scripting 233. A user may request information or may be prompted for information that may be manually input into the system 210. For example, a user may request information or may be prompted to provide information or update information 231 that may be used by the system 210 to perform aspects of the methods described herein, such as the methods associated with FIGS. 4, 5 7-17, 19 and 21-32.

Examples of such information, which may be stored in a table or other data structure in database 218, are provided in tabular form in Table 1, below. Table 1 is intended to be illustrative and non-limiting.

TABLE 1

Exemplary Database Parameter List
Exemplary Database Parameters List

USER
    User Identifier (e.g., name, account number, etc.)
    User Communication Address(es) (for notifications sent to user)
        Telephone Number (for voice service)
        Telephone Number (for SMS service)
        Email Address (for Email Service)
ALTERNATE CONTACT(S)
    Alternate Contact 1
        Alternate Contact Identifier (e.g., name, account number, etc.)
        Alternate Contact Communication Address(es) (for notifications sent to alternate contact)
        Telephone Number (for voice service)
        Telephone Number (for SMS service)
        Email Address (for Email Service)
   . . .
    Alternate Contact X
SCHEDULED EVENTS
    Scheduled Event 1
        Event Identifier (e.g., name, description, etc.)
        Event Location
        Event Expected Conclusion Date
        Event Expected Beginning Time (in event location time zone)
        Event Expected Conclusion Time (in event location time zone)
        Event Time Zone
        Event Type (e.g., single, series (if series, frequency (e.g., daily, weekdays, weekends, specific days of the week, monthly, yearly))
        Information Pertinent to First Example, Section II hereinbelow:
            Number-of-Attempts (N) Value (N ≥ 2) (may be set by system of input by user, e.g., the system may prompt user by asking: "How many times should we attempt to notify you (minimum number-of-attempts is 2)?")
            Before-Last-Notification (B) Value (0 ≤ B ≤ N-2) (may be set by system or input by user, e.g., the system may prompt the user by asking: "How many times before the last notification we send to you, should we begin sending notifications to you and your alternate contact?")
        Information Pertinent to Second Example, Section III hereinbelow:
            State of the Event
    Next Scheduled Event
   . . .

Figure 3:
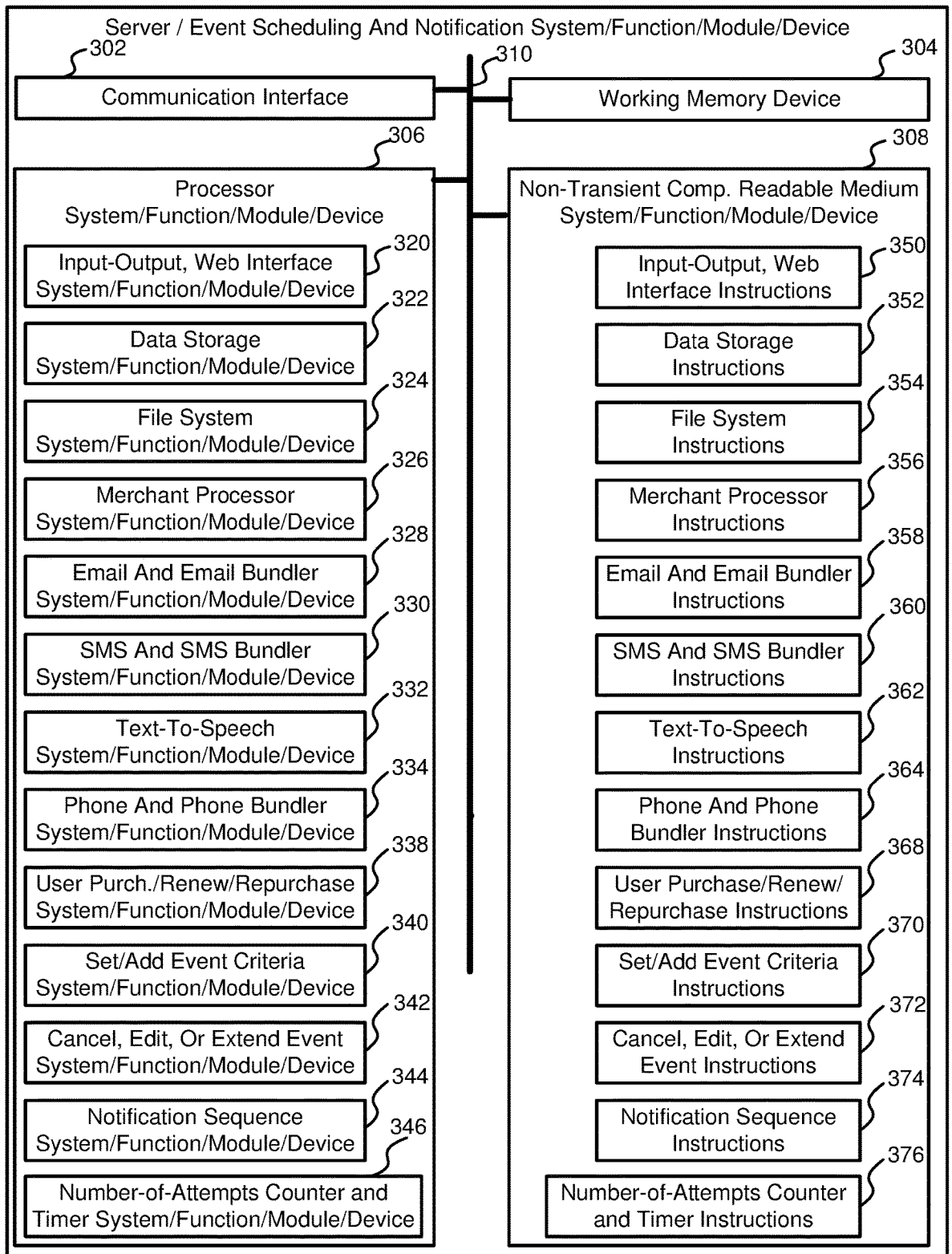
FIG. 3 is a block diagram illustrating an example of a server and/or an event scheduling and notification system/function/module/device in accordance with an embodiment of the present disclosure.

Some or all of the information in Table 1, which is a representative and non-limiting list of information, may be stored in a database, such as database 218, FIG. 2, and/or in databases (not shown) in a local data storage device 114, FIG. 1, a remote data storage device 118, FIG. 1, and/or a data storage 322 system/function/module/device, FIG. 3. The information represented in Table 1 is self-explanatory with but three exceptions. The Number-of-Attempts (N) Value and the Before-Last-Notification (B) Value will be explained in the context of a First Example of a System, Apparatus, And Method of Scheduling Events and Sending Notifications to Entities, described in Section II, below. The State of the Event Value will be explained in the context of a Second Example of a System, Apparatus, And Method of Scheduling Events and Sending Notifications to Entities, described in Section III, below. The First Example and the Second Example are intended to illustrate various aspects described herein and are non-limiting. Aspects of the First Example and the Second Example are not exclusive to each other. Aspects of the First Example may have applicability with the Second Example and vice-versa.

Information may flow to and from the web application server 213 via web application scripting 233 and responsive web pages 235, respectively. The user may at least one of: request information from, provide information to, or update information already possessed by (see Request, Provide, Update Information 231, FIG. 2) the system 210 via the web server service 211, via prompts issued on web pages 237 transmitted from the web server service 211. Any combination of requesting information from, providing information to, or updating information already possessed by the system 210 via the web server service 211 is within the scope of the disclosure. The web application server 213 may access a database 218, file system 220, and email service 224 that may be configured on to the web application server 213. The web application server 213 may, as needed, access outside services, such as a merchant processor 222, SMS service 226, text-to-speech service 228, and phone service 230 via an application program interface 239 (API) such as a RESTful web API. In some embodiments, some or all of the data flows may be secure and/or encrypted.

II. First Example of a System, Apparatus, and Method of Scheduling Events and Sending Notifications to Entities FIG. 3 is a block diagram illustrating an example of a server/event scheduling and notification system/function/module/device (hereinafter the server 300) in accordance with an embodiment of the present disclosure. The server 300 of FIG. 3 may be similar to the web server 112, server(s) 132 of FIG. 1 and/or the system 210 of FIG. 2; any of which may be configured as the server 300.

The server 300 may include, for example, a communication interface 302. The communication interface 302 may enable data and control input and output. The communication interface 302 may, for example, enable communication over one or more communication networks, similar to communication network(s) 134 of FIG. 1. The communication interface 302 may be communicatively coupled, directly or indirectly, to the communication network(s) 134. The server 300 may include a working memory device 304, and a processor system/function/module/device (hereinafter the processor 306). The processor 306 may use the working memory device 304 to store data that is about to be operated on, being operated on, or was recently operated on. The processor 306 may store instructions on the working memory device 304 and/or on one or more other memory structures or devices, such as, for example, non-transient computer readable medium system/function/module/device (hereinafter the non-transient computer readable medium 308). When executed by the processor 306, the instructions may cause the processor 306 to perform, for example, one or more aspects of the methods described herein, such as the methods associated with FIGS. 4, 5 and 7-17.

The server 300 may be implemented with a bus architecture, represented generally by the bus 310. The bus 310 may include any number of interconnecting buses and bridges depending on the specific application of the server 300 and overall design constraints. The bus 310 may communicatively couple various circuits including one or more processors (represented generally by the processor 306), the working memory device 304, the communication interface 302, and the non-transient computer readable medium 308. The bus 310 may also link various other circuits and devices, such as timing sources, peripherals, voltage regulators, and power management circuits and devices, which are well known in the art, and therefore, are not described any further.

The processor 306 may be responsible for managing the bus 310 and general processing, including the execution of software stored on the non-transient computer readable medium 308. The software, when executed by the processor 306, may cause the processor 306 to perform the various functions described below for any particular apparatus. The non-transient computer readable medium 308 and the working memory device 304 may also be used for storing data that is manipulated by the processor 306 when executing software.

One or more processors, such as processor 306 in the server 300 may execute software. Software may be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a non-transient computer readable medium, such as non-transient computer readable medium 308. Non-transient computer readable medium 308 may include, by way of example, a magnetic storage device (e.g., hard disk, floppy disk, magnetic tape, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable non-transient medium for storing software, date, and/or instructions that may be accessed and read by a computer or the processor 306. Computer readable media may also include, by way of example, a carrier wave, a transmission line, and any other suitable medium for transmitting software and/or instructions that may be accessed and read by a computer or the processor 306. The non-transient computer readable medium 308 may reside in the server 300 (e.g., local data storage device 114, FIG. 1), external to the server 300 (e.g., remote data storage device 118), or distributed across multiple entities including the server 300.

The non-transient computer readable medium 308 may be embodied in a computer program product. By way of example, a computer program product may include a computer readable medium in packaging materials. Those skilled in the art will recognize how best to implement the described functionality presented throughout this disclosure depending on the particular application and the overall design constraints imposed on the overall system.

In some aspects of the disclosure, the processor 306 may include circuitry configured for various functions. For example, the processor 306 may include a web interface 320 system/function/module/device configured to manage web page generation and display and to perform input/output operations associated with access to the Internet web and perform, for example, methods associated with FIGS. 4, 5A, 5B, 8A, 8B, 9, and 10. For example, the processor 306 may include a data storage 322 system/function/module/device configured to store data including data used to populate user profiles and a system database. For example, the processor 306 may include a file system 324 system/function/module/device configured to control how data in local data storage and/or remote data storage is stored and retrieved. For example, the processor 306 may include a merchant processor 326 system/function/module/device configured to perform sales and other merchant related activities and operations. For example, the processor 306 may include an email and email bundler 328 system/function/module/device configured to serve, for example, email accounts and process email messages and bundle emails for transmission to external servers, and to perform, for example, methods associated with FIG. 15. For example, the processor 306 may include a short message service (SMS) and SMS bundler 330 system/function/module/device configured to serve SMS accounts and serve SMS messages and bundle SMS messages for transmission to external servers, and to perform, for example, methods associated with FIG. 16. For example, the processor 306 may include a text-to-speech 332 system/function/module/device configured to convert text to speech. For example, the processor 306 may include a phone and phone bundler 334 system/function/module/device configured to serve phone accounts and phone messages and bundle phone messages for transmission to external servers, and to perform, for example, methods associated with FIGS. 17A and 17B. For example, the processor 306 may include a user purchase/renew/repurchase 338 system/function/module/device configured to perform, for example, the methods of FIGS. 8A, 8B, 9, and 10. For example, the processor 306 may include a set/add event criteria 340 system/function/module/device configured to perform, for example, the methods of FIGS. 7A, 7B, 11A, 11B, and 12. For example, the processor 306 may include a cancel, edit, or extend event 342 system/function/module/device configured to perform, for example, the methods of FIGS. 13A and 13B. For example, the processor 306 may include a notification sequence 344 system/function/module/device configured to perform, for example, the methods of FIGS. 4, 5A, 5B, 14A and 14B. For example, the processor 306 may include a number-of-attempts counter and timer 346 system/function/module/device configured to perform, for example, the methods of FIGS. 4, 5A, 5B, 14A and 14B.

The use of the number-of-attempts counter and timer 346, in conjunction with several mathematical relationships described herein, may reduce a need for the server 300 to rely on repeatedly searching and re-searching a database, such as database 218, FIG. 2, to re-identify a concluded event for second and subsequent transmission of notification messages.

By using an approach involving a database and the use of mathematical relationships described herein, after a concluded event is first identified in the database, the server 300 may need only to maintain a "number-of-attempts counter" and a timer in a working memory of the system, such as working memory device 304, and use a value of number-of-attempts counter (where the value is referred to herein as "A") and the timer, along with additional variables N and B, which are described later, to determine when each subsequent notification message is to be sent to the user or sent concurrently to the user and an alternate contact. The processor 306 may thus be configured such that the components of the processor 306 are able to, in combination, improve performance of the server 300 and database used by the server 300 (e.g., increase speed of process and decrease number of database search and read/write operations). This hybrid approach is not merely a generic use of computer components.

In some aspects of the disclosure, the non-transient computer readable medium 308 of the server 300 may include instructions that may cause the various systems/functions/modules/devices of the processor 306 to perform the methods described herein. For example, the non-transient computer readable medium 308 may include web interface instructions 350 corresponding to the web interface 320 system/function/module/device. For example, the non-transient computer readable medium 308 may include a data storage instructions 352 corresponding to the data storage 322 system/function/module/device. For example, the non-transient computer readable medium 308 may include file system instructions 354 corresponding to the file system 324 system/function/module/device. For example, the non-transient computer readable medium 308 may include merchant processor instructions 356 corresponding to the merchant processor 326 system/function/module/device. For example, the non-transient computer readable medium 308 may include email and email bundler instructions 358 corresponding to the email and email bundler 328 system/function/module/device. For example, the non-transient computer readable medium 308 may include SMS and SMS bundler 360 instructions corresponding to the SMS bundler 330 system/function/module/device. For example, the non-transient computer readable medium 308 may include text-to-speech instructions 362 corresponding to the text-to-speech 332 system/function/module/device. For example, the non-transient computer readable medium 308 may include phone and phone bundler instructions 364 corresponding to the phone and phone bundler 334 system/function/module/device. For example, the non-transient computer readable medium 308 may include user purchase/renew/repurchase instructions 368 corresponding to the user purchase/renew/repurchase 338 system/function/module/device. For example, the non-transient computer readable medium 308 may include set/add event criteria instructions 370 corresponding to the set/add event criteria 340 system/function/module/device. For example, the non-transient computer readable medium 308 may include cancel event, edit event, or extend event instructions 372 corresponding to the cancel, edit, or extend event 342 system/function/module/device. For example, the non-transient computer readable medium 308 may include notification sequence instructions 374 corresponding to the notification sequence 344 system/function/module/device. For example, the non-transient computer readable medium 308 may include a number-of-attempts counter and timer instructions 376 corresponding to the number-of-attempts counter and timer 346 system/function/module/device.

According to some aspects, an event scheduling and notification apparatus, such as the server 300, may include: a processor 306, a transceiver (e.g., a communication interface 302) communicatively coupled to the processor 306, and a memory (e.g., working memory device 304) communicatively coupled to the processor 306, wherein the processor 306 may be configured to: obtain one or more user communication address(es) associated with a user; obtain an alternate contact identifier and one or more alternate contact communication address(es) associated with the alternate contact; obtain an event type from a list of event types; obtain event details to associate with the obtained event type, including at least an event identifier, an event expected conclusion date, and an event expected conclusion time; obtain a selection of an alternate contact, from a list including at least the alternate contact identifier, to associate with the event identifier; obtain user notification criteria including, at least one user communication address to associate with a notification message to be sent to the user; obtain alternate contact notification criteria, including at least one alternate contact communication address to associate with a notification message sent to the alternate contact; and send, in accordance with the user notification criteria and the alternate contact notification criteria, at least a first notification message to the user, and if the user does not acknowledge receipt of the first notification message, at least a final notification message to the user and the alternate contact. As used herein, the term "obtain" may mean, for example, to get, attain, acquire, take, receive, accept, collect, generate, determine, derive, and/or create. A thing may be, for example, obtained locally or obtained from a remote file, database, location, and/or source, or combination thereof.

According to some aspects, the processor 306 may be further configured to: send the first notification message on the event expected conclusion date at substantially (e.g., approximately) the event expected conclusion time or at a specified time thereafter. According to still other aspects, the processor 306 may be further configured to: send one or more additional notification message(s) to: the user, or to the user and the alternate contact, before the final notification message is sent to the user and the alternate contact.

Table 1, above, includes two variables that may be used according to aspects of the First Example (see Section II) as described herein. The two variables are: a number-of-attempts (N) variable and a before-last-notification (B) variable. Either or both of these variables may be pre-set in the system (i.e., neither selectable nor changeable by the user), selected by the user, or negotiated or otherwise determined by both the user and the system.

The number-of-attempts (N) variable may represent a maximum number of times (e.g., attempts) that the system sends a notification to the user. N may be a positive non-zero integer. In some embodiments, the number-of-attempts (N) may be set to a minimum value of 2 (e.g., N≥2), because in some embodiments, the system may make a first attempt and a second (and final) attempt (i.e., 2 attempts) to notify the user that an expected end-time (e.g., conclusion time) of the prescheduled event was reached, and thereby afford the user with at least two opportunities to respond to the system. The user's response may, for example, indicate that the event concluded, and the user was safe, or that the event concluded, and the user arrived home in time to, for example, care for a loved one, feed a pet, or a combination thereof. Other ways to set the maximum number of times that the system sends a notification to the user are within the scope of the disclosure.

The before-last-notification (B) variable provides a way to instruct the system to begin sending notifications to the alternate (e.g., emergency) contact a given number of times (B) before a last notification is sent to a user. The range may be set from zero to N−2 (i.e., 0≤B≤N−2) because: 1) this range provides for at least two attempts to notify the user (N≥2); 2) this range provides for sending at least a first notification to the user, and gives the user a chance to respond, before a notification is sent to the alternate contact; and 3) this range provides for at least one notification to be sent to the emergency contact. Other ways to instruct the system, or to pre-set in the system, when to begin sending notifications to the alternate contact are within the scope of the disclosure.

By way of example, if N=2, the constraint on B implies that a first notification will be sent to the user, not both the user and the emergency contact. If N=2, the constraint on B also implies that a first notification will be sent to a user and a second and final notification will be sent to the user concurrently (simultaneously, nearly simultaneously) with a first and final notification being sent to the alternate (e.g., emergency) contact. A value of B=0 indicates that the first attempt to send a notification to the alternate (e.g., emergency) contact will coincide with the last attempt to send a notification to the user. By way of example, if the number-of-attempts N is set to 2, then B=0 (because 0≤B≤N−2). The result will be that a first notification will be sent to the user, followed by the simultaneous (or near simultaneous) sending of a second (final) notification to the user and a first (final) notification to the alternate (e.g., emergency) contact. If, however, the number-of-attempts value N is set to 4, then B could be set to either 0, 1 or 2 (because 0≤B≤N−2). With N=4 and B=0, the system will send three successive notifications to the user and will send the fourth (final) notification to the user simultaneously with a first (final) notification to the alternate (e.g., emergency) contact. With N=4 and B=1 (a situation exemplified in FIGS. 11A, 11B, 13A, 13B, 14A, and 14B), the system will send a first notification to the user, next the system will send a second notification to the user, next the system will send a third notification to the user simultaneously with a first notification to the alternate (e.g., emergency) contact, and next the system will send the fourth (final) notification to the user simultaneously with a second (final) notification to the alternate (e.g., emergency) contact. With N=4 and B=2 the system will send a first notification to the user, next the system will send a second notification to the user simultaneously with a first notification to the emergency contact, next the system will send a third notification to the user simultaneously with a second notification to the alternate (e.g., emergency) contact, next the system will send the fourth (final) notification to the user simultaneously with a third (final) notification to the alternate (e.g., emergency) contact. The preceding examples and uses of the exemplary variables (N, B) are made for illustrative purposes only and are non-limiting. Furthermore, the parameters listed in Table 1 are merely exemplary, a fewer number, a greater number, and/or different parameters (or differently named parameters) are within the scope of the disclosure.

Figure 4:
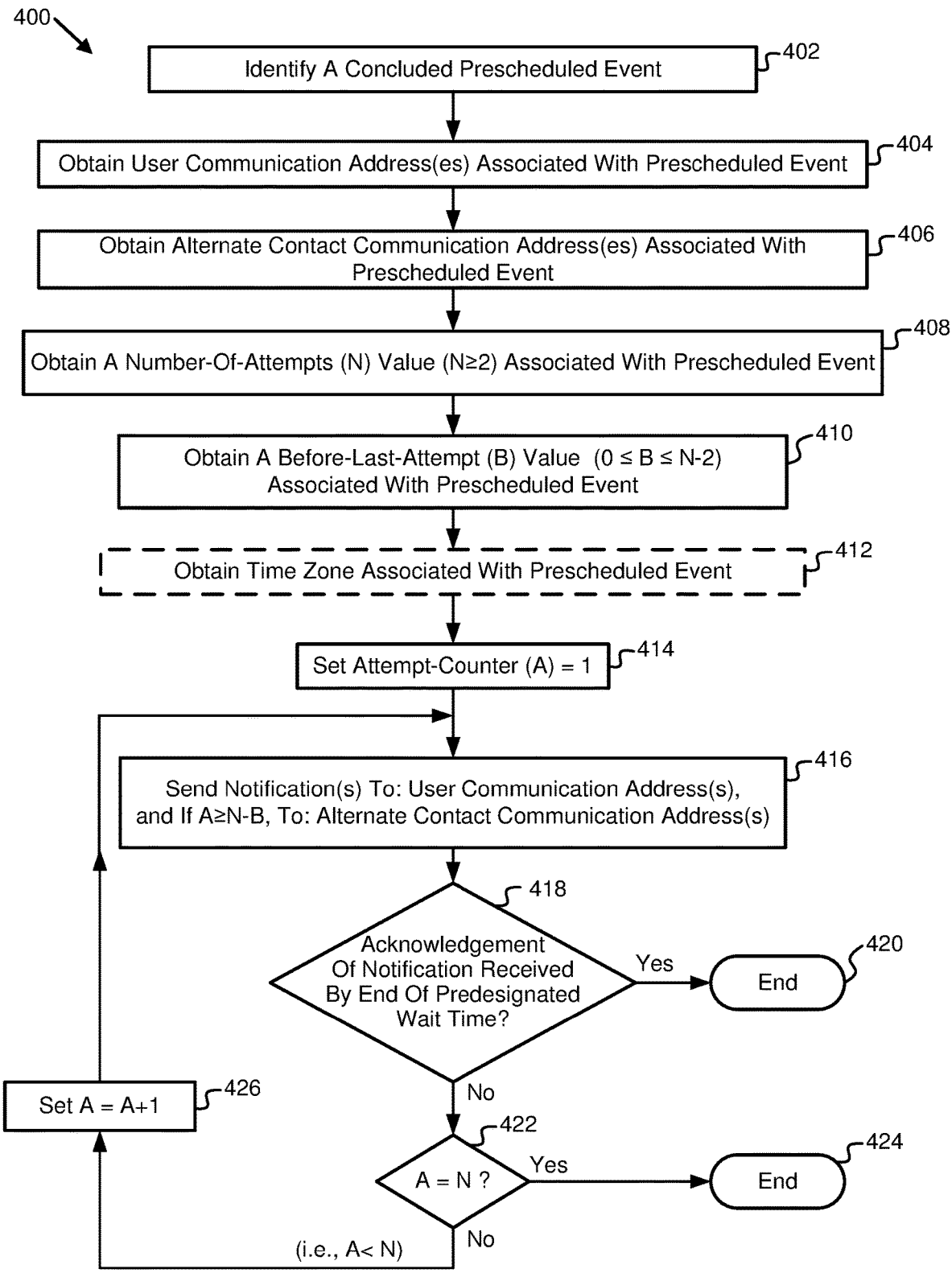
FIG. 4 is a flow diagram illustrating an exemplary method, operational at a server, of notifying a user or the user and a predesignated alternate contact (e.g., an emergency contact) of a conclusion of a prescheduled event in accordance with an embodiment of the present disclosure.

FIG. 4 is a flow diagram illustrating an exemplary method 400, operational at a server, of notifying a user or the user and a predesignated alternate contact (e.g., an emergency contact) of a conclusion of a prescheduled event in accordance with an embodiment of the present disclosure. According to one example, the server may be configured as at least one of: the system 110 of FIG. 1, the system 210 of FIG. 2, or the server 300 of FIG. 3. For ease of reference, and without any intent of limiting the disclosure, a reference made to a "system" herein may be considered as a reference made to the at least one of: the system 110 of FIG. 1, the system 210 of FIG. 2, or the server 300 of FIG. 3.

The system may identify a concluded prescheduled event 402. The system may identify the concluded prescheduled event through its own operation (e.g., by searching a database, by identifying the concluded prescheduled event). Alternatively, the system may pull the identification from an entity responsible for searching the database, or the entity may push the identification to the system. The system may be different from the entity. As illustrated in the "Exemplary Database Parameters Listing," of Table I, above, the database may include, among other things, the expected date and expected concluding time (may be stored as a local time) of a plurality of prescheduled events associated with a plurality of users. According to one embodiment, the concluded prescheduled event is identified in a database populated with one or more event identifiers and associated event expected conclusion times.

The system or the entity may identify a concluded prescheduled event by, for example, comparing a date and local concluding time of each prescheduled event stored in the database to a current date and time of a clock maintained by the system or the entity, as the case may be. The time of the clock may be adjusted for the time zone at the location of the concluded prescheduled event. The system may be configured to search a database that includes parameters such as those identified in the "Exemplary Database Parameters Listing," of Table 1, above. The system or the entity may be configured, for example, to perform searches of the database in an ongoing manner, where a purpose of the search is to identify one or more concluded prescheduled events. Alternatively, the system or the entity may sort all prescheduled events in the database according to date and time of event conclusion. The system or the entity may determine that an event has concluded by comparing the present time of the system or the entity (e.g., the time of a clock running with the system or the entity) to the conclusion times of the plurality of prescheduled events in the database. The entity may then push the identification of the concluded prescheduled events to the system, or the system or the entity may place the identifications of concluded prescheduled events in a queue or file. The system may pull the identification of the concluded event from the queue or file in chronological order. Other ways for the system or the entity to identify the concluded prescheduled events from a database or other storage mechanism are within the scope of the disclosure.

The system may obtain one or more user communication address(es) associated with the concluded prescheduled event 404. The one or more user communication address(es) may include at least one of: an email address, a first telephone number associated with an audible telephone message, or a second telephone number for an SMS message (e.g., a text message). Additional or alternative address(es) are within the scope of the disclosure. In some embodiments, the user communication address(es) may be obtained from a database, a queue, or file, or an entity different from the system. The user communication address(es) may be obtained, for example, by pulling the user communication address(es) from the database, queue, or file, or by having the entity different from the system push the user communication address(es) to the system.

The system may obtain one or more alternate contact communication address(es), different from the user communication address(es), associated with the concluded prescheduled event 406 (e.g., by obtaining one or more alternate contact communication address(es), different from the user communication address(es), associated with the concluded prescheduled event). The alternate contact communication address(es) may include at least one of: an email address, a telephone number for an SMS message (e.g., a text message), or a telephone number for an audible telephone message. The alternate contact represents a person, group of persons (e.g., recipients of a group message), or business that is different from the user. In some circumstances, the alternate contact may be considered an emergency contact. In some embodiments, the alternate contact communication address(es) may be obtained from a database, a queue or file, or an entity different from the system. The alternate contact communication address(es) may be obtained, for example, by pulling the alternate contact communication address(es) from the database, queue, or file, or by having the entity different from the system push the alternate contact communication address(es) to the system. Additional or alternative address(es) are within the scope of the disclosure. One or more notification messages may be sent to the alternate contact communication address(es) if the user does not respond to one or more notification messages sent to the user communication address(es).

Accordingly, according to one aspect, the one or more user communication address(es) and the one or more alternate contact communication address(es), each correspond to a respective method of communication including at least one of: email communication, short message service (SMS) message communication, or audible telephonic communication. The one or more user communication address(es) may include at least one of: a first telephone number associated with an audible voice telephone account of the user, a second telephone number associated with a short message service (SMS) account of the user, or an email address associated with an email account of the user. According to one aspect, the one or more alternate contact communication address(es) may be associated with an alternate contact, and the alternate contact may be a person, group of persons, or a business entity. According to some aspects, the one or more alternate contact communication address(es) include at least one of: a first telephone number associated with an audible voice telephone account of the alternate contact, a second telephone number associated with a short message service (SMS) account of the alternate contact, or an email address associated with an email account of the alternate contact.

The system may obtain a number-of-attempts (N) value associated with the concluded prescheduled event 408. According to some aspects, N corresponds to a number of times that a notification message is to be sent to the one or more user communication address(es), and N is a positive integer greater than or equal to 2 (N≥2). The number-of-attempts (N) represents the maximum number of times that a notification message is sent to the user. For example, if N=4, the system will make four attempts to obtain an acknowledgement from the user by sending four notifications to the user. The user's acknowledgement may indicate that the user is safe or that the identified concluded prescheduled event ended safely. N may be a positive integer greater than or equal to 2. When N is equal to 2, the system will make a first attempt by sending the notification to the user and if the user does not respond by the expiration of a predetermined period (e.g., 1 minute, 5 minutes, 10 minutes), the system will make a second (and final) attempt by sending the notification to the user once more. The number-of-attempts (N) may have been prestored in, for example, a database or file. In some embodiments, the number-of-attempts (N) may be selected by the user and stored in, for example, the database or file at the time the user paid for service. In other embodiments, the number-of-attempts (N) may be a default value or a value determined by the type or level of service purchased by the user. The default value or the value determined by the type or level of service purchased by the user may be stored in, for example, the database or file, or may be one of a plurality of predetermined values derived, calculated, or otherwise obtained by the system whenever it is needed (e.g., for calculations) by the system. In some embodiments, N may be obtained from a database, a queue, a file, a calculation, or a selection made based on a user's level of service.

Optionally, the system may obtain a before-last-attempt (B) value associated with the concluded prescheduled event 410. According to some embodiments, B identifies with which notification sent to the user communication address(es) should a first notification be concurrently sent to the alternate contact communication address(es), and $0 \leq B \leq N-2$. The before-last-attempt (B) value identifies a number of a notification attempt before the last (Nth) notification attempt where notifications first begin to be sent to both the user communication address(es) and the alternate contact communication address(es). It is a number relative to the last (Nth) notification being sent to the user. For example, if B=2, the system may send notification messages to both the user and the alternate contact starting two attempts before the last attempt at contacting the user is made (and with the attempt before the last attempt and with the last attempt). For example, if B=1, the system may send notification messages to both the user and the alternate contact starting one attempt before the last attempt (and with the last attempt). For example, if B=0, the system may send notification messages to both the user and the alternate contact starting with the last attempt (i.e., starting zero attempts before the last attempt). The before-last-attempts (B) value may have been prestored in, for example, a database or file. In some embodiments, the before-last-attempts (B) value may be selected by the user (within the constraints on the range of B as identified above) and stored in, for example, the database or file at the time the user paid for service. In other embodiments, the before-last-attempts (B) value may be a default value or a value determined by the type or level of service purchased by the user (within the constraints on the range of B as identified above). The default value or the value determined by the type or level of service purchased by the user and may be stored in, for example, the database or file, or may be one of a plurality of predetermined values derived, calculated, or otherwise obtained by the system whenever it is needed (e.g., for calculations) by the system. In some embodiments, B may be obtained from a database, a queue, a file, a calculation, or a selection made based on a user's level of service. Other ways of obtaining B are within the scope of the disclosure.

Optionally, the system may obtain a time zone associated with the concluded prescheduled event 412. The time zone may be provided by the user or determined by the system. The time zone may be used to adjust the ending time of the identified concluded prescheduled event, in the case where the clock running with the system is located in a time zone that is different from the time zone where the identified concluded prescheduled event occurs. The time zone may be obtained in various ways which are within the scope of the disclosure.

An attempt-counter (A), representing the number of the attempt of the next notification to be sent to the user (i.e., first attempt, second attempt, third attempt, etc.), may be set to equal 1 (i.e., A=1). In other words, the system may set an attempt-counter, A, to equal 1 414.

The system may send a notification message to the one or more user communication address(es), and if A is greater than or equal to N minus B (A≥(N−B)), to the one or more alternate contact communication address(es) 416. The inequality, A≥N−B, assures that the first and subsequent (if any) notifications sent to both the user and the alternate contact begin B attempts before the last attempt N. Accordingly, the notification message may be two notification messages having different content: a first notification message sent to the user communication address(es) and a second notification message, different from the first notification message, sent to the alternate contact communication address(es). According to some aspects, the second message may include a name of the user and an elapsed time since the event expected conclusion time.

The system may wait up to a predetermined period of time (e.g., wait for 2 minutes, 5 minutes, 10 minutes) after sending the $A^{th}$ (i.e., the first, second, third, fourth) notification to determine if an acknowledgement of the $A^{th}$ notification was received by the system. In other words, the system may determine if an acknowledgement of the notification message is received by expiration of a predetermined period of time following the sending of the notification message 418 (e.g., by determining if an acknowledgement of the notification message is received by expiration of a predetermined period of time following the sending of the notification message). The predetermined period of time may be set by the user or may be a default or calculated value set by the system.

If the acknowledgement of the $A^{th}$ attempt was received by the system by an end of the predetermined period of time, then the method may end 420. However, if the acknowledgement of the notification message is not received by the end of the predetermined period of time, then the system may determine if the value of the attempt-counter, A, is equal to the number-of-attempts, N. That is, a determination may be made as to whether the $A^{th}$ attempt was the last attempt (i.e., does A=N?) 422. If A=N (i.e., if the $A^{th}$ attempt was the last attempt), the method may end 424. However, if A N (i.e., if the $A^{th}$ attempt was not the last attempt), the system may proceed by incrementing the attempt-counter, A, by 1, in other words (set A=A+1) 426. The system may then return to sending the notification message/messages. That is, return to sending a notification message to: the one or more user communication address(es), and if A is greater than or equal to N minus B (A≥(N−B)), the one or more alternate contact communication address(es) 416.

Table 2, below, demonstrates an example of when the system sends a notification to a user and sends a notification to the user and the alternate contact. Let N=4, B=1, and assume that neither the user nor the alternate contact acknowledges receipt of any notification message. Note that this is the same situation as exemplified in FIGS. 11A, 11B, 13A, 13B, 14A, and 14B.

TABLE 2

Example of When Notifications Are Sent to User and Alternate Contact

| Notification Attempt (A) | Sending Notifications To: (see 416. FIG. 4) | | | A = N? (sec 422, FIG. 4) (e.g.. Was this the last notification attempt) |
|---|---|---|---|---|
| | Sent to User Communication Address(es)? | A ≥ (N-B)? N = 4, B = 1, N − B = 4 − 1 = 3 | Sent to Alternate Contact Communication Address(es) | |
| 1 | Yes | No (1 NOT ≥ 3) | No | No, therefore set A = A + 1 = 2, return to sending |
| 2 | Yes | No (2 NOT ≥ 3) | No | No, therefore set A = A + 1 = 3, return to sending |
| 3 | Yes | Yes (3 ≥ 3) | Yes | No, therefore set A = A + 1 = 4, return to sending |
| 4 | Yes | Yes (3 ≥ 3) | Yes | Yes (A = N, 4 = 4) End |

Figure 5A:
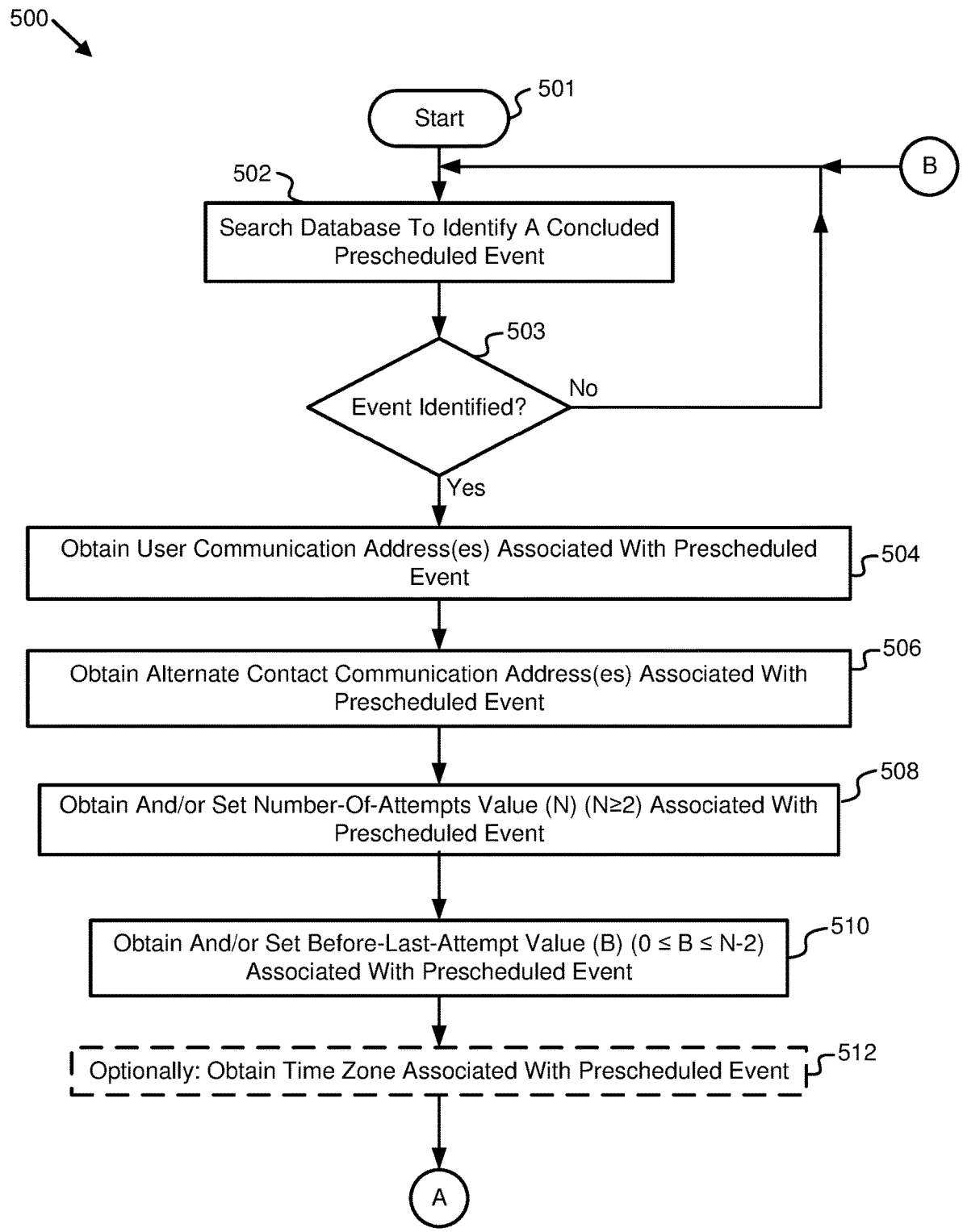
FIG. 5A and FIG. 5B together comprise a flow diagram illustrating an alternate exemplary method, operational at a server, for notifying a user or the user and a predesignated alternate contact (e.g., an emergency contact) of a conclusion of a prescheduled event in accordance with an embodiment of the present disclosure.
Figure 5B:
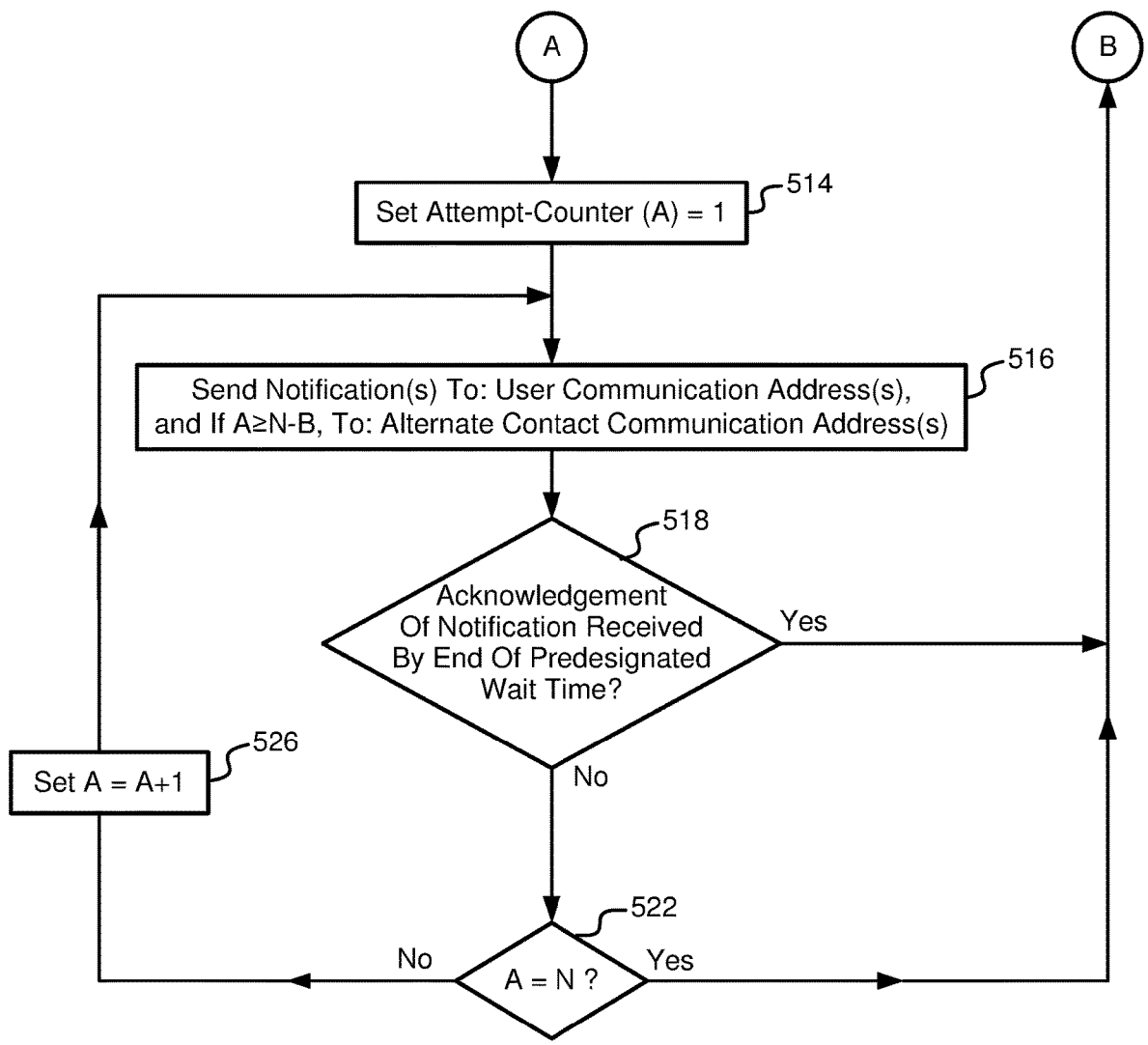

FIG. 5A and FIG. 5B together comprise a flow diagram illustrating an alternate exemplary method 500, operational at a server, of notifying a user or the user and a predesignated alternate contact (e.g., an emergency contact) of a conclusion of a prescheduled event in accordance with an embodiment of the present disclosure. According to one example, a server may be configured as an event scheduling and notification system/function/module/device. The event scheduling and notification system/function/module/device may be, for example, the system 110 of FIG. 1, the server 300 of FIG. 3, and/or system 210 of FIG. 2. For ease of reference, and without any intent of limiting the disclosure, the event scheduling and notification system/function/module/device will be referred to herein as the system. The method may begin at 501.

The system may search a database to identify a concluded prescheduled event 502. As illustrated in the "Exemplary Database Parameters Listing," Table 1, above, the database may include, among other things, the date and local concluding time of a plurality of prescheduled events associated with a plurality of users. The system may identify a concluded prescheduled event by, for example, comparing a date and local concluding time of each prescheduled event stored in the database to a current date and time of a system clock (adjusted for the time zone of the location of the prescheduled event). Other ways to identify a concluded prescheduled event are acceptable and within the scope of the disclosure. A determination may be made as to whether a concluded prescheduled event is identified 503. If a concluded prescheduled event is not identified, the system may return to searching the database to obtain an identity of a concluded prescheduled event 502. If a concluded prescheduled event is identified, the system may obtain from the database, for example: user communication address(es) and alternate contact communication address(es); additionally, the system may optionally obtain a number-of-attempts (N) value, before-last-attempt (B) value, and a time zone associated with the concluded prescheduled event. Each of these are illustrated on the flow diagram in sequential order; however, the system may obtain these parameters in any order, or all simultaneously, from the database or from any combination of the database and/or other sources.

The system may obtain user communication address(es) associated with the concluded prescheduled event 504. The user communication address(es) may include at least one of: an email address, a telephone number for an SMS message (e.g., a text message), or a telephone number for an audible telephone message. Additional or alternative address(es) are within the scope of the disclosure. In some embodiments, the user communication address(es) may be obtained from a database, a queue or file, or an entity different from the system. The user communication address(es) may be obtained, for example, by pulling the user communication address(es) from the database, queue, or file, or by having the entity different from the system push the user communication address(es) to the system.

The system may obtain alternate contact communication address(es) associated with the identified concluded prescheduled event 506. The alternate contact communication address(es) may include at least one of: an email address, a telephone number for an SMS message (e.g., a text message), or a telephone number for an audible telephone message. Additional or alternative address(es) are within the scope of the disclosure. The alternate contact represents a person, group of persons (e.g., recipients of a group message or individual messages), or business that is different from the user. In some circumstances, the alternate contact may be considered an emergency contact. In some embodiments, the alternate contact communication address(es) may be obtained from a database, a queue or file, or an entity different from the system. The alternate contact communication address(es) may be obtained, for example, by pulling the alternate contact communication address(es) from the database, queue, or file, or by having the entity different from the system push the alternate contact communication address(es) to the system. One or more notification messages may be sent to the alternate contact communication address(es) if the user does not respond to one or more notification messages sent to the user communication address(es).

The system may obtain a number-of-attempts (N) value (where, $N \geq 2$) associated with the identified concluded prescheduled event 508. The number-of-attempts value (N) represents the number of times that a notification message is sent to the user. For example, if N=4, the system will make four attempts to obtain an acknowledgement from the user by sending four notifications to the user. The user's acknowledgement may indicate that the user is safe or that the identified concluded prescheduled event ended safely. N is defined as being a positive integer with a lower limit of 2. When N is equal to 2, the system will make a first attempt by sending the notification to the user and if the user does not respond by the expiration of a predetermined period (e.g., 1 minute, 5 minutes, 10 minutes), the system will make a second (and final) attempt by sending the notification to the user once more. The number-of-attempts value (N) may have been prestored in, for example, a database or file. In some embodiments, the number-of-attempts (N) value may be selected by the user and stored in, for example, the database or file at the time the user paid for service. In other embodiments, the number-of-attempts (N) value may be a default value or a value determined by the type or level of service purchased by the user. The default value or the value determined by the type or level of service purchased by the user may be stored in, for example, the database or file, or may be one of a plurality of predetermined values derived, calculated, or otherwise obtained by the system whenever it is needed (e.g., for calculations) by the system. In some embodiments, N may be obtained from a database, a queue, a file, a calculation, or a selection made based on a user's level of service.

The system may obtain a before-the-last-attempt (B) value (where, $0 \leq B \leq N-2$), associated with the identified concluded prescheduled event 510. The before-last-attempt (B) value may identify which attempt before-the-last-attempt (e.g., second from last attempt (B=2), first from last attempt (B=1), with the last attempt (B=0)), will the system first begin to send notifications to both the user communication address(es) and the alternate contact communication address(es). The before-last-attempt (B) value is a number relative to the last (Nth) notification attempt being sent to the user. For example, if B=2, the system may send notification messages to both the user and the alternate contact starting two attempts before the last attempt at contacting the user is made (and with the attempt before the last attempt and with the last attempt). For example, if B=1, the system may send notification messages to both the user and the alternate contact starting one attempt before the last attempt (and with the last attempt). For example, if B=0, the system may send notification messages to both the user and the alternate contact starting with the last attempt (i.e., starting zero attempts before the last attempt). The before-last-attempts (B) value may have been prestored in, for example, a database or file. In some embodiments, the before-last-attempts (B) value may be selected by the user (within the constraints on the range of B as identified above) and stored in, for example, the database or file at the time the user paid for service. In other embodiments, the before-last-attempts (B) value may be a default value or a value determined by the type or level of service purchased by the user (within the constraints on the range of B as identified above). The default value or the value determined by the type or level of service purchased by the user and may be stored in, for example, the database or file, or may be one of a plurality of predetermined values derived, calculated, or otherwise obtained by the system whenever it is needed (e.g., for calculations) by the system. In some embodiments, B may be obtained from a database, a queue, a file, a calculation, or a selection made based on a user's level of service. Other ways of obtaining B are within the scope of the disclosure.

Optionally, the system may obtain a time zone associated with the identified concluded prescheduled event 512. The time zone may be provided by the user or determined by the system. The time zone may be used to adjust the ending time of the identified concluded prescheduled event in the case where the clock running with the system is located in a time zone that is different from the time zone where the identified concluded prescheduled event occurs. The time zone may be obtained in various ways which are within the scope of the disclosure.

An attempt-counter (A), representing a number of an upcoming notification to be sent to the user (i.e., first attempt, second attempt, third attempt, etc.) may be set to equal 1 (i.e., A=1) 514. Notification(s) may be sent to the user communication address(es) and, if A≥N−B, also to the alternate contact communication address(es) 516.

The system may wait for up to a predetermined period of time (e.g., 2 minutes, 5 minutes, 10 minutes) after sending the notification(s) to receive an acknowledgement of the notification from the user or, if a notification was also sent to the alternate contact, from the alternate contact. The period of time may be set by the user or set by the system.

A determination may be made as to whether the acknowledgement of notification is received (from either or both of the user and the alternate contact) by an end of the predetermined period of time 518. If the acknowledgement of notification is received (from either or both of the user and the alternate contact) by the end of the predetermined period of time, the system may return to searching the database to identify a (next) concluded prescheduled event 504. If, however, the acknowledgement of notification is not received (from either the user or the alternate contact) by the end of the predetermined, the system may determine if A=N 522. If the value of the attempt-counter (A) is not equal to the number-of-attempts (N) value, the system may increment A by one (i.e., set A=A+1) 526 and return to sending notification(s): to the user communication address(es) and, if A≥N−B, also to the alternate contact communication address(es) 512. If, however, the value of the attempt-counter (A) is equal to the number-of-attempts (N) value, the system may return to searching the database to identify a (next) concluded prescheduled event 504.

Figure 6:
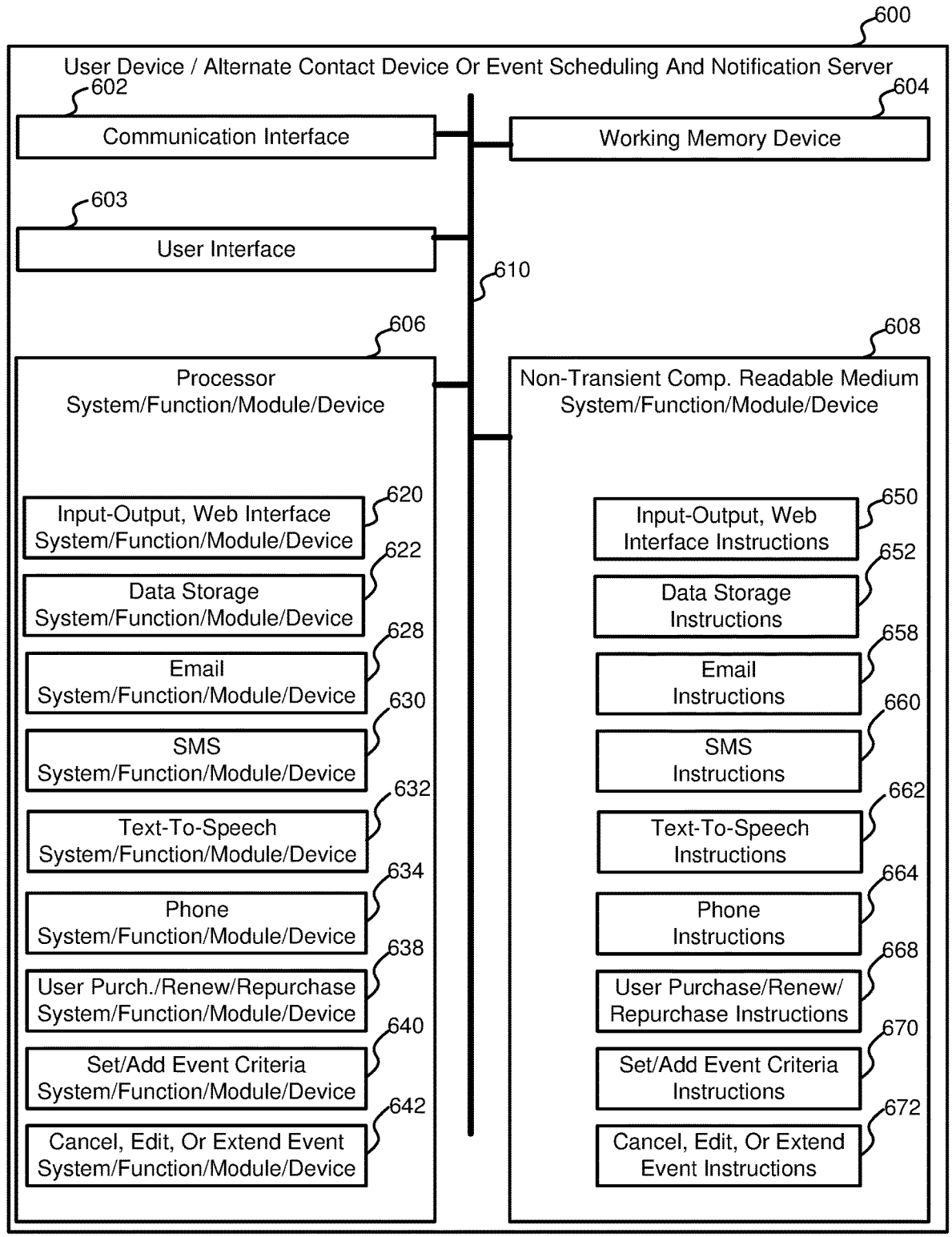
FIG. 6 is a block diagram illustrating an example of a user device or (an alternate contact device) in accordance with an embodiment of the present disclosure.

FIG. 6 is a block diagram illustrating an example of a user device (or an alternate contact device) 600 in accordance with an embodiment of the present disclosure. For purposes of conciseness, the user device or the alternate contact device will be referred to herein as the device 600. The device 600 may be effectively used as an input/output device communicatively coupled to a server 300 of FIG. 3. The device 600 may be similar to the user devices such as the terminal 102, the wireless cellular phone 104 (e.g., a smart phone), or the personal digital assistant or tablet 106 of FIG. 1, or the devices (e.g., terminal 202, wireless cellular phone 204, personal digital assistant or tablet 206) of FIG. 2. The device 600 may include, for example, a communication interface 602. The communication interface 602 may enable data and control input and output. The communication interface 602 may, for example, enable audiovisual input/output with a user as well as enable communication over one or more communication networks, similar to communication network(s) 134 of FIG. 1. The communication interface 602 may be coupled directly or indirectly to the communication network(s). The device 600 may include a user interface 603. The user interface 603 may include one or more systems/functions/modules/devices configured to permit a user to enter input to, and receive output from, the device 600. The device 600 may include a working memory device 604, and a processor 606 system/function/module/device. The processor 606 system/function/module/device may use the working memory device 604 to store data that is about to be operated on, being operated on, or was recently operated on. The processor 606 system/function/module/device may store instructions on the working memory device 604 and/or on one or more other memory devices, such as, for example, a non-transient computer readable medium system/function/module/device (hereinafter non-transient computer readable medium 608). When executed by the processor 606, the instructions may cause the processor 606 to perform, for example, the methods described herein, such as methods associated with FIGS. 4, 5 and 7-17.

The device 600 may be implemented with a bus architecture, represented generally by the bus 610. The bus 610 may include any number of interconnecting buses and bridges depending on the specific application of the device 600 and the overall design constraints. The bus 610 may communicatively couple various circuits including one or more processors (represented generally by the processor 606), the working memory device 604, the communication interface 602, and the non-transient computer readable medium 608. The bus 610 may also link various other circuits and devices, such as timing sources, peripherals, voltage regulators, and power management circuits and devices, which are well known in the art, and therefore, are not described any further.

The processor 606 system/function/module/device may be responsible for managing the bus 610 and general processing, including the execution of software stored on the non-transient computer readable medium 608. The software, when executed by the processor 606, causes the processor 606 to perform the various functions described below for any particular apparatus. The non-transient computer readable medium 608 and the working memory device 604 may also be used for storing data that is manipulated by the processor 606 when executing software.

One or more processors, such as processor 606 in the device 600 may execute software. Software may be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a non-transient computer readable medium, such as non-transient computer readable medium 608. Non-transient computer readable medium 608 may include, by way of example, a magnetic storage device (e.g., hard disk, floppy disk, magnetic tape, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EE- PROM), a register, a removable disk, and any other suitable non-transient medium for storing software, date, and/or instructions that may be accessed and read by a computer or the processor 606. Computer readable medium may also include, by way of example, a carrier wave, a transmission line, and any other suitable medium for transmitting software and/or instructions that may be accessed and read by a computer or the processor 606. The non-transient computer readable medium 608 may reside in the device 600, external to the device 600, or distributed across multiple entities including the device 600. The non-transient computer readable medium 608 may be embodied in a computer program product. By way of example, a computer program product may include a computer readable medium in packaging materials. Those skilled in the art will recognize how best to implement the described functionality presented throughout this disclosure depending on the particular application and the overall design constraints imposed on the overall system.

In some aspects of the disclosure, the processor 606 system/function/module/device may include circuitry configured for various functions. For example, the processor 606 may include a web interface 620 system/function/module/device configured to manage web page generation and display and to perform input/output operations associated with access to the Internet web and perform, for example, methods associated with FIGS. 4, 5A, 5B, 8A, 8B, 9, and 10. For example, the processor 606 may include a data storage 622 system/function/module/device configured to store data including data used to populate user profiles and data obtained, for example, temporarily, from a system database. For example, the processor 606 may include an email 628 system/function/module/device configured to configured to serve, for example, email accounts and process email messages. For example, the processor 606 may include a short message service (SMS) 630 system/function/module/device configured to serve, for example, SMS message accounts and process SMS messages. For example, the processor 606 may include a text-to-speech 632 system/function/module/device configured to convert text to speech. For example, the processor 606 may include a phone 634 system/function/module/device configured to serve phone accounts and phone messages. For example, the processor 606 may include a user purchase/renew/repurchase 638 system/function/module/device configured to perform, for example, the methods of FIGS. 8A, 8B, 9, and 10. For example, the processor 606 may include a set/add event criteria 640 system/function/module/device configured to perform, for example, the methods of FIGS. 7A, 7B, 11A, 11B, and 12. For example, the processor 606 may include a cancel, edit, or extend event 642 system/function/module/device configured to perform, for example, the methods of FIGS. 13A and 13B.

In some aspects of the disclosure, non-transient computer readable medium 608 of the device 600 may include instructions that may cause the various systems/functions/modules/devices of the processor 606 to perform aspects of the methods described herein. For example, the non-transient computer readable medium 608 may include web interface instructions 650 corresponding to the web interface 620 system/function/module/device. For example, the non-transient computer readable medium 608 may include a data storage instructions 652 corresponding to the data storage 622 system/function/module/device. For example, the non-transient computer readable medium 608 may include email instructions 658 corresponding to the email 628 system/function/module/device. For example, the non-transient computer readable medium 608 may include SMS 660 instructions corresponding to the SMS 630 system/function/module/device. For example, the non-transient computer readable medium 608 may include text-to-speech instructions 662 corresponding to the text-to-speech 632 system/function/module/device. For example, the non-transient computer readable medium 608 may include phone instructions 664 corresponding to the phone 634 system/function/module/device. For example, the non-transient computer readable medium 608 may include user purchase/renew/repurchase instructions 668 corresponding to the user purchase/renew/repurchase 638 system/function/module/device. For example, the non-transient computer readable medium 608 may include set/add event criteria instructions 670 corresponding to the set/add event criteria 640 system/function/module/device. For example, the non-transient computer readable medium 608 may include cancel event, edit event, or extend event instruction 672 corresponding to the cancel, edit, or extend event 642 system/function/module/device.

Figure 7A:
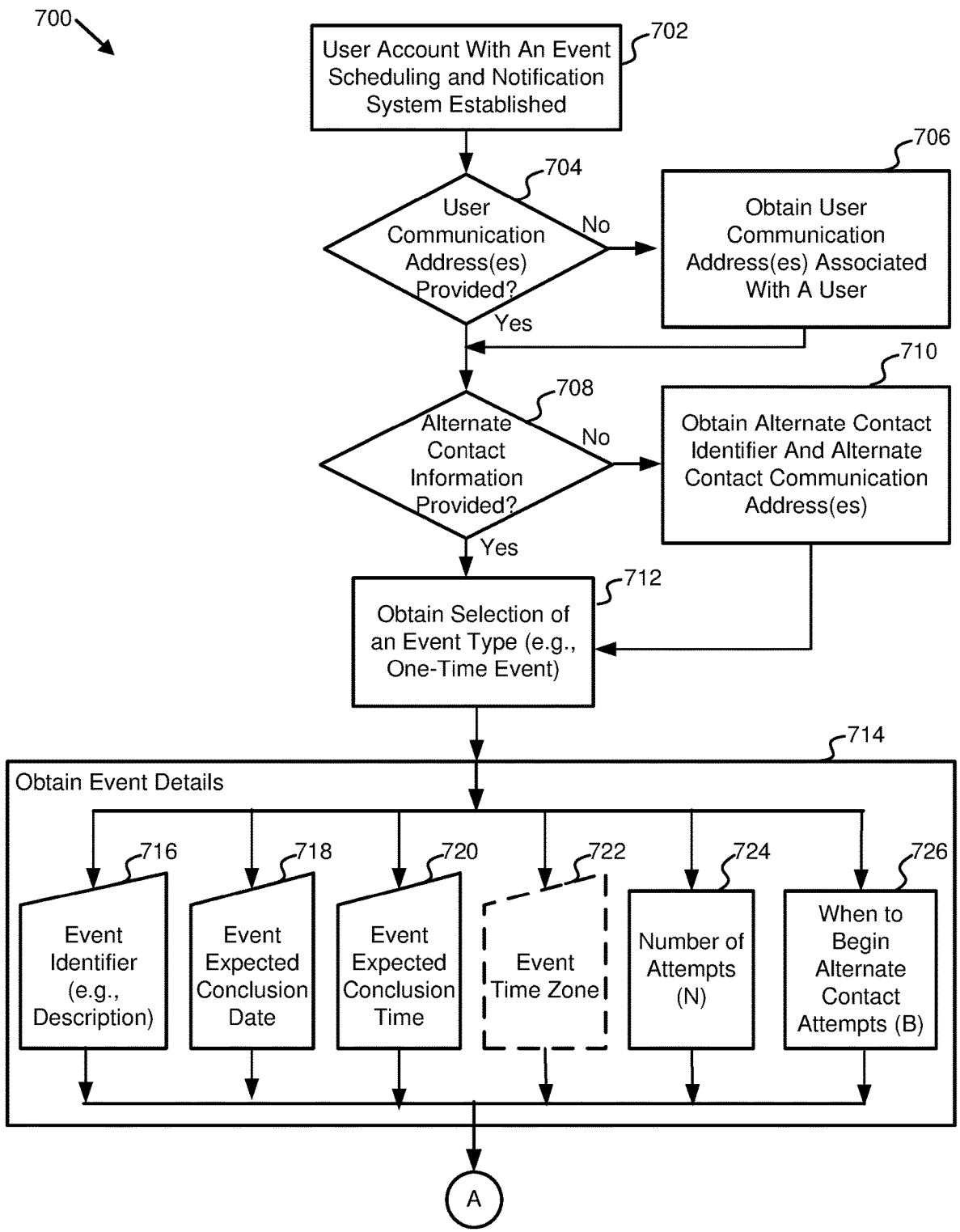
FIG. 7A and FIG. 7B together comprise a flow diagram illustrating an exemplary method, operational at a user device or a server, for receiving user information, alternate contact information, scheduling events and event notifications, and/or sending event notifications in accordance with an embodiment of the present disclosure FIG. 8A and FIG. 8B together comprise a flow diagram illustrating an exemplary method 800, operational at a server, for processing a purchase in accordance with an embodiment of the present disclosure.
Figure 7B:
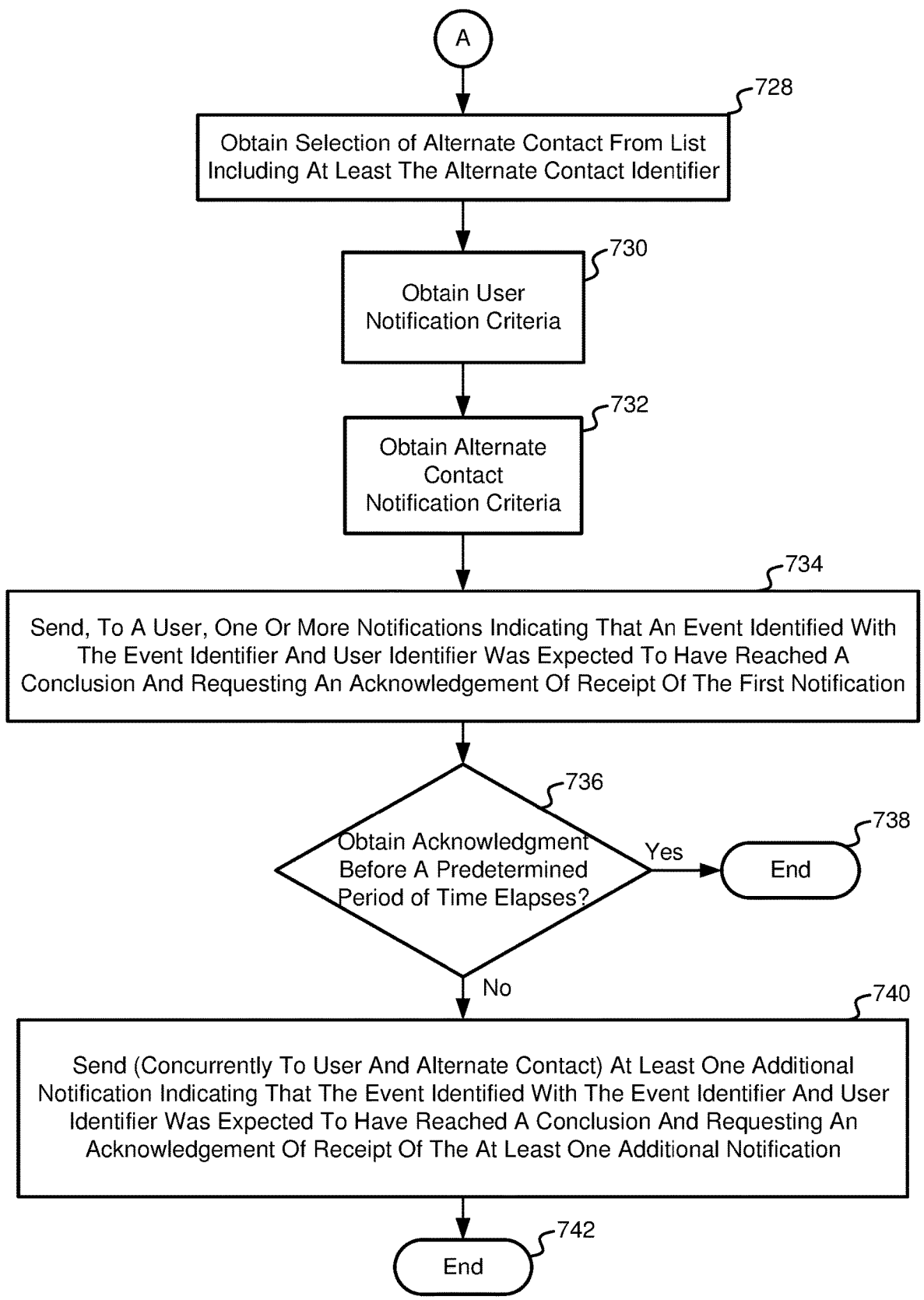

FIG. 7A and FIG. 7B together comprise a flow diagram illustrating an exemplary method 700, operational at a user device or a server, for obtaining user information, alternate contact information, scheduling events and event notifications, and/or sending event notifications in accordance with an embodiment of the present disclosure. The user device (or alternate contact device) may be exemplified by device 600 of FIG. 6. The server may be exemplified by server 300 of FIG. 3.

A user, using a user device, may establish a user account with an event scheduling and notification system 702. The event scheduling and notification system may employ methods, such as methods associated with FIGS. 4, 5 and 7-17, to acquire user information.

According to one embodiment, a determination may be made as to whether one or more user communication address(es), such as, for example, an email address, or a telephone number for an SMS or voice account, were previously provided to (or stored with) the event scheduling and notification system 704. If at least one or more user communication address(es) were not previously provided to (or stored with) the server may obtain one or more user communication address(es) associated with a user 706. Obtaining one or more user communication address(es) associated with a user may be achieved using, for example, aspects described herein.

If at least one or more user communication address(es) were previously provided to (or stored with) the event scheduling and notification system, or if at least one or more user communication address(es) were just obtained, a determination may be made as to whether alternate contact information, such as, for example, an alternate contact identifier and one or more alternate contact communication address(es) associated with the alternate contact identifier were previously provided to (or stored with) the event scheduling and notification system 708.

If an alternate contact identifier and one or more alternate contact communication address(es) associated with the alternate contact identifier were not previously provided to (or stored with) the event scheduling and notification system, the server may obtain an alternate contact identifier and one or more alternate contact communication address(es) associated with the alternate contact identifier 710.

According to some aspects, the one or more user communication address(es) may include at least one of: a first telephone number associated with an audible voice telephone account of the user, a second telephone number associated with a short message service (SMS) account of the user, or an email address associated with an email account of the user. According to some aspects, the one or more alternate contact communication address(es) may include at least one of: a first telephone number associated with an audible voice telephone account of the alternate contact, a second telephone number associated with a short message service (SMS) account of the alternate contact, or an email address associated with an email account of the alternate contact. In some aspects, the alternate contact may be a person, group of persons, or a business entity.

If alternate contact information was previously provided to (or stored with) the event scheduling and notification system, or the device just received the alternate contact identifier and one or more alternate contact communication address(es) associated with the alternate contact identifier, the user may be prompted to select an event type (e.g., one-time event, series event, weekend only event, etc.) from, for example, a list displayed on a display of the user device. Accordingly, the server may obtain an event type from a list of event types 712. Other ways to obtain an event type are within the scope of the disclosure. According to some aspects, the event type may be one of a single event and a serial event.

A user may schedule events which can be one-time or recurring events. Each event may include an identifier (e.g., a description), an expected conclusion date and conclusion time, a designated alternate contact (e.g., an emergency contact), and communication mechanisms (e.g., email, SMS, voice telephone) used to send/receive notifications. The user may select a different time zone for each event as needed. For example, if a user travels from home in New York to California, the user can set the time zone for the California event to California's time zone.

Recurring events may be scheduled, for example, on a daily, weekly, or monthly basis. When setting up recurring events, the user may select when to start and end the recurring event.

Next, for example, the device may display an event detail input screen, or series of screens. The user may be prompted to enter/select event details. The event type may inform pertinent event details. For example, an event expected conclusion date of a one-time type event may be a single value (e.g., one value representing day, month, and year); however, an event expected conclusion date of a series type event may be a series of values (e.g., a series of unique values beginning with, and including, a first event expected conclusion date followed by a series of dates incremented by 7 days and concluding 4 weeks after the first event expected conclusion date).

Accordingly, the server may obtain event details to associate with the event type, including at least an event identifier, an event expected conclusion date, and an event expected conclusion time 714. Obtaining event details to associate with the event type, including at least an event identifier, an event expected conclusion date, and an event expected conclusion time may be achieved, for example, by obtaining such data from a database according to aspects described herein. Event details that a user may enter/select may include, for example, an event identifier, such as an event name (e.g., Marine Corp Marathon), event description (e.g., hiking with Jan and Terry), or a unique alphanumeric number provided/generated by the user, the device, or the event scheduling and notification system. The preceding examples are exemplary and non-limiting. Other event details that the user may enter/select include an event expected conclusion date, an event expected conclusion time, an event time zone (although this detail may be determined by the device, for example, in coordination with a geographic location identification feature that may be native to the device), a number-of-attempts (N) value, which may represent the (maximum) number of times that the event scheduling and notification system sends a notification to the user, a before-last-attempt (B) value, which may identify which attempt before-the-last-attempt (e.g., second from last attempt (B=2), first from or next to last attempt (B=1), with last attempt (B=0)), will the scheduling and notification system first begin to send notifications to both the user communication address(es) and the alternate contact communication address(es). In some embodiments, the server may obtain one or more additional event details including at least one of: an event time zone, a number-of-attempts (N) value, where N corresponds to a number of times that a notification message is to be sent to the user, and N is a positive integer greater than or equal to 2, or a before-last-attempt (B) value, where B identifies with which notification sent to the user should a first notification be concurrently sent to the alternate contact, and $0 \leq B \leq N-2$. Obtaining one or more additional event details may be achieved by obtaining such information from, for example, a database according to aspects described herein.

Accordingly, the server may obtain an event identifier 716, an event expected conclusion date 718, and an event expected conclusion time 720. Optionally, the server may additionally obtain an event time zone 722. The server may additionally obtain a number-of-attempts (N) value 724. The server may additionally obtain a before-last-attempt (B) value 726. In some embodiments, one or more of the event time zone 722, number-of-attempts (N) value 724, and before-last-attempt (B) value 726 may be pre-set and/or derived locally by the device and/or the event scheduling and notification system. Derivation may be based, for example, on other parameters and or default values stored with the device and/or event scheduling and notification system.

The user may also be prompted to select an alternate contact to associate with the event identifier. Accordingly, the server may obtain a selection of an alternate contact, from a list including at least the alternate contact identifier, to associate with the event identifier 728. In some embodiments, a plurality of alternate contact identifiers (having different and/or associated alternate contact communication address(es)) may be presented to a user. In other embodiments, one alternate contact may be provided as a default selection to a user.

The server may prompt the user to provide user notification criteria, which may include, for example, the communication address(es) to be associated with each notification sent to the user (e.g., send first user notification to user's SMS account, send all subsequent notification(s) to user's SMS and email accounts). Accordingly, the server may obtain user notification criteria including at least one user communication address to associate with a notification message to be sent to the user 730. Obtaining user notification criteria including at least one user communication address to associate with a notification message to be sent to the user may be achieved by obtaining such information from the user and/or a database according to aspects described herein, The device may prompt the user to provide alternate contact notification criteria, which may include, for example, the alternate contact communication address(es) to be associated with each notification message sent to the alternate contact (e.g., send all notification messages to alternate contact's SMS and email accounts). Accordingly, the server may obtain alternate contact notification criteria including at least one alternate contact communication address to associate with a notification message to be sent to the alternate contact 732. Obtaining alternate contact notification criteria including at least one alternate contact communication address to associate with a notification message to be sent to the alternate contact may be performed according to aspects described herein.

Subsequent to receipt of all information and successful scheduling of at least one event, the server may send, in accordance with the user notification criteria and the alternate contact notification criteria, at least a first notification message to the user, and if the user does not acknowledge receipt of the first notification message, at least a final notification message to the user and the alternate contact.

In greater detail, the server may send at least one notification to a user (e.g., if the user acknowledges receipt of the at least one notification (e.g., indicating a safe return home after a hike)) or, if the user does not acknowledge receipt of the notification, at least two notifications to the user and one notification to the alternate contact. In some embodiments, the second notification to the user is sent concurrently (or nearly concurrently) with the first notification to the alternate contact. According to some aspects, the server may send, on the event expected conclusion date and on and after the event expected conclusion time, one or more notifications indicating that an event identified with the event identifier and user identifier was expected to have reached a conclusion, and a request of an acknowledgement of receipt of the first notification 734. According to some aspects, the server may send the first notification message on the event expected conclusion date at substantially the event expected conclusion time.

The user may be given a predetermined period of time to respond to the request to send an acknowledgement of receipt of the first notification 736. If the server obtains the acknowledgement of receipt of the first notification before the predetermined period of time elapses, the method may end 738. The sending of the acknowledgement may be indicative of a successful conclusion of the event and/or safe return of the user to a home or other location and there is no need to send additional notifications. If the server does not obtain the acknowledgement of receipt of the first notification before the predetermined period of time elapses, the server may send at least one additional notification indicating that the event identified with the event identifier and user identifier was expected to have reached a conclusion, and request an acknowledgement of receipt of the at least one additional notification 740. The at least one additional notification may be sent concurrently to a user device and an alternate contact device. If, for example, the number-of-attempts value was 2 (N=2) and the before-last-notification value was 0 (B=0), the at least one additional notification sent to the user device would be the second (and final) notification sent to the device, while the notification sent to the alternate contact would be the first (and final) notification sent to the alternate contact. Under such a circumstance, the method would end 742. According to such an aspect, a final notification message may be two notification messages, one each to the user and alternate contact, and the server may send the two notification messages concurrently to the user and the alternate contact. In some aspects, the final notification message is two notification messages, one each to the user and alternate contact. The two notification messages may have different content, that is, the notification message to the user may be different from the notification message to the alternate contact.

Figure 8A:
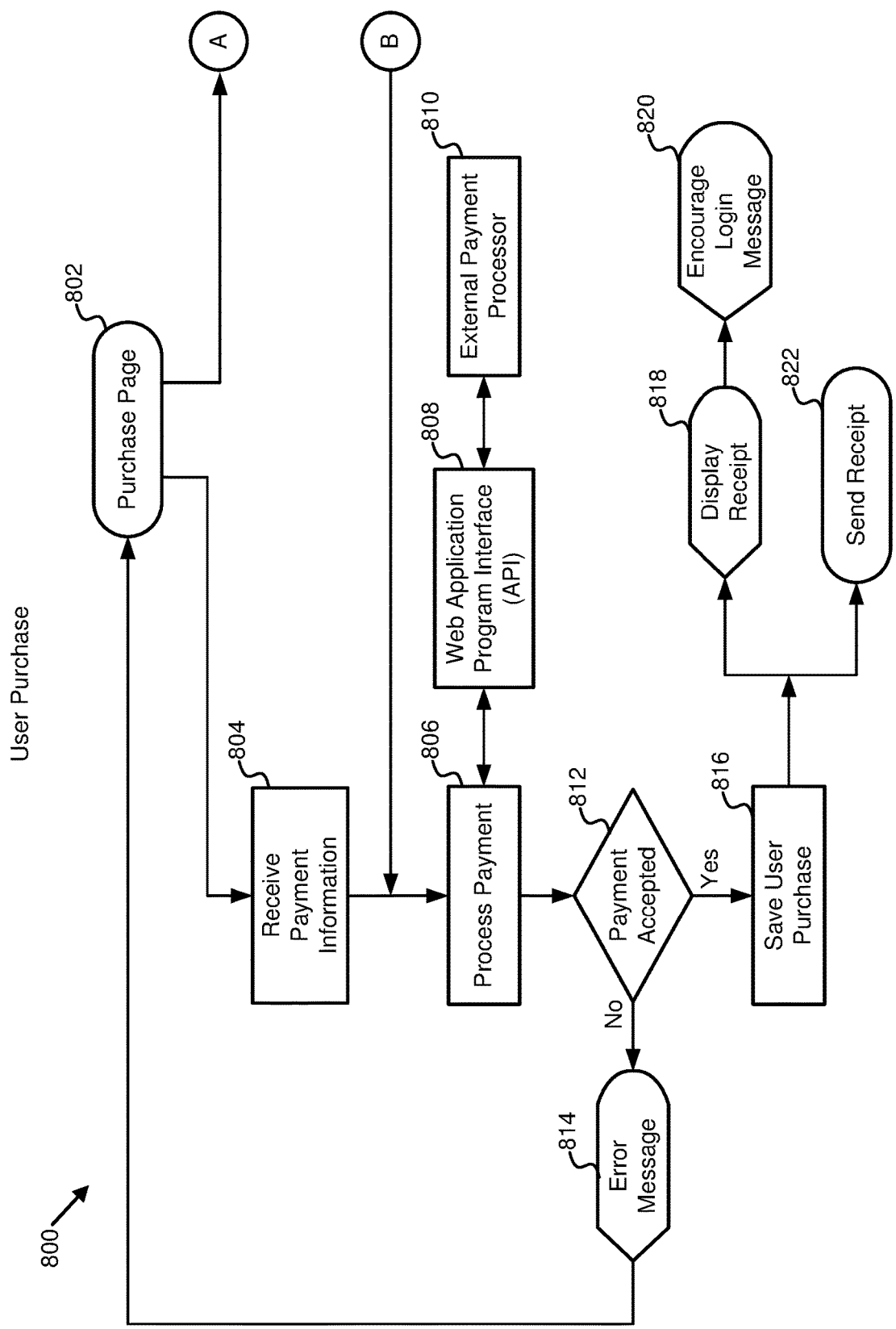
Figure 8B:
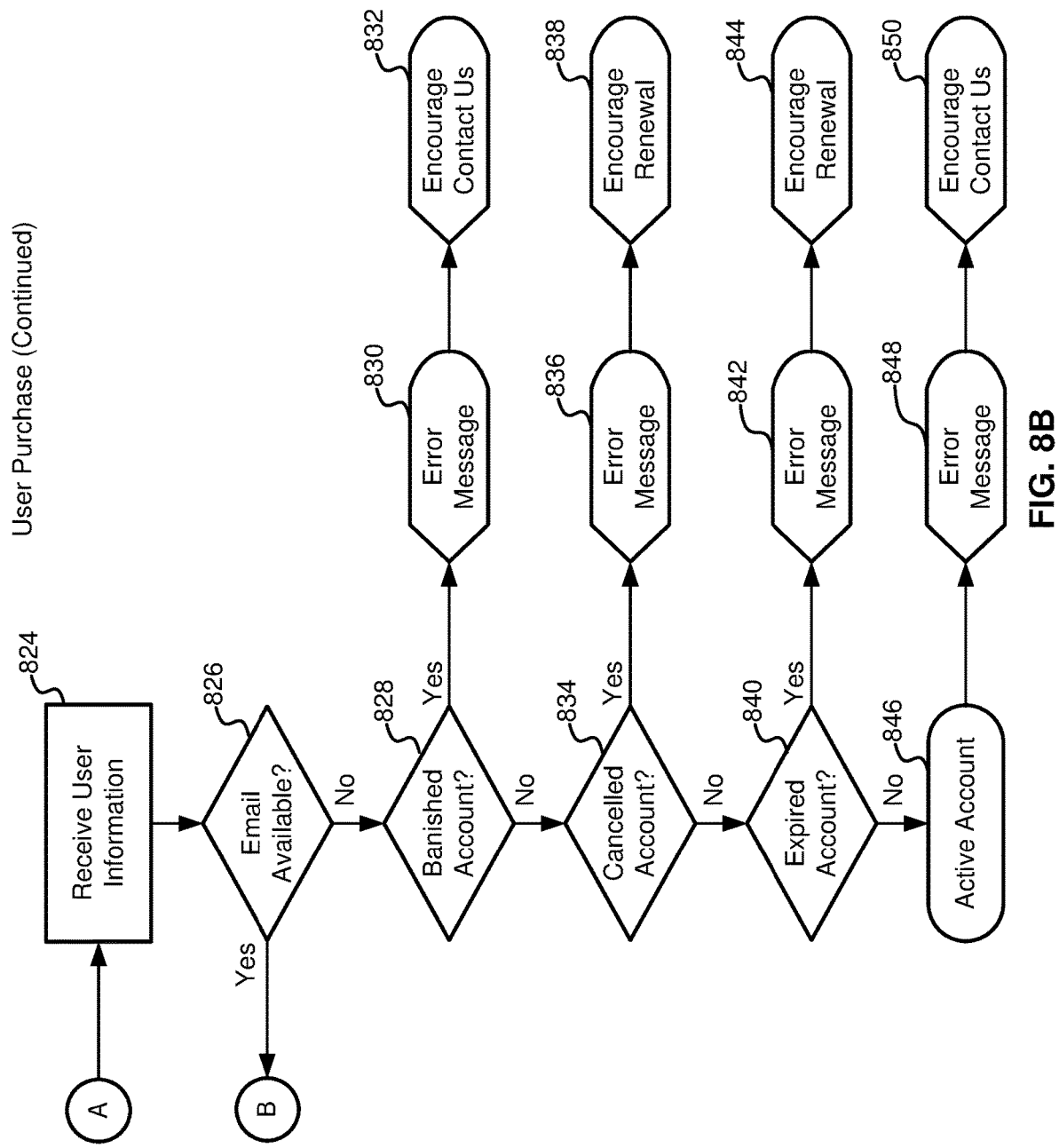

FIG. 8A and FIG. 8B together comprise a flow diagram illustrating an exemplary method 800, operational at server, for processing a purchase in accordance with an embodiment of the present disclosure. According to some embodiments, the server may be configured as an event scheduling and notification system. According to some embodiments, the purchase may be the purchase of a user account, or a new user account.

Embodiments described herein may allow a user to purchase a product, such as a membership, or a new membership, with any email address that has not been previously associated with an active, banished, cancelled, or expired account. When a membership is purchased, the purchase may be saved, and the event scheduling and notification system may generate a text-to-speech version of the user's name. The event scheduling and notification system may save the user's name (e.g., a user identifier) and email address (e.g., a user communication address) in a memory device associated with the event scheduling and notification system. The event scheduling and notification system may save additional information, such as, user password, user time zone, and user state in the memory device. The event scheduling and notification system may also calculate and/or store an expiration date and populate all received/calculated information in a user profile. The user profile may be stored in a database in the memory device. The memory device, or portions of the memory device, may be secure.

According to an exemplary method, the server may present a purchase page 802. The purchase page may be presented, for example, to a user via a user device coupled to the server via a communication network. The server may receive payment information 804 (e.g., from an external merchant processor 122, FIGS. 1 and 222, FIG. 2). The server may process a payment 806. The server may perform payment processing. In some embodiments, an external payment processor 810 may perform payment processing via use of a web application program interface (API) 808. An example of one API is the RESTful Web API.

A determination may be made as to whether payment was accepted 812. If payment was accepted, the server may save the user purchase 816. In connection with saving the user purchase 816, the server may cause a receipt to be displayed on the user device 818. After, or in conjunction with displaying the receipt on the user device 818, the server may cause a login screen to be displayed, or otherwise provide for a login activity on a presently displayed screen. The server may cause a notification message to be displayed, which encourages the user to login 820. After, or in conjunction with displaying the receipt on the user device 818, the server may send an electronic version of the receipt to the user 822. If payment was not accepted, the server may cause an error message to be sent to and displayed by the user's device 814. Thereafter, the method may return to the purchase page 802.

From the purchase page 802 a user may provide user information, such as an email address to the server. The email address may serve as an identifier of a user account. Accordingly, the server may receive user information 824. Exemplary information may include a user name and a user email account. The server may determine if an email address provided by a user is an available email address 826. If the email address is available, the method may return to process a payment 806 (e.g., payment processing). If the email is not available, a series of determinations may be made to determine why the email is not available and various error messages may be provided to a user for informational purposes. For example, if the email is not available, a determination may be made as to whether the email is associated with a banished account 828. If the email is associated with a banished account an error message may be generated 830. The error message may encourage the user to contact a representative of the event scheduling and notification system 832. If the account is not a banished account, a determination may be made as to whether the email is associated with a cancelled account 834. If the email is associated with a cancelled account an error message may be generated 836. The error message may encourage the user to renew the user's account 838. If the account is not a cancelled account, a determination may be made as to whether the email is associated with an expired account 840. If the email is associated with an expired account an error message may be generated 842. The error message may encourage the user to renew the user's account 844. If the account is not an expired account, then the email is associated with an active account 846. If the email is associated with an active account an error message may be generated 848. The error message may encourage the user to contact a representative of the event scheduling and notification system 850.

Figure 9:
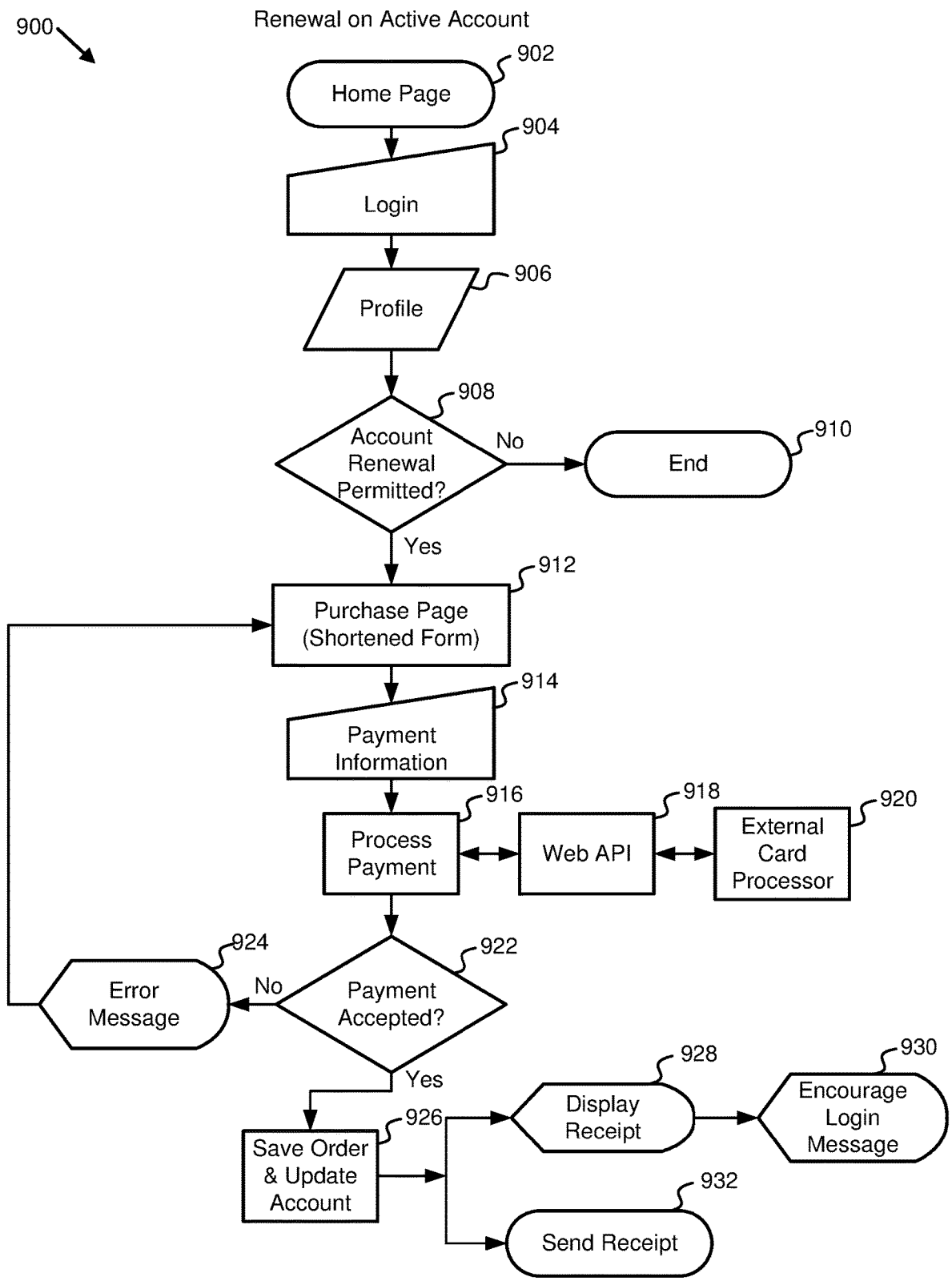
FIG. 9 is a flow diagram illustrating an exemplary method, operational at a server, of renewing an active account in accordance with an embodiment of the present disclosure.
Figure 10:
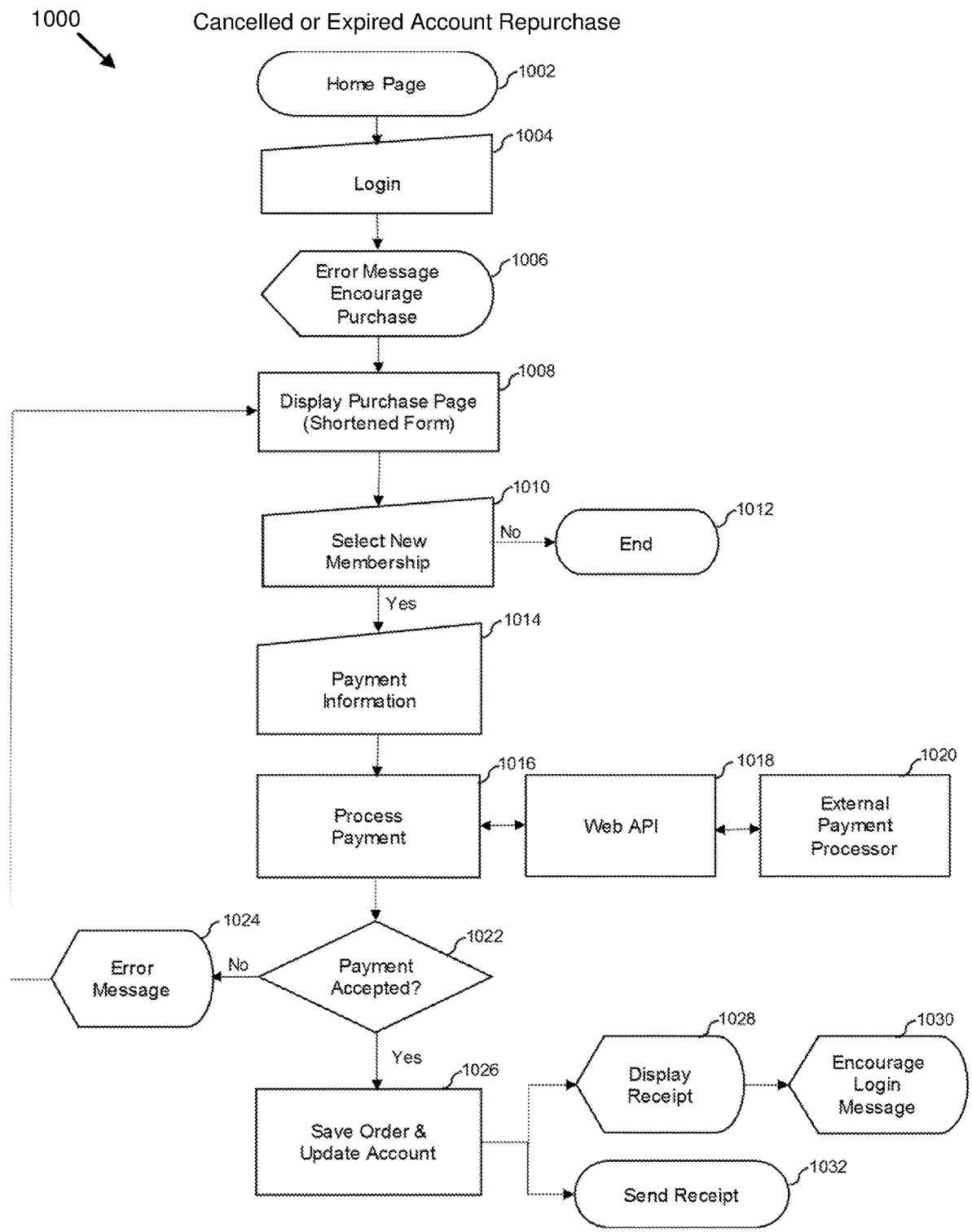
FIG. 10 is a flow diagram illustrating an exemplary method, operational at a server, of repurchasing an account after cancellation or expiry of the account in accordance with an embodiment of the present disclosure.

FIG. 9 is a flow diagram illustrating an exemplary method 900, operational at a server, of renewing an active account in accordance with an embodiment of the present disclosure. FIG. 10 is a flow diagram illustrating an exemplary method 1000, operational at a server, of repurchasing an account after cancellation or expiry of the account in accordance with an embodiment of the present disclosure.

With a renewal from an active account (FIG. 9) or a repurchase from an expired or cancelled account (FIG. 10), when an order is saved the event scheduling and notification system may calculate an expiration date and populate the expiration date in a profile of the user. According to one example, an active account may be renewed within 30 days of the expiration date. A renewal or repurchase may generate a shortened purchase form, as the application has retained the user's profile information, alternative contact(s) information (e.g., emergency contact(s) information) and previously scheduled events that are still pending. If the user has changed the name associated with the account, a new text-to-speech version of the name may be generated. According to one embodiment, credit card information is not retained and must be resubmitted.

After an initial purchase or a repurchase of an account (e.g., a membership subscription), the user may change any information in his/her profile. According to one embodiment, in a profile page, the user may select a preferred method or methods for being contacted, including email, text, and/or phone notifications. The user may also listen to the text-to-speech version of his/her name. According to one embodiment, at any time thereafter when the user's name is changed (e.g., due to marriage or divorce) and new profile information is saved, a text-to-speech version of the user name is created and stored for insertion into an audible voice phone notification. The text-to-speech service is an on-demand task that tells the system to request that the external service generate a new text-to-speech version of any new name or name that has been changed. According to one embodiment, the text-to-speech version of the user name is included in notification(s) sent to the alternate contact.

After purchase or renewal of an account (e.g., a membership), when the user logs in, he/she is taken to a contacts and events page, where the user may then create events. However, according to one embodiment, before an event may be scheduled, the user may create at least one alternate contact (e.g., emergency contact) and designate how to reach the alternate contact via email, text, and/or phone calls. User information (e.g., name, user communication address(es), etc.) and alternate contact information (e.g., name, alternate contact communication address(es)) may be edited at any time.

According to one embodiment, all user information (e.g., user communication address(es), alternate contact information including alternate contact communication address(es), and scheduled events) may be compiled into a database and stored on a data server, such as the local data storage device 114, FIG. 1, the remote data storage device 118, FIG. 1, and/or the database 218, FIG. 2.

Returning now to FIG. 9, a server may send a home page to, and/or may cause a home page to be displayed at, a user device 902. The server may receive login information from the device 904. The server may obtain a user profile, associated with the user being logged in, from a database 906. A determination may be made as to whether the user is permitted to renew the user's account 908. If the user is not permitted to renew the user account, the method may end 910. However, if the user is permitted to renew the user's account, the server may cause a shortened form of a purchase page 912 to be presented to the user on the user's device. According to some embodiments the shortened form may be a complete purchase page where information from a user's account is pre-populated into the purchase page. The server may receive payment information, such as, for example, credit card, debit card, or electronic check information, from the user's device 914. The server may process the payment information 916. For example, according to one embodiment, the server may exchange information with an external payment processor 920 via a web API 918. An example of an external payment processor may be an external merchant processor 122, FIG. 1, and 222, FIG. 2. An example of a web API may be a RESTful web API. A determination may be made as to whether the payment was accepted 922. If payment was not accepted, the server may cause an error message to be displayed on the user's device 924. Thereafter, the method may return to the purchase page 912, where the user may provide new (or corrected) payment information to the server. If payment was accepted, the server may save the purchase (e.g., user order) and update the user's account information (e.g., update profile, update database) 926. In connection with saving the purchase and updating the user's account, 926, the server may cause a receipt to be displayed on the user's device 928. After, or in conjunction with displaying the receipt on the user's device 928, the server may cause a login screen to be displayed, or otherwise provide for a login activity on a presently displayed screen. The server may cause a notification message to be displayed, which encourages the user to login 930. After, or in conjunction with displaying the receipt on the user's device 928, the server may send an electronic version of the receipt to the user 932.

Returning now to FIG. 10, a flow diagram illustrating an exemplary method 1000, operational at a server, of repurchasing an account after cancellation or expiry of the account according to embodiments of the disclosure, a server may send a home page to, and/or may cause a home page to be displayed at, a user device 1002. The server may receive login information from the device 1004. However, the user's attempt to login to a cancelled or expired account may cause the server to cause the user's device to display an error message on the user's device 1006. The error message may, for example, encourage the user to purchase an account. The server may cause a shortened form of the purchase page to be displayed on the user's device 1008.

Selecting a new membership from the purchase form may send a signal indicative of the user's desire to purchase an account to the server 1010. Not selecting a new membership on the purchase form during a predetermined period of time, may send a signal to the server that is indicative of the user's desire not to purchase an account. If a signal is received that is indicative of the user's desire not to purchase an account, the method may end 1012.

According to some embodiments a shortened purchase form may be a displayed on the user's device with the server retaining the user's previous information. The server may receive payment information, such as, for example, credit card, debit card, or electronic check information, from the user's device 1014. The server may process the payment information 1016. For example, according to one embodiment, the server may exchange information with an external payment processor 1020 via a web API 1018. An example of an external payment processor may be an external merchant processor 122, FIG. 1, or 222, FIG. 2. An example of a web API may be a RESTful web API. A determination may be made as to whether the payment was accepted 1022. If payment was not accepted, the server may cause an error message to be displayed on the user's device 1024. Thereafter, the method may return to displaying the purchase page 1008, where the user may provide new (or corrected) payment information to the server. If payment was accepted, the server may save the purchase (e.g., user order) and update the user's account information (e.g., update profile, update database) 1026. In connection with saving the purchase and updating the user's account, 1026, the server may cause a receipt to be displayed on the user's device 1028. After, or in conjunction with displaying the receipt on the user's device 1028, the server may cause a login screen to be displayed, or otherwise provide for a login activity on a presently displayed screen. The server may cause a message to be displayed, which encourages the user to login 1030. After, or in conjunction with displaying the receipt on the user's device 1028, the server may send an electronic version of the receipt to the user 1032.

Figure 11A:
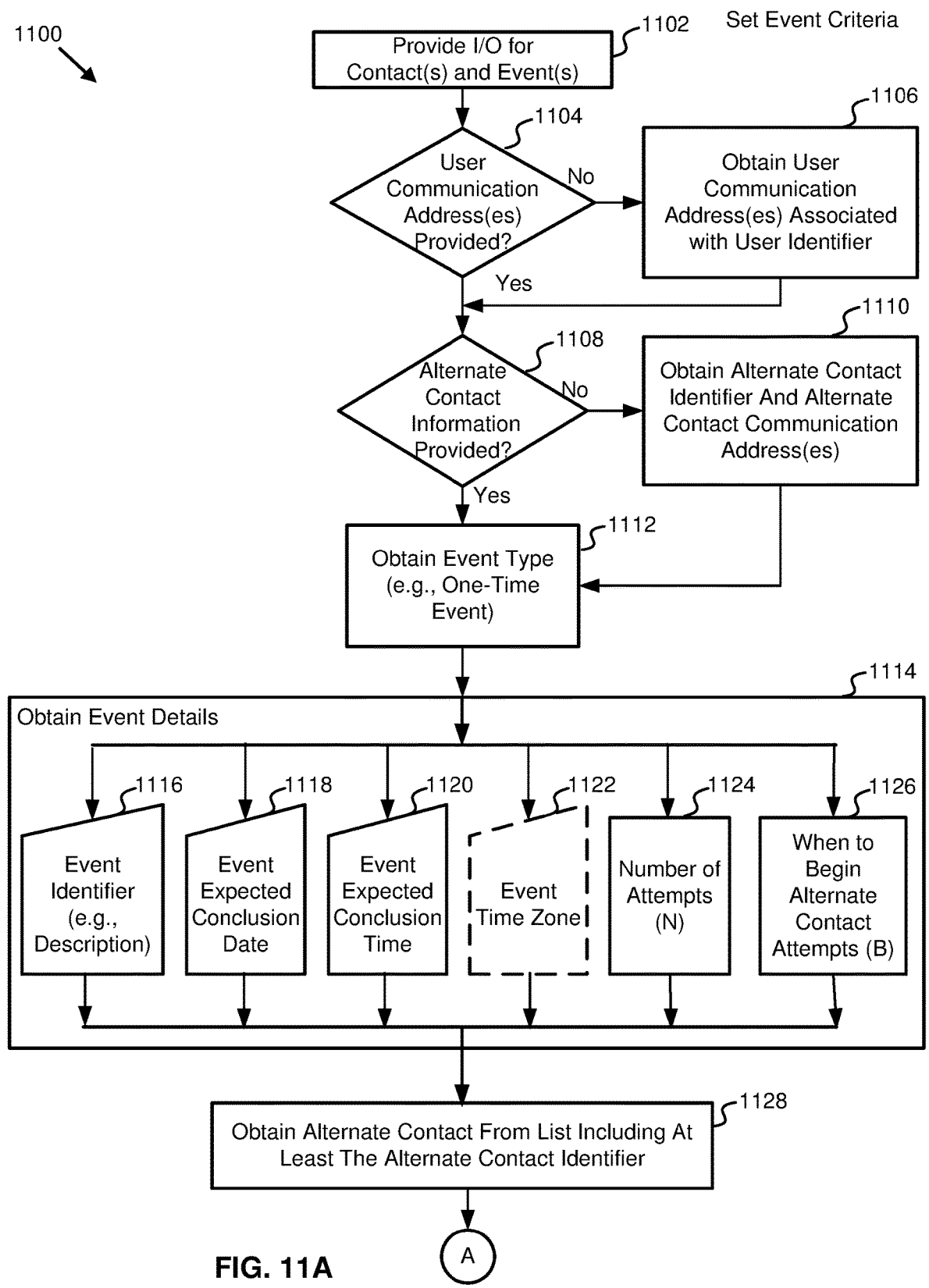
FIG. 11A and FIG. 11B together comprise a flow diagram illustrating an exemplary method, operational at a user device or a server, for receiving user information, alternate contact information, and scheduling events and event notifications in accordance with an embodiment of the present disclosure.
Figure 11B:
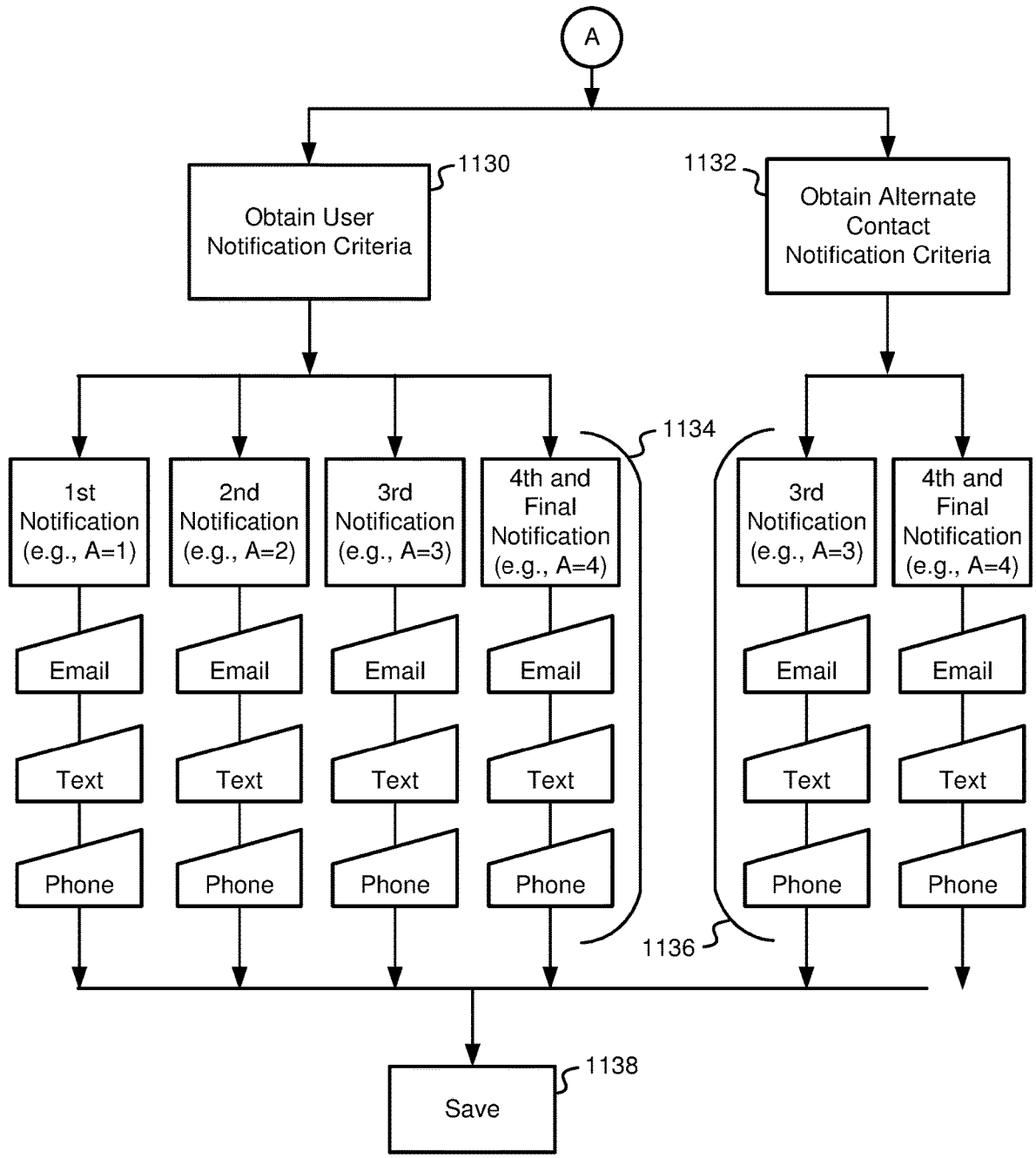

FIG. 11A and FIG. 11B together comprise a flow diagram illustrating an exemplary method 1100, operational at a user device or a server, for entering user information, alternate contact information, and scheduling events and event notifications in accordance with an embodiment of the present disclosure. The user device may be similar to the user devices such as the terminal 102, the wireless cellular phone 104 (e.g., a smart phone), or the personal digital assistant or tablet 106 of FIG. 1, or the devices (e.g., terminal 202, wireless cellular phone 204, personal digital assistant or tablet 206) of FIG. 2. and device 600 of FIG. 6. The server may be similar to, for example, web server 112 of FIG. 1, server 300 of FIG. 3, and/or web application server 213 of FIG. 2. The server may be configured as an event scheduling and notification system/function/module/device, such as, for example, the system 110 of FIG. 1. The user device may be communicatively coupled to the server via one or more communication networks, such as communication network(s) 134 of FIG. 1. A user, using the user device, may establish a user account with an event scheduling and notification system. For ease of reference, a server configured as an event scheduling and notification system and a user device acting as an input/output device communicatively coupled to the server may be collectively or individually referred to herein as the "event scheduling and notification system" or the "system." According to one aspect, a method of obtaining user communication address(es) and alternate contact information, including alternate contact identifier(s) and alternate contact communication address(es) associated with the alternate contact identifier(s) may be provided as illustrated in the exemplary method 1100 of FIG. 11A and FIG. 11B.

According to one embodiment, a web page, or some other data interface mechanism, which is used to enter/update user communication address(es), and alternate contact information, including alternate contact identifier(s) and associated alternate contact communication address(es) may be displayed on a device of a user. Accordingly, the system may provide input/output (I/O) that may be arranged or configured to provide a user interface for contact(s) and event(s) 1102. A server may cause the device to display the web page on the device or the device may display the web page at the request of a user. For ease of explanation, a device being used to receive and/or output information related to an event scheduling and notification system, as well as a server configured as the event scheduling and notification system, may be referred to herein as "the event scheduling and notification system" or the "system."

A determination may be made as to whether one or more user communication address(es), such as, for example, an email address, or a telephone number for an SMS or voice account, were previously provided to (or stored with) the event scheduling and notification system 1104. If at least one or more user communication address(es) were not previously provided to (or stored with) the event scheduling and notification system 1104 (negative branch), the user may enter such information to the system (e.g., via the device). The system may obtain one or more user communication address(es) associated with a user identifier of the user 1106.

If at least one or more user communication address(es) were previously provided to (or stored with) the event scheduling and notification system 1104 (affirmative branch), or the system (e.g., via the device) has obtained one or more user communication address(es) associated with a user identifier of the user 1106, a determination may be made as to whether alternate contact information, such as, for example, an alternate contact identifier and one or more alternate contact communication address(es) such as, for example, an email address, or a telephone number for an SMS or voice account, were previously provided to (or stored with) the event scheduling and notification system 1108. If alternate contact information was not previously provided to (or stored with) the event scheduling and notification system 1108 (negative branch), the user may enter such information to the system (e.g., via the device). The system may obtain an alternate contact identifier and one or more alternate contact communication address(es) associated with the alternate contact identifier 1110.

If alternate contact information was previously provided to (or stored with) the event scheduling and notification system 1108 (affirmative branch), or the system (e.g., via the device) has obtained the alternate contact identifier and one or more alternate contact communication address(es) associated with the alternate contact identifier 1110, the user may be prompted to select an event type (e.g., one-time event, series event, weekend only event, etc.) from, for example, a list displayed on a display of the device. Accordingly, the system (e.g., via the device) may obtain an event type 1112, which may be selected by the user. Other ways of obtaining an event type are within the scope of the disclosure.

A user may schedule events which can be one-time or recurring. Each event may include an identifier (e.g., a description), an expected conclusion date and conclusion time, a designated alternate contact (e.g., an emergency contact), and communication methods (e.g., email, SMS, voice telephone) used to send/receive notifications. The user may select a different time zone for each event as needed. For example, if a user travels from home in New York to California, the user can set the time zone for the California event to California's time zone.

Recurring events may be scheduled, for example, on a daily, weekly, or monthly basis. When setting up recurring events, the user may select when to start and end the recurring event.

Next, for example, the system may cause the device (or some other input/output device used by the system) to display an event detail input screen, or series of screens. The user may be prompted to enter/select event details. The event details that may be pertinent may be informed by the event type. For example, an event expected conclusion date of a one-time type event may be a single value (e.g., one value representing day, month, and year); however, an event expected conclusion date of a series-type event may be a series of values (e.g., a series of unique values beginning with, and including, a first event expected conclusion date followed by a series of dates incremented by 7 days and concluding 4 weeks after the first event expected conclusion date). Accordingly, the system (e.g., via the device) may obtain event details 1114. Event details that a user may enter/select may include, for example, an event identifier, such as an event name (e.g., Mother's Birthday Party), event description (e.g., hiking with Jan and Terry), or a unique alphanumeric number provided/generated by the user, the device, or the event scheduling and notification system (e.g., Event-2018-32). The preceding examples are exemplary and non-limiting. Other event details that the user may enter/select include an event expected conclusion date, an event expected conclusion time, an event time zone (although this detail may be determined by the device, for example, in coordination with a geographic location identification feature that may be native to the device), a number-of-attempts (N) value, which may represent the (maximum) number of times that the event scheduling and notification system sends a notification to the user, a before-last-attempt (B) value, which may identify which attempt before-the-last-attempt (e.g., second from last attempt (B=2), first from or next to last attempt (B=1), with last attempt (B=0)), will the scheduling and notification system first begin to send notifications to both the user communication address(es) and the alternate contact communication address(es).

Accordingly, the system (e.g., via the device) may receive an event identifier 1116, an event expected conclusion date 1118, and an event expected conclusion time 1120. Optionally, the system (e.g., via the device) may additionally receive an event time zone 1122. The system (e.g., via the device) may additionally receive a number-of-attempts (N) value 1124. The system (e.g., via the device) may additionally receive a before-last-attempt (B) value 1126. The before-last-attempt (B) value may be used to identify when the system may begin sending its alternate contact attempts (e.g., attempts to reach the alternate contact). In some embodiments, one or more of the event time zone 1122, number-of-attempts (N) value 1124, and before-last-attempt (B) value 1126 may be pre-set and/or derived locally by the system (e.g., the device and/or server configured as the event scheduling and notification system). Derivation may be based, for example, on other parameters and or default values stored with the system.

The user may also be prompted to select an alternate contact to associate with the event identifier. Accordingly, the system (e.g., via the device) may obtain an alternate contact from a list including at least the alternate contact identifier 1128. In some embodiments, a plurality of alternate contact identifiers (having different and/or associated alternate contact communication address(es)) may be presented to a user. In other embodiments, one alternate contact may be provided as a default selection to a user.

The system (e.g., via the device) may prompt the user to provide user notification criteria, which may include, for example, the communication address(es) to be associated with each notification sent to the user (e.g., send first user notification to a user's SMS account address, send all subsequent notification(s) to the user's SMS account address and email account address and/or other communication addresses). The communication address(es) may reflect the various methods of communication, for example SMS and email, which can be used for communication of notifications to the user. Accordingly, the system may obtain user notification criteria 1130. A user notification criteria data matrix 1134 illustrates some of the parameters that may be selected for the user notification criteria.

The system (e.g., via the device) may prompt the user to provide alternate contact notification criteria, which may include, for example, the alternate contact communication address(es) to be associated with each notification message sent to an alternate contact (e.g., send all notification messages to the alternate contact's SMS account address and email account address and/or other communication addresses). The communication address(es) may reflect the various methods of communication, for example SMS and email, which can be used for communication of notifications to one or more of the user's alternate contacts. Accordingly, the system may obtain alternate contact notification criteria 1132. An alternate contact notification criteria data matrix 1136 illustrates some of the parameters that may be selected for the alternate contact notification criteria. The user notification criteria, alternate contact notification criteria, user notification criteria data matrix, and alternate contact notification criteria data matrix may be saved 1138.

Figure 12:
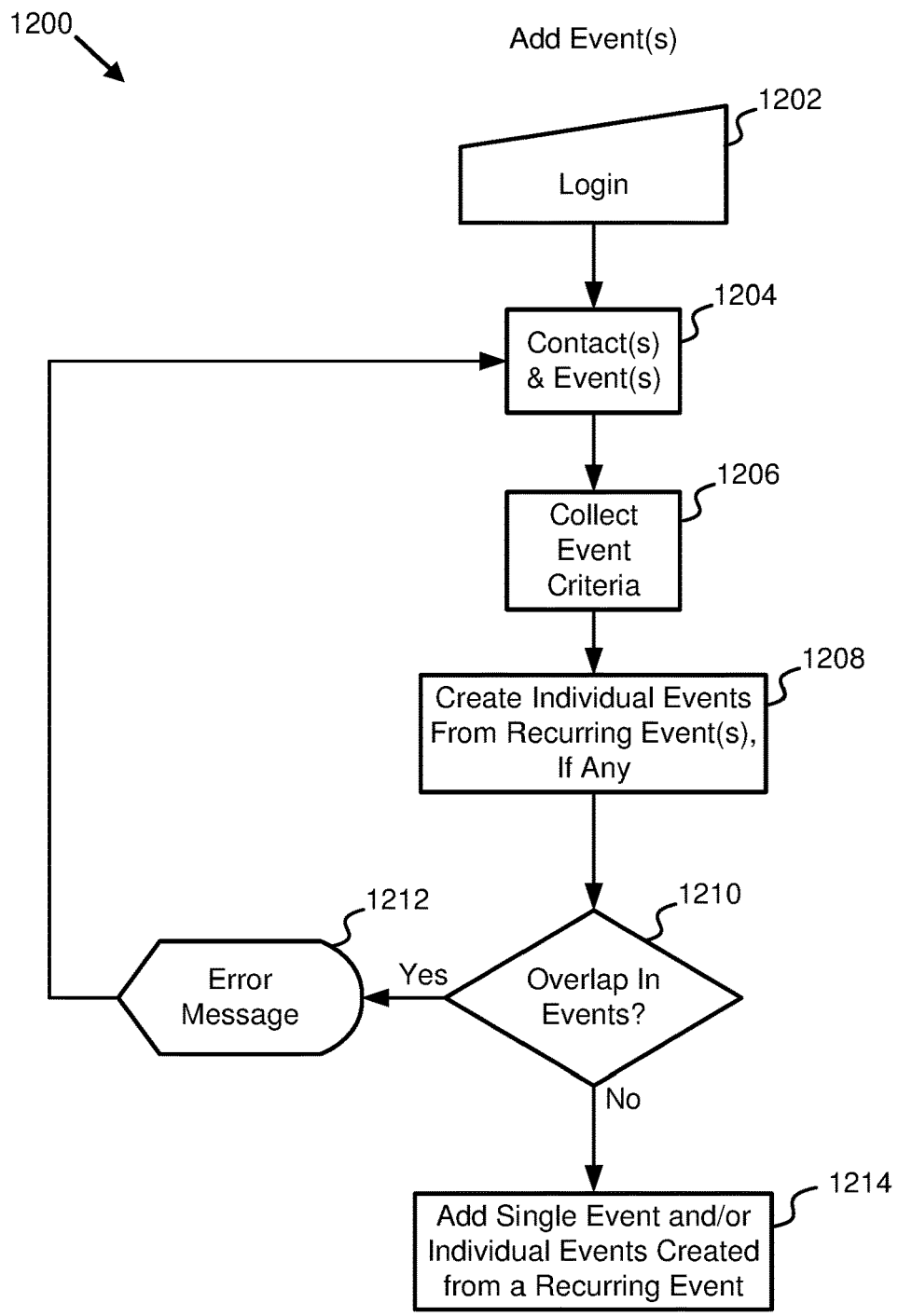
FIG. 12 is a flow diagram illustrating an exemplary method, operational at a user device or a server, for scheduling events (e.g., adding events with associated event criteria), in accordance with an embodiment of the present disclosure.

FIG. 12 is a flow diagram illustrating an exemplary method 1200, operational at a user device or a server, for scheduling events (e.g., adding events with associated event criteria), in accordance with an embodiment of the present disclosure. The user device may be similar to the user devices such as the terminal 102, the wireless cellular phone 104 (e.g., a smart phone), or the personal digital assistant or tablet 106 of FIG. 1, or the devices (e.g., terminal 202, wireless cellular phone 204, personal digital assistant or tablet 206) of FIG. 2, and device 600 of FIG. 6. The server may be similar to, for example, web server 112 of FIG. 1, web application server 213 of FIG. 2 and/or server 300 of FIG. 3. The server may be configured as an event scheduling and notification system/function/module/device, such as, for example, the system 110 of FIG. 1. The user device may be communicatively coupled to the server via one or more communication networks, such as communication network(s) 134 of FIG. 1. A user, using the user device, may establish a user account with an event scheduling and notification system. For ease of reference, a server configured as an event scheduling and notification system and a user device acting as an input/output device communicatively coupled to the server may be collectively or individually referred to herein as the "event scheduling and notification server" or the "server." According to one aspect, a method of scheduling events (e.g., adding events with associated event criteria), may be provided as illustrated in the exemplary method 1200 of FIG. 12.

The server may receive login information from a user (e.g., via a user device) and successfully log the user into the system 1202. The system may perform actions consistent with the exemplary method 1200 of FIG. 12 including providing input/output (I/O) for contact(s) and event(s) 1204. The system may collect event criteria 1206.

When a user saves an event, the system collects the event criteria and, if there are any recurring events, the system creates individual events from the recurring events 1208. According to some embodiments this may be performed by an event iterator (not shown) and the creation of the individual events may be referred to as unwinding the event iterator.

A determination may be made as to whether any events scheduled by a user overlap 1210. If there is an overlap in events, an error message may be displayed 1212. The system may then return to providing input/output (I/O) for contact(s) and event(s) 1204. If there is an overlap in scheduled events, the system keeps the original scheduled event and does not save the new overlapping event. The user may be prompted to review the scheduled events to eliminate the overlap or choose which event to retain. If the events do not overlap, the single event and/or individual events created from a recurring event may be added 1214.

Figure 13A:
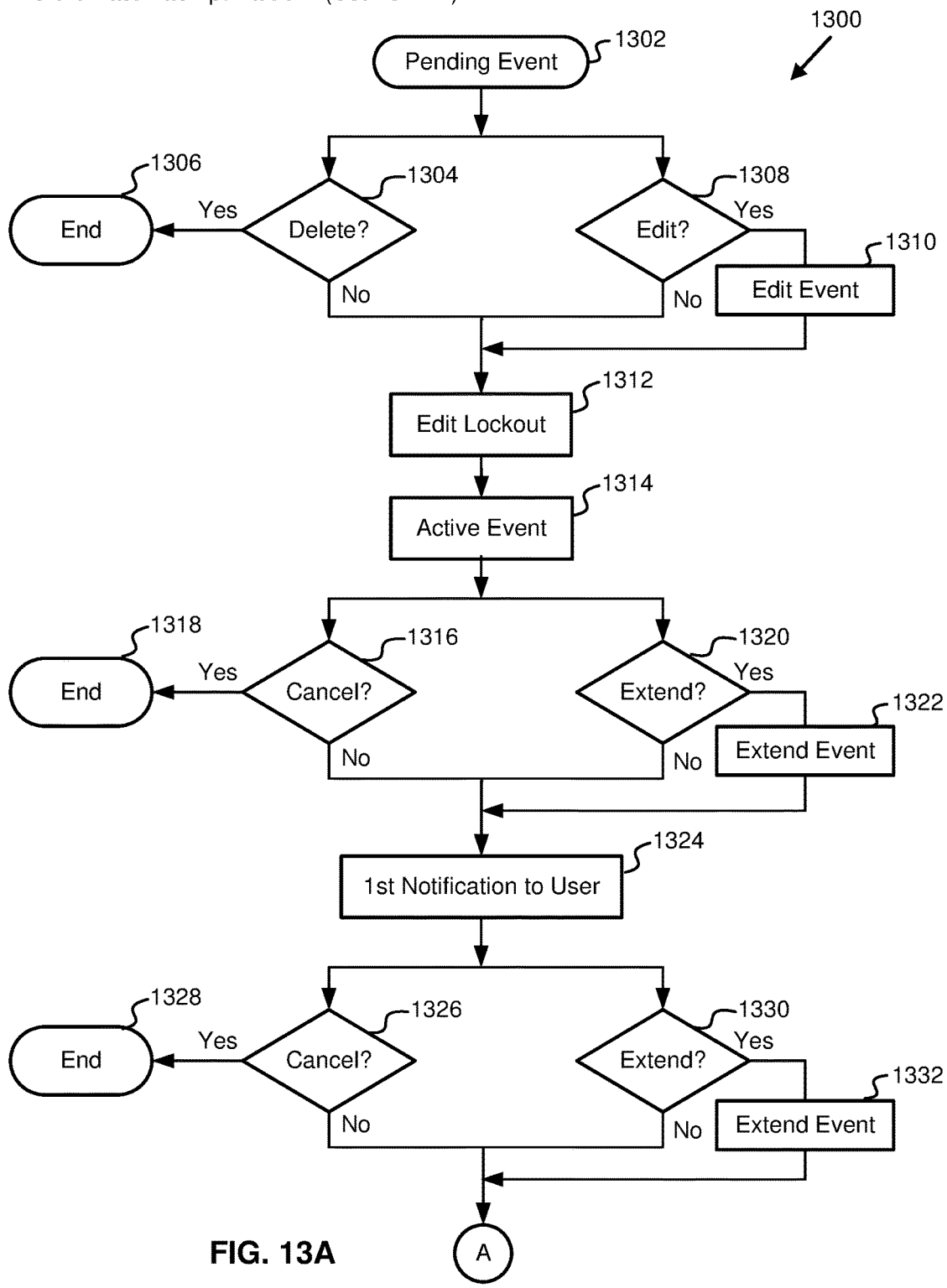
FIG. 13A and FIG. 13B together comprise a flow diagram illustrating an exemplary method, operational at a user device or a server, for canceling, editing, and/or extending events in accordance with an embodiment of the present disclosure.
Figure 13B:
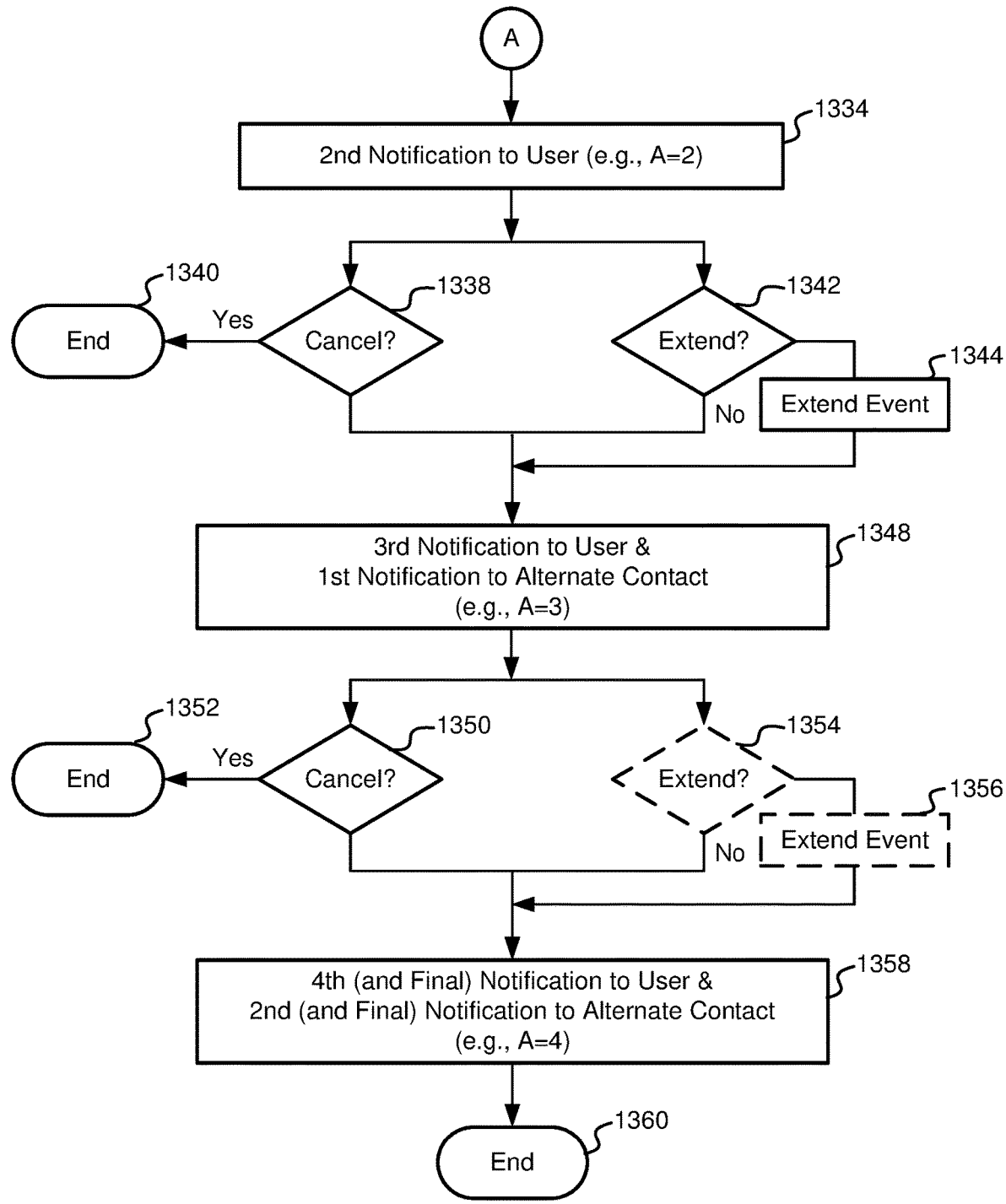

FIG. 13A and FIG. 13B together comprise a flow diagram illustrating an exemplary method 1300, operational at a user device or a server, for canceling, editing, and/or extending events in accordance with an embodiment of the present disclosure. The user device may be similar to the user devices such as the terminal 102, the wireless cellular phone 104 (e.g., a smart phone), or the personal digital assistant or tablet 106 of FIG. 1, or the devices (e.g., terminal 202, wireless cellular phone 204, personal digital assistant or tablet 206) of FIG. 2. and device 600 of FIG. 6. The server may be similar to, for example, web server 112 of FIG. 1, server 300 of FIG. 3, and/or web application server 213 of FIG. 2. The server may be configured as an event scheduling and notification system/function/module/device, such as, for example, the system 110 of FIG. 1. The user device may be communicatively coupled to the server via one or more communication networks, such as communication network(s) 134 of FIG. 1. A user, using the user device, may establish a user account with an event scheduling and notification system. For ease of reference, a server configured as an event scheduling and notification system and a user device acting as an input/output device communicatively coupled to the server may be collectively or individually referred to herein as the "event scheduling and notification system" or the "system." According to one aspect, a method of canceling, editing, and/or extending events may be provided as illustrated in the exemplary method 1300 of FIG. 13A and FIG. 13B.

According to one embodiment, once a user creates an event, the event may be edited up to some predetermined period of time (e.g., one minute) before the pending event becomes an active event. (If the pending event is deleted prior to becoming active, the process ends.) The definition of an active event is when the expected conclusion time occurs. Once the event becomes active, it may be extended up to some predetermined period of time (e.g., one minute) prior to the next to last notification is sent to the user and/or prior to the first notification is sent to the alternate contact (e.g., emergency contact). The event may be extended for a period of time either selected by the user or dictated by the system. In one embodiment, the event may be extended in increments of one, two, and four hours. The user may cancel an active event up to some predetermined period of time (e.g., one minute) before the final notifications are sent to the user and alternate contact communication address(es).

According to one embodiment, a pending event may be considered 1302. Concurrent determinations may be made as to whether the system should delete the event 1304 or edit the event 1308. If the system is directed (e.g., via a user input received by the system) to delete the event, the event may be deleted, and the method may end 1306. If, however, the system is directed (e.g., via a user input received by the system) to edit the event, the event may be edited 1310. If the system is directed (e.g., via a user input received by the system) to not delete the event and/or to not edit the event, and/or after the event is edited, the event may be considered for an event edit lockout 1312 (where the user or the system may prevent further edits to the event).

A pending event becomes an active event when the event expected conclusion time is reached 1314. Once the event first becomes active, a user may either cancel or extend the event up until some predetermined period of time prior to sending the first event notification to the user. Accordingly, concurrent determinations may be made as to whether the user cancels the event 1316 and/or extends the event 1320. If the system is directed (e.g., via a user input received by the system) to cancel the event, the event may be deleted, and the method may end 1318. If, however, the system is directed (e.g., via a user input received by the system) to extend the event, the system extends the event 1320. If the system is directed (e.g., via a user input received by the system) to not cancel the event and/or to not extend the event, and/or after the event is extended, the first notification may be sent to the user 1324.

In the exemplary method of FIG. 13A and FIG. 13B, the exemplary notification sequence conditions are set as follows. A total of four notifications are sent to the user. Accordingly, as exemplified in FIG. 4 and its associated text, the number-of-attempts (N) value is set to four, i.e., N=4. Additionally, in the exemplary method of FIG. 13A and FIG. 13B, a first notification is sent to the alternate contact one notification prior to the last notification sent to the user. Accordingly, as exemplified in FIG. 4 and its associated text, the before-last-attempts (B) value is set to 1, i.e., B=1. A fewer or greater number of notifications may be sent to the user, and a first notification can begin earlier or later, all within the ranges presented in connection with the exemplary method of FIG. 4. These values, N and/or B, may be predetermined and fixed in the system and/or these values N and/or B may be negotiated between the user and the system. For example, a user may pay an additional amount of money to have additional notifications with the first notification being sent to the alternate contact concurrently with the second notification being sent to the user.

The user may either cancel or extend the event up until some predetermined period of time prior to sending the next event notification to the user. Accordingly, concurrent determinations may be made as to whether the user cancels the event 1326 and/or extends the event 1330. If the system is directed (e.g., via a user input received by the system) to cancel the event, the event may be deleted, and the method may end 1328. If, however, the system is directed (e.g., via a user input received by the system) to extend the event, the event may be extended 1332. If the system is directed (e.g., via a user input received by the system) to not cancel the event and/or to not extend the event, and/or after the event is extended, the next notification may be sent to the user 1334. In the exemplary method 1300, this next notification is the second notification that is sent to the user 1334.

This sequence can be iterated in accordance with the notification sequence conditions. For example, the user may either cancel or extend the event up until some predetermined period of time prior to sending the next event notification to the user. Accordingly, concurrent determinations may be made as to whether the user cancels the event 1338 and/or extends the event 1342. If the system is directed (e.g., via a user input received by the system) to cancel the event, the event may be deleted, and the method may end 1340. If, however, the system is directed (e.g., via a user input received by the system) to extend the event, the event may be extended 1344. If the system is directed (e.g., via a user input received by the system) to not cancel the event and/or to not extend the event, and/or after the event is extended, the next notification may be sent to the user. In the exemplary method 1300, this next notification is the third notification that is sent to the user 1348, and, a first notification is sent to the alternate contact concurrently with the third notification being sent to the user 1348.

Eventually a final notification will be sent to the user and the alternate contact. For example, the user may either cancel or extend the event up until some predetermined period of time prior to sending the next (and final) event notification to the user. Accordingly, concurrent determinations may be made as to whether the user cancels the event 1350 and/or optionally extends the event 1354. If the system is directed (e.g., via a user input received by the system) to cancel the event, the event may be deleted, and the method may end 1352. If, however, the system is directed (e.g., via a user input received by the system) to optionally extend the event, the event may be extended 1356. If the system is directed (e.g., via a user input received by the system) to not cancel the event and/or to not extend the event, and/or after the event is extended, the next (and final) notification may be sent to the user. In the exemplary method 1300, this next (and final) notification is the fourth notification that is sent to the user, and, a second (and final) notification is sent to the alternate contact concurrently with the fourth (and final) notification being sent to the user 1358. Thereafter, the method may end 1360.

Figure 14A:
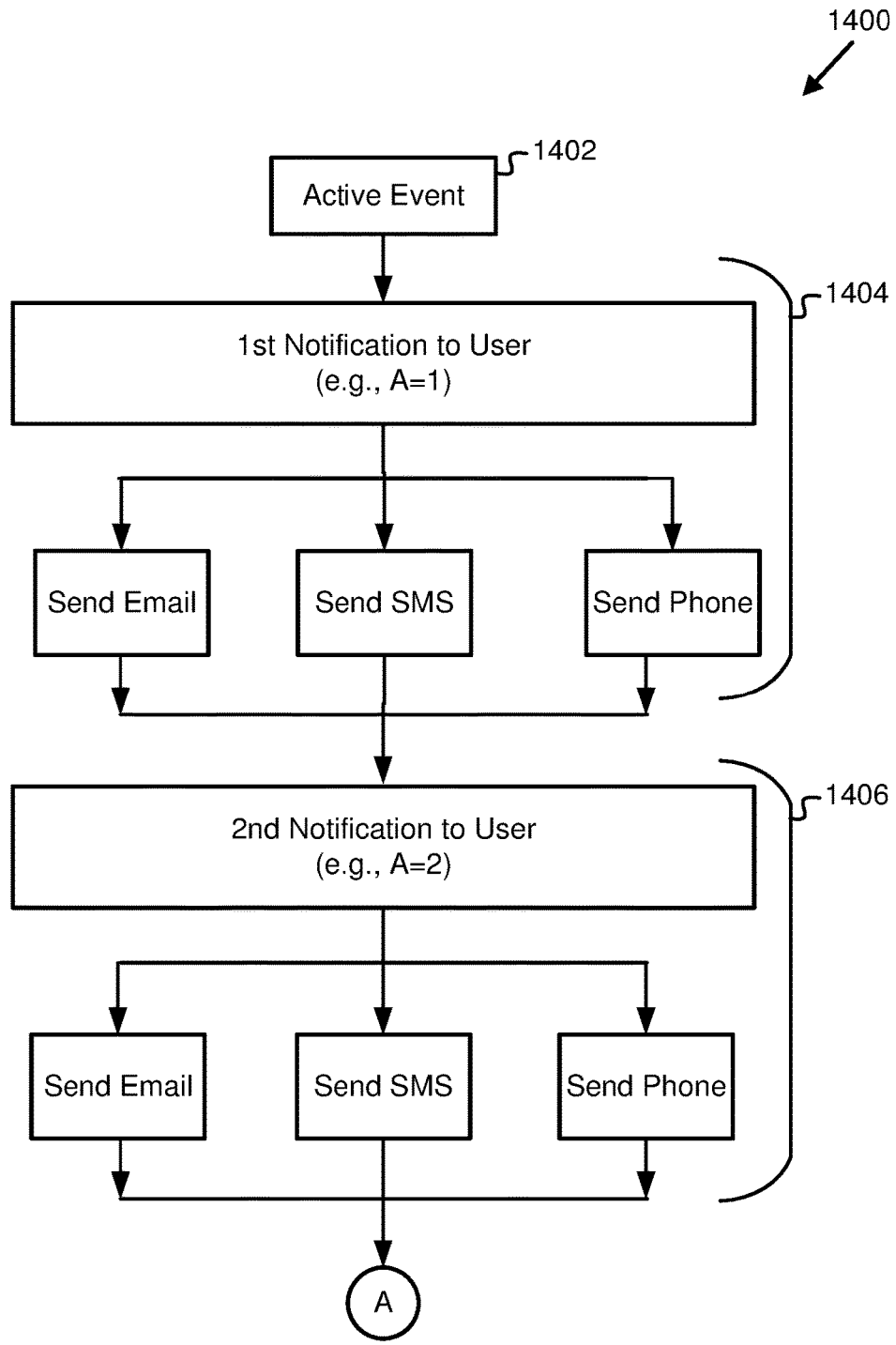
FIG. 14A and FIG. 14B together comprise a flow diagram illustrating an exemplary method, operational at a user device or a server, for a notification sequence (e.g., alert sequence) in accordance with an embodiment of the present disclosure.
Figure 14B:
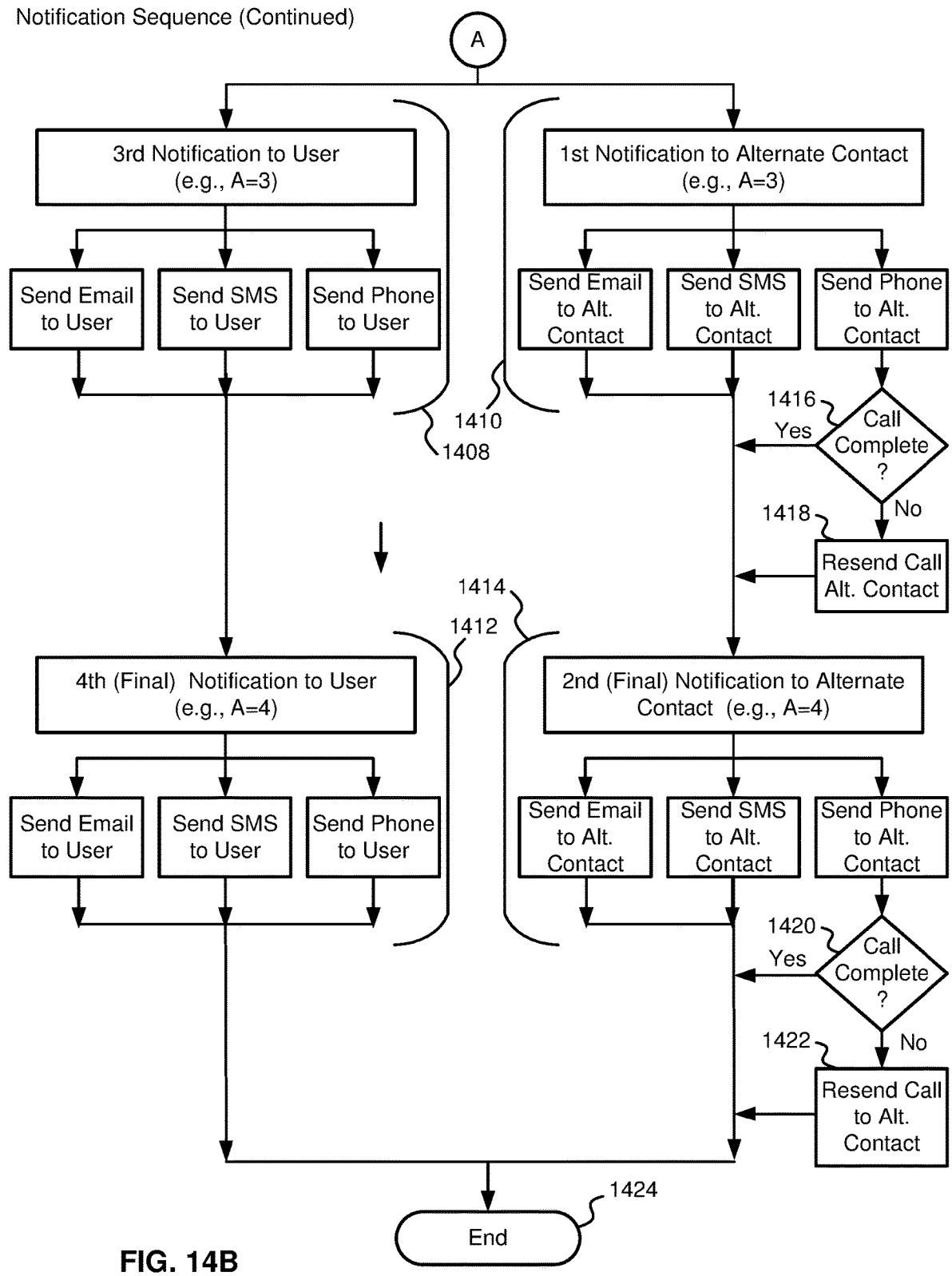

FIG. 14A and FIG. 14B together comprise a flow diagram illustrating an exemplary method 1400, operational at a user device or a server, for a notification sequence (e.g., alert sequence) in accordance with an embodiment of the present disclosure. The user device may be similar to the user devices such as the terminal 102, the wireless cellular phone 104 (e.g., a smart phone), the personal digital assistant or tablet 106, and the wired phone 108 of FIG. 1, the devices (e.g., terminal 202, wireless cellular phone 204, personal digital assistant or tablet 206) of FIG. 2. and device 600 of FIG. 6. The server may be similar to, for example, web server 112 of FIG. 1, server 300 of FIG. 3, and/or web application server 213 of FIG. 2. The server may be configured as an event scheduling and notification system/function/module/device, such as, for example, the system 110 of FIG. 1. The user device may be communicatively coupled to the server via one or more communication networks, such as communication network(s) 134 of FIG. 1. A user, using the user device, may establish a user account with an event scheduling and notification system. For ease of reference, a server configured as an event scheduling and notification system and a user device acting as an input/output device communicatively coupled to the server may be collectively or individually referred to herein as the "event scheduling and notification system" or the "system." According to one aspect, a method of providing a notification sequence is illustrated in the exemplary method 1400 of FIG. 14A and FIG. 14B.

At predetermined intervals of time (e.g., every several minutes, every few minutes) the system (e.g., system application) generates a scheduled task to determine if and when to start a notification sequence. Once an event becomes active 1402, the system automatically sends a first notification to the user 1404. According to the exemplary sequence conditions established for the exemplary method 1400 (i.e., N=4, B=1) the system automatically sends a second notification to the user 1406. Still further according to the exemplary sequence conditions established for the exemplary method 1400 the system automatically sends a third notification to the user 1408 concurrently with a first notification to the alternate contact 1410. As graphically depicted, services (e.g., outside services) are utilized to send email, text, and phone calls simultaneously. When a phone (voice account) is used to send a notification to the alternate contact, the system may determine if the call was completed 1416. If it is determined that the call was not completed, the call is resent to the alternate contact 1418. As depicted, the determination of whether the call was completed 1420 and resending the call to the alternate contact if the call was not completed 1422 may be repeated in the second (and final) notification sent to alternate contact 1414. In the exemplary method 1400, the user receives up to twelve alert notifications (four each of three methods of communication). In the exemplary method 1400, the alternate contact (e.g., emergency contact) receives up to eight notifications (two each of three methods of communication plus two additional phone calls if necessary). Once the final notifications are sent to the user and the alternate contact, the method may end 1424.

Figure 15:
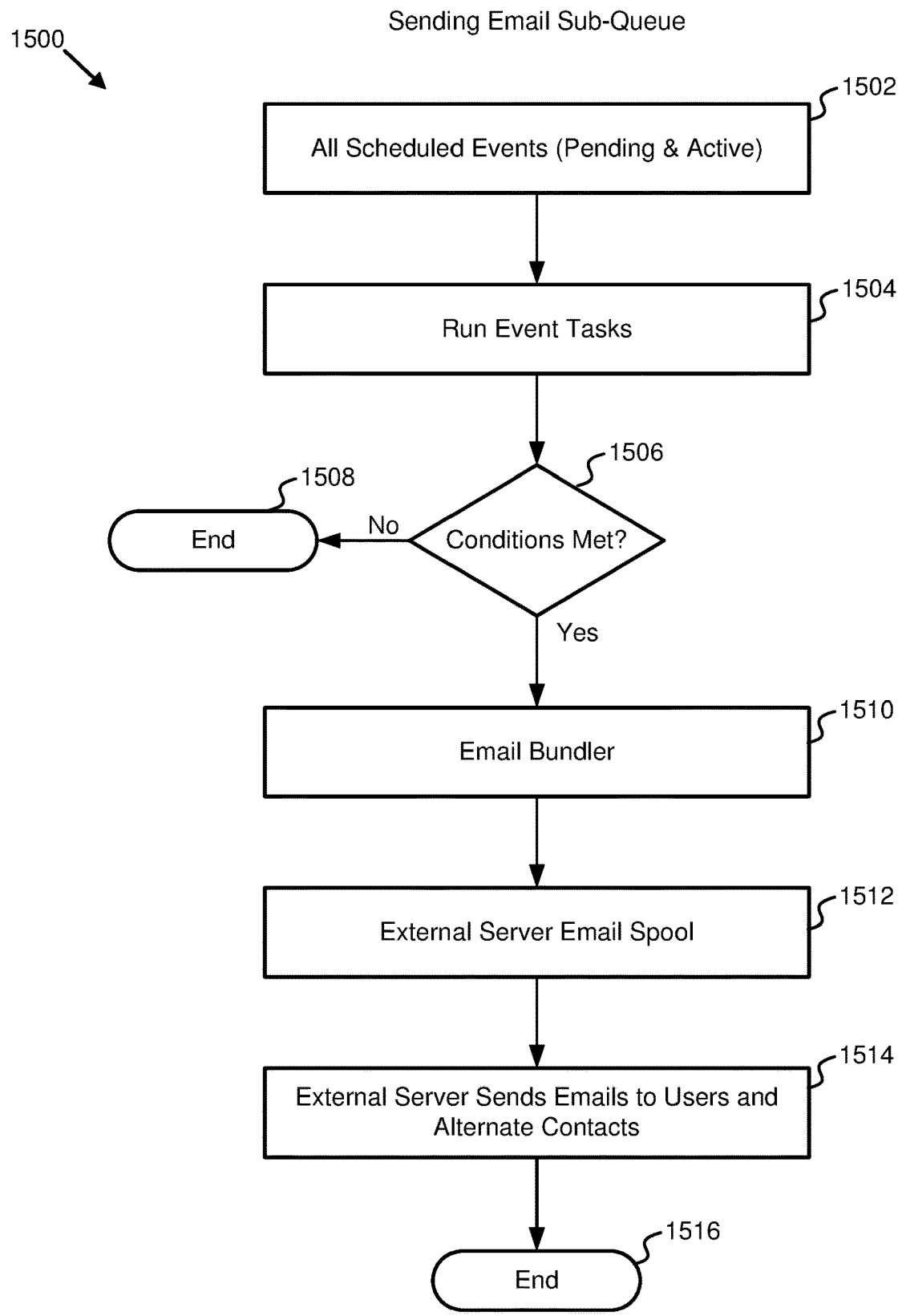
FIG. 15 is a flow diagram illustrating an exemplary method, operational at a server, for sending email in accordance with an embodiment of the present disclosure.
Figure 16:
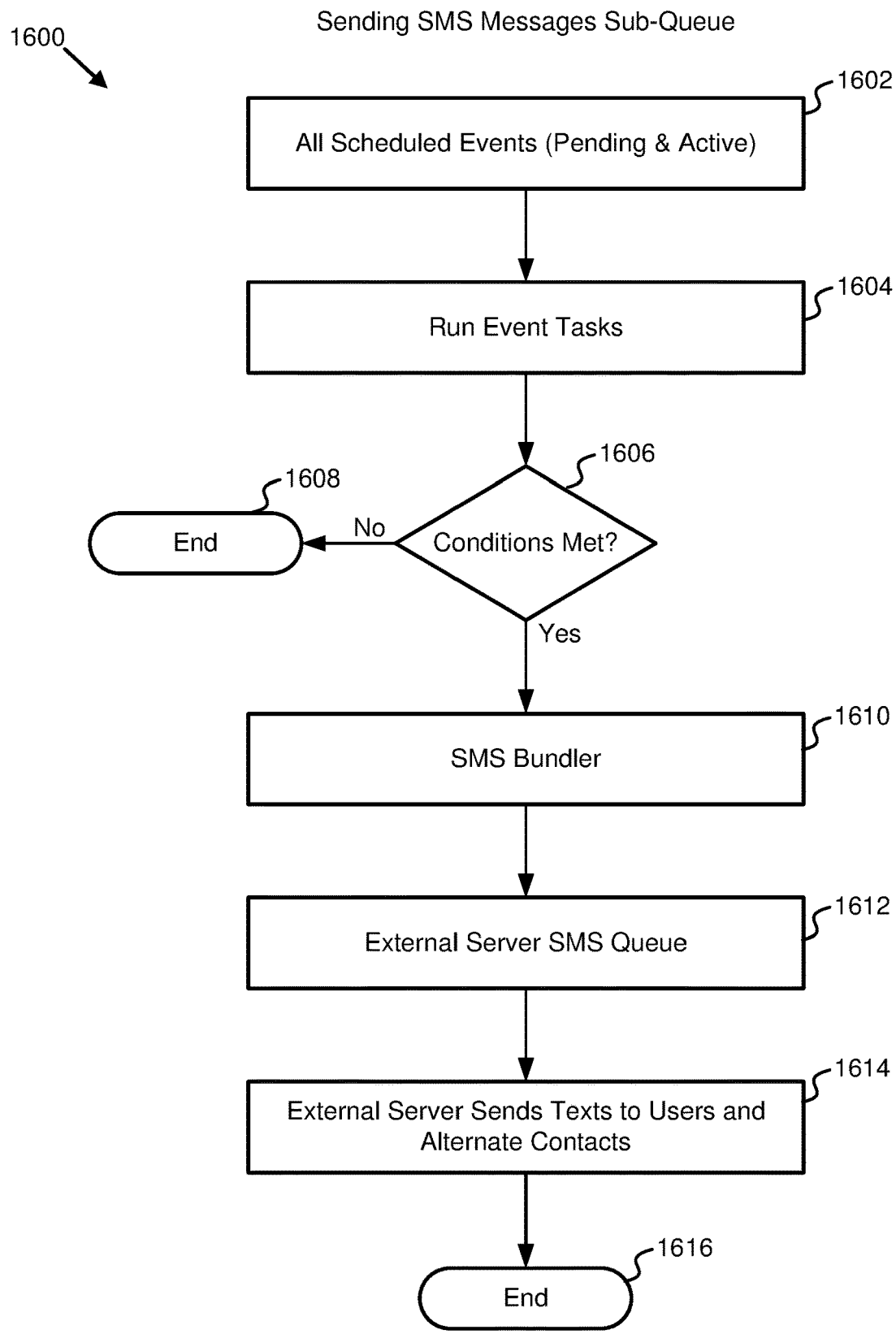
FIG. 16 is a flow diagram illustrating an exemplary method, operational at a server, for sending an SMS message in accordance with an embodiment of the present disclosure.
Figure 17A:
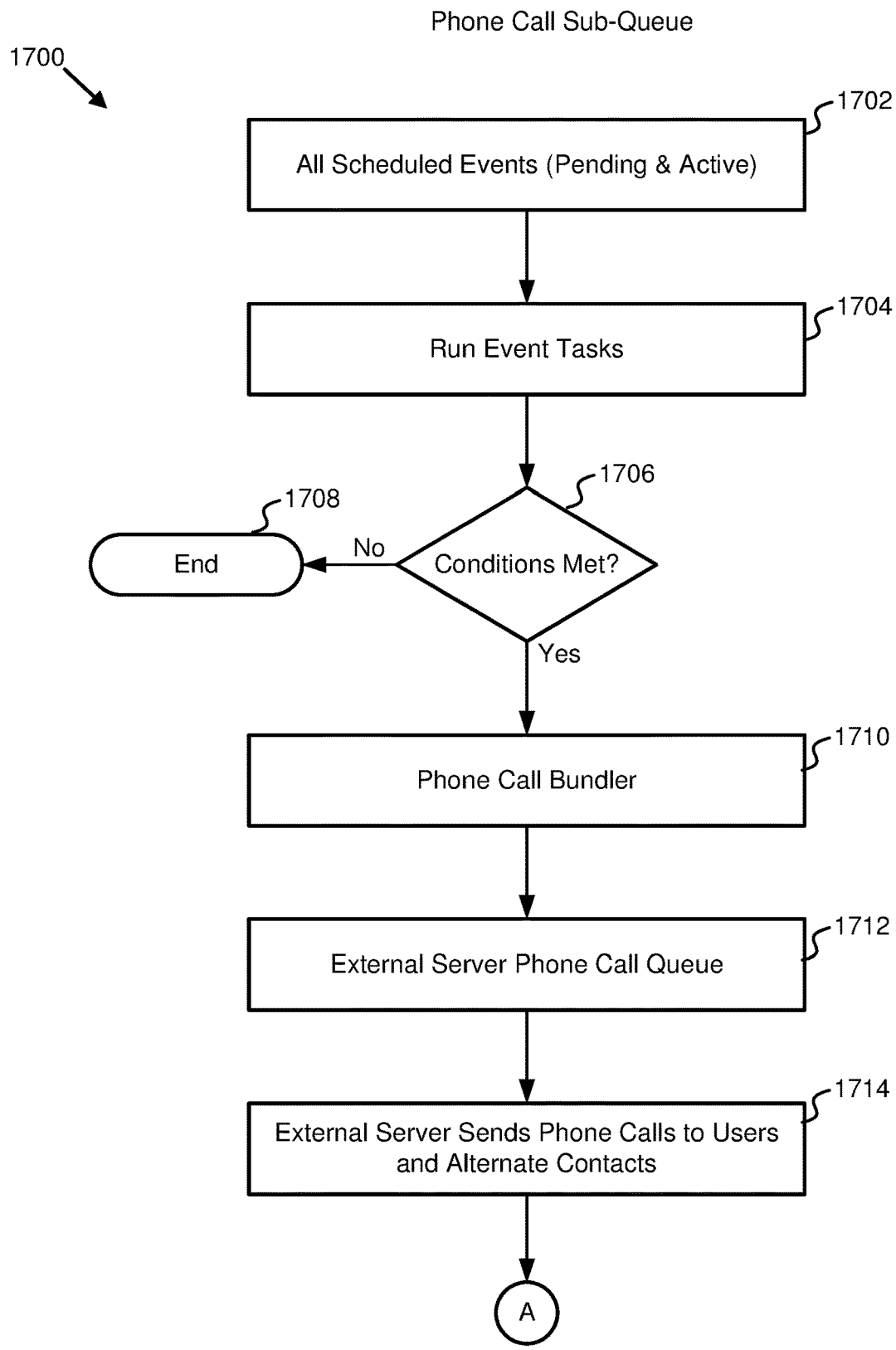
FIG. 17A and FIG. 17B together comprise a flow diagram, operational at a server, for sending a phone call in accordance with an embodiment of the present disclosure.
Figure 17B:
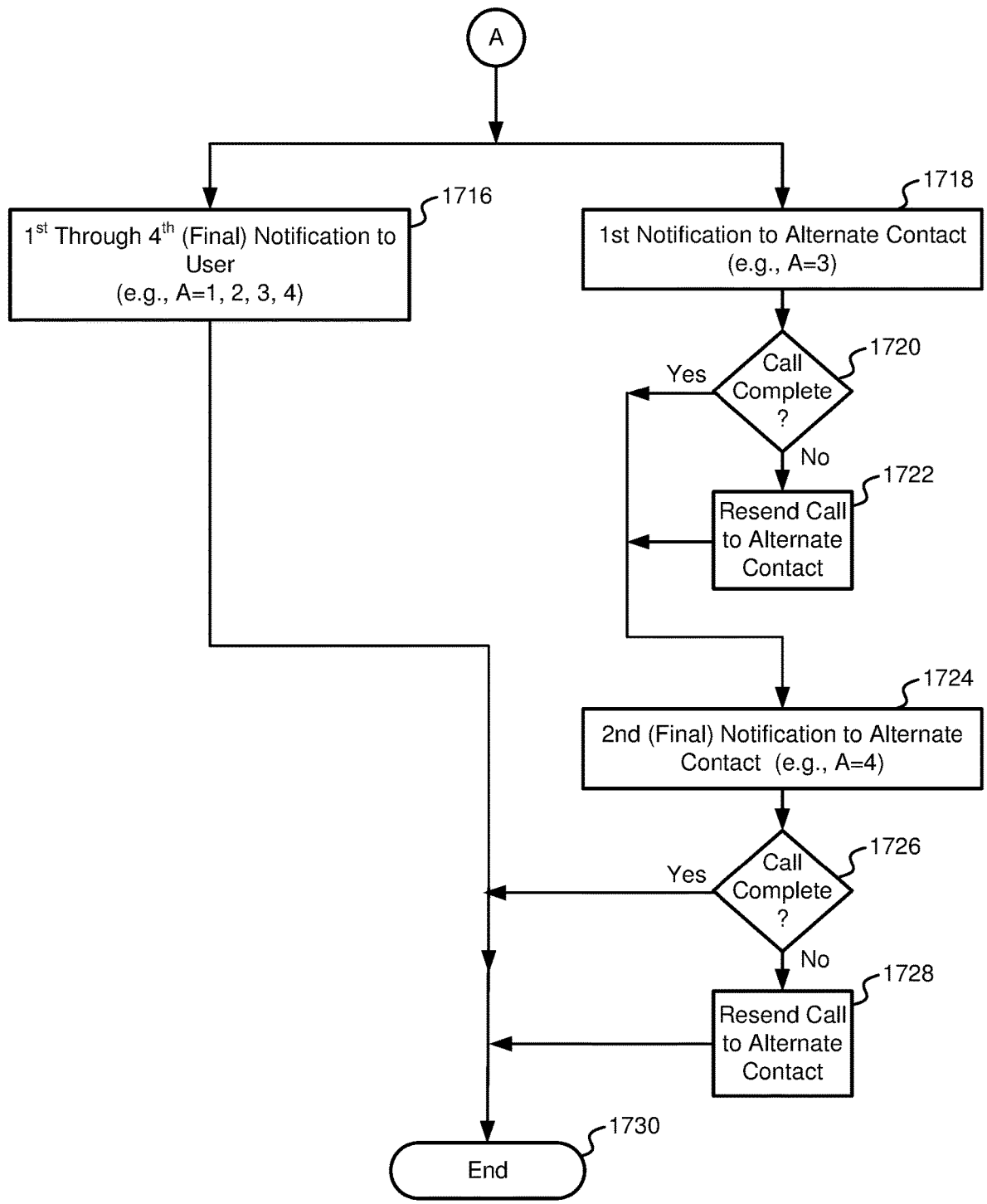

FIG. 15 is a flow diagram illustrating an exemplary method 1500, operational at a server, for sending email in accordance with an embodiment of the present disclosure. FIG. 16 is a flow diagram illustrating an exemplary method 1600, operational at a server, for sending an SMS message in accordance with an embodiment of the present disclosure. FIG. 17A and FIG. 17B together comprise a flow diagram, operational at a server, for sending a phone call in accordance with an embodiment of the present disclosure. FIGS. 15, 16, 17A, and 17B each relate to methods of sending notifications to the user and/or the alternate contact and share some similar features. The user device may be similar to the user devices such as the terminal 102, the wireless cellular phone 104 (e.g., a smart phone), the personal digital assistant or tablet 106, and the wired phone 108 of FIG. 1, the devices (e.g., terminal 202, wireless cellular phone 204, personal digital assistant or tablet 206) of FIG. 2. and device 600 of FIG. 6. The server may be similar to, for example, web server 112 of FIG. 1, server 300 of FIG. 3, and/or web application server 213 of FIG. 2. The server may be configured as an event scheduling and notification system/function/module/device, such as, for example, the system 110 of FIG. 1. The user device may be communicatively coupled to the server via one or more communication networks, such as communication network(s) 134 of FIG. 1. A user, using the user device, may establish a user account with an event scheduling and notification system. For ease of reference, a server configured as an event scheduling and notification system and a user device acting as an input/output device communicatively coupled to the server may be collectively or individually referred to herein as the "event scheduling and notification system" or the "system."

According to one embodiment, for notifications to the user, an email bundler 1510, FIG. 15, an SMS bundler 1610, FIG. 16, or a phone call bundler 1710, FIG. 17A, operating in the system may insert variable information into the notifications. The variable information may include details about the location of the event, where to search for a missing user, details on how to care for an elderly person, etc.

According to another embodiment, for notifications to the user, the system may send preset notifications that vary in content. For example, " . . . this is your first alert" versus a second, etc. According to one embodiment, for notifications to the alternate contact, an email bundler 1510, FIG. 15, an SMS bundler 1610, FIG. 16, and a phone call bundler 1710, FIG. 17A, operating in the system may insert information, such as, for example, the user's name and hours elapsed since the event expected conclusion time, into the notifications. According to one embodiment, the email and text bundlers insert a printed version of the user's name into these notification messages along with the hours elapsed since the expected conclusion time (e.g., expected return time). The phone bundler inserts the text-to-speech version of the user's name plus the hours elapsed since the expected return time into the phone messages. In the exemplary notification sequence where N=4 and B=1, the phone bundler does this a total of three times into one phone message, as the phone message is repeated twice to compensate for any answering device truncating the initial part of the phone message. According to another embodiment, for notifications to both the user and alternate contact, an email bundler 1510, FIG. 15, an SMS bundler 1610, FIG. 16, and a phone call bundler 1710, FIG. 17A, operating in the system may insert personalized messages created by the user into the notifications. According to one embodiment, once the notifications are assembled and bundled, they are pushed to external services, such as, for example, email service 124, SMS service 126, text-to-speech service 128, and phone service 130 of FIG. 1 and/or email service 224, SMS service 226, text-to-speech service 228, and phone service 230 of FIG. 2. These services may run on or be hosted by one or more servers.

According to one embodiment, the phone calls to the alternate contact(s) are monitored by the system to determine if the calls are completed (meaning the call has been answered by a person or a machine). If the status of the phone call to the alternate contact is incomplete, a second phone call to the alternate contact is generated. That is, the phone call or message has not been received, answered or picked up by a person or a device. This process of monitoring and calling may occur with all, or fewer than all, notifications sent to an alternate contact.

An exemplary method 1500 of sending email, according to one exemplary embodiment includes making all scheduled events (pending and active) available for system evaluation(s) 1502. Event tasks may be executed 1504. A determination of whether certain conditions are met may be made for each event 1506 by the system. If the certain conditions are not met for a given event, the method may end 1508 for the given event. However, if the certain conditions are met for a given event, the information for an email may be sent to an email bundler 1510. The email bundler may send the compiled email to an external server email spool 1512. The external server may then send emails to users and alternate contacts 1514. Thereafter the method may end 1516.

An exemplary method 1600 of sending SMS messages, according to one exemplary embodiment includes making all scheduled events (pending and active) available for system evaluation(s) 1602. Event tasks may be executed 1604. A determination of whether certain conditions are met may be made for each event 1606 by the system. If the certain conditions are not met for a given event, the method may end 1608 for the given event. However, if the certain conditions are met for a given event, the information for an SMS message may be sent to an SMS bundler 1610. The SMS bundler may send the compiled SMS message to an external server SMS queue 1612. The external server may then send SMS messages to users and alternate contacts 1614. Thereafter the method may end 1616.

An exemplary method 1700 of sending voice messages by phone, according to one exemplary embodiment includes making all scheduled events (pending and active) available for system evaluation(s) 1702. Event tasks may be executed 1704. A determination of whether certain conditions are met may be made for each event 1706 by the system. If the certain conditions are not met for a given event, the method may end 1708 for the given event. However, if the certain conditions are met for a given event, the information for voice messages may be sent to a phone call bundler 1710. The phone call bundler may send the compiled voice message to an external server phone call queue 1712. The external server may then send phone calls to users and alternate contacts 1714.

According to one embodiment, all phone calls (e.g., $1^{st}$ through final, $1^{st}$ through $N^{th}$ notifications) to users may be sent without further consideration 1716. Thereafter the method may end 1730 for the phone call notification to users. However, phone call notifications to alternate contacts may, as shown in the exemplary method of FIG. 17B, undergo further consideration. For example, a first phone call notification may be sent to an alternate contact 1718. A determination may be made as to whether the phone call was completed 1720. If the phone call was not completed, the phone call may be resent to the alternate contact 1722. If the phone call was completed, or the phone call was sent to the alternate contact, a second (final) phone call notification may be sent to the alternate contact 1724. A determination may be made as to whether the phone call was completed 1726. If the phone call was not completed, the phone call may be resent to the alternate contact 1728. Thereafter, if the phone call was completed, or the phone call was sent to the alternate contact, the method may end 1730. In other embodiments, additional notifications to the alternate contacts may include notification methods in addition to phone calls An illustrative and non-limiting example of the complete process according to one embodiment follows:

A user schedules an event with an expected return time of 6:00 p.m. At 7 p.m. if the user has not cancelled or extended the event, notification messages (e.g., alert messages) may be automatically sent to the user via email, text, and/or phone (whichever methods have been selected by the user) reminding the user to cancel or extend the event. At 8 p.m., if the user has not cancelled or extended the event, secondary notifications may be sent reminding the user to cancel or extend the event. At 9 p.m., if the user has not cancelled or extended the event, notifications are sent to the user's alternate contact(s) (e.g., emergency contact(s)) as well as a third set of notifications being sent to the user. The notifications to the alternate contact(s) via email, text, and/or phone include the user's name and state that the user was supposed to return home 3 hours ago from a scheduled event. If the alternate contact phone was busy and thus unable to receive this notification (which is an important phone call to receive), the system captures the non-receipt of the notification message and automatically triggers another phone call notification to the alternate contact in approximately 15 minutes. This phone call notification, like the last, may include the user's name and states that he/she was supposed to be home 3½ hours ago. At 10 p.m., if the user has not cancelled the event, final notifications are sent to the emergency contact(s) with a final set of notifications also being sent to the user. Again, if the alternate contact phone was busy and thus unable to receive this phone call notification, the system captures the non-receipt of the notification message and may automatically trigger another phone call to the alternate contact in approximately 15 minutes.

According to some exemplary embodiments, a set of notifications may, for example, ask the alternate contact(s) to look after the user's pet(s); however, the notifications can be customized to recite different messages (e.g., pertaining to picking up children from school, looking after a loved one/elderly parent/friend/neighbor, searching for the user after a hike/date/traveling, etc.). Also, the example above is in hourly increments. However, the system may be set to any increments of time. For example, the system may be set with increments of time ranging from 10 to 60 minutes.

Once a user sets an event, the system does not rely on software installed on the user's devices; it functions separately from his/her devices. For example, if the customer's phone is damaged or lost in a car accident, the notifications will automatically be sent. Devices, such as smart phones, may not be required by the users or alternate contacts; however, they allow for easier remote accessibility of emails and SMS (text) messages.

For security reasons, in accordance with one example, a user's physical address is not required or used. User profiles, contacts and events are stored on remote secure servers and accessed by the system as needed. Also, by way of example, any time the user leaves the contacts and events page (see, for example, FIG. 11A and FIG. 11B) or closes his/her Internet browser, he/she is automatically logged out of the account. This is so confidential information about being away from home at specific times is protected.

Figure 18:
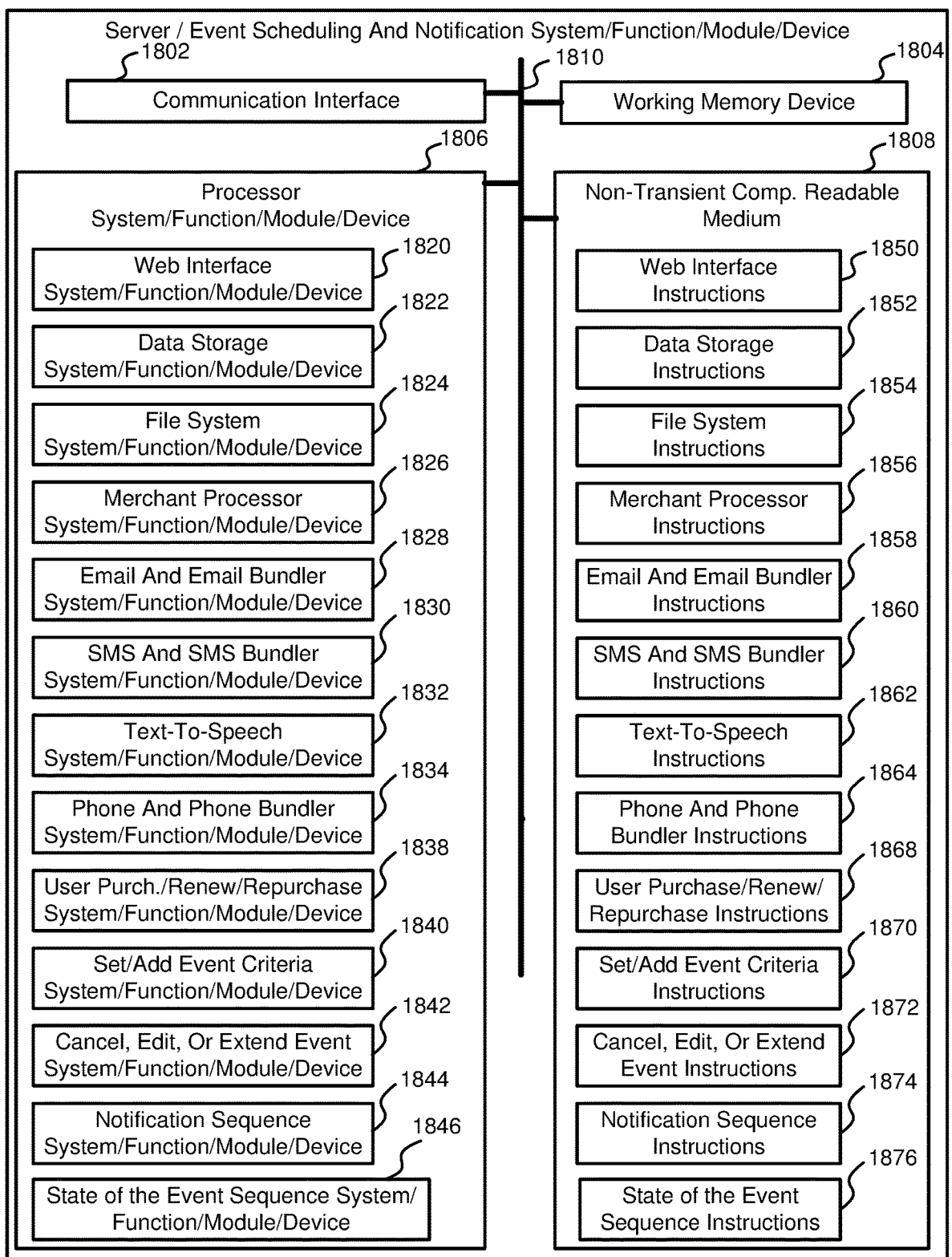
FIG. 18 is a block diagram illustrating an alternative operational environment within which embodiments of the present disclosure may be found.

III. Second Example of a System, Apparatus, and Method of Scheduling Events and Sending Notifications to Entities FIG. 18 is a block diagram illustrating an example of a server and/or an event scheduling and notification system/function/module/device (hereinafter the server 1800) in accordance with an embodiment of the present disclosure. The server 1800 of FIG. 18 may be similar to the web server 112, server(s) 132 of FIG. 1 and/or the system 210 of FIG. 2; any of which may be configured as the server 1800.

The server 1800 may include, for example, a communication interface 1802. The communication interface 1802 may enable data and control input and output. The communication interface 1802 may, for example, enable communication over one or more communication networks, similar to communication network(s) 134 of FIG. 1. The communication interface 1802 may be communicatively coupled, directly or indirectly, to the communication network(s) 134. The server 1800 may include a working memory device 1804, and a processor system/function/module/device (hereinafter the processor 1806). The processor 1806 may use the working memory device 1804 to store data that is about to be operated on, being operated on, or was recently operated on. The processor 1806 may store instructions on the working memory device 1804 and/or on one or more other memory structures or devices, such as, for example, non-transient computer readable medium system/function/module/device (hereinafter non-transient computer readable medium 1808). When executed by the processor 1806, the instructions may cause the processor 1806 to perform, for example, one or more aspects of the methods described herein, such as the methods associated with FIGS. 19 and 21-32.

The server 1800 may be implemented with a bus architecture, represented generally by the bus 1810. The bus 1810 may include any number of interconnecting buses and bridges depending on the specific application of the server 1800 and overall design constraints. The bus 1810 may communicatively couple various circuits including one or more processors (represented generally by the processor 1806), the working memory device 1804, the communication interface 1802, and the non-transient computer readable medium 1808. The bus 1810 may also link various other circuits and devices, such as timing sources, peripherals, voltage regulators, and power management circuits and devices, which are well known in the art, and therefore, are not described any further.

The processor 1806 may be responsible for managing the bus 1810 and general processing, including the execution of software stored on the non-transient computer readable medium 1808. The software, when executed by the processor 1806, may cause the processor 1806 to perform the various functions described below for any particular apparatus. The non-transient computer readable medium 1808 and the working memory device 1804 may also be used for storing data that is manipulated by the processor 1806 when executing software.

One or more processors, such as processor 1806 in the server 1800 may execute software. Software may be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a non-transient computer readable medium, such as non-transient computer readable medium 1808. Non-transient computer readable medium 1808 may include, by way of example, a magnetic storage device (e.g., hard disk, floppy disk, magnetic tape, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable non-transient medium for storing software, date, and/or instructions that may be accessed and read by a computer or the processor 1806. Computer readable media may also include, by way of example, a carrier wave, a transmission line, and any other suitable medium for transmitting software and/or instructions that may be accessed and read by a computer or the processor 1806. The non-transient computer readable medium 1808 may reside in the server 1800 (e.g., local data storage device 114, FIG. 1), external to the server 1800 (e.g., remote data storage device 118), or distributed across multiple entities including the server 1800.

The non-transient computer readable medium 1808 may be embodied in a computer program product. By way of example, a computer program product may include a computer readable medium in packaging materials. Those skilled in the art will recognize how best to implement the described functionality presented throughout this disclosure depending on the particular application and the overall design constraints imposed on the overall system.

In some aspects of the disclosure, the processor 1806 may include circuitry configured for various functions. For example, the processor 1806 may include a web interface

1820 system/function/module/device configured to manage web page generation and display and to perform input/output operations associated with access to the Internet web and perform, for example, methods associated with FIGS. 19, 22A, 22B, 23, and 24. For example, the processor 1806 may include a data storage 1822 system/function/module/device configured to store data including data used to populate user profiles and a system database. For example, the processor 1806 may include a file system 1824 system/function/module/device configured to control how data in local data storage and/or remote data storage is stored and retrieved. For example, the processor 1806 may include a merchant processor 1826 system/function/module/device configured to perform sales and other merchant related activities and operations. For example, the processor 1806 may include an email and email bundler 1828 system/function/module/device configured to serve, for example, email accounts and process email messages and bundle emails for transmission to external servers, and to perform, for example, methods associated with FIG. 29. For example, the processor 1806 may include a short message service (SMS) and SMS bundler 1830 system/function/module/device configured to serve SMS accounts and serve SMS messages and bundle SMS messages for transmission to external servers, and to perform, for example, methods associated with FIG. 30. For example, the processor 1806 may include a text-to-speech 1832 system/function/module/device configured to convert text to speech. For example, the processor 1806 may include a phone and phone bundler 1834 system/function/module/device configured to serve phone accounts and phone messages and bundle phone messages for transmission to external servers, and to perform, for example, methods associated with FIGS. 31A and 31B. For example, the processor 1806 may include a user purchase/renew/repurchase 1838 system/function/module/device configured to perform, for example, the methods of FIGS. 22A, 22B, 23, and 24. For example, the processor 1806 may include a set/add event criteria 1840 system/function/module/device configured to perform, for example, the methods of FIGS. 21A, 21B, 25A, 25B, and 26. For example, the processor 1806 may include a cancel, edit, or extend event 1842 system/function/module/device configured to perform, for example, the methods of FIGS. 27A and 27B. For example, the processor 1806 may include a notification sequence 1844 system/function/module/device configured to perform, for example, the methods of FIGS. 19, 21A, 21B, 28A and 28B. For example, the processor 1806 may include a state of the event sequence 1846 system/function/module/device configured to perform, for example, the methods of FIGS. 19, 21A, 21B, 28A and 28B. and the sequencing through of states described in Table 3. In one embodiment described herein, information stored in the database, such as database 218, FIG. 2, and/or in databases (not shown), may also include a state of an event. This information may be combined with state transition mapping and utilized by the systems and methods disclosed herein to transition the event from one state to a next state.

By using an approach involving a database and the use of status transition mapping (state table) described herein, after a concluded event is first identified in the database, the server 1800 may need to maintain only a state of the event in a working memory of the server 1800 such as working memory device 1804, as described below, to determine when each subsequent notification message is to be sent to the user or sent concurrently to the user and an alternate contact. The processor 1806 may thus be configured such that the components of the processor 1806 are able to, in combination, improve performance of the server 1800 and database used by the server 1800 (e.g., increase speed of process and decrease number of database search and read/write operations). This hybrid approach is not merely a generic use of computer components.

In some aspects of the disclosure, the non-transient computer readable medium 1808 of the server 1800 may include instructions that may cause the various systems/functions/modules/devices of the processor 1806 to perform the methods described herein. For example, the non-transient computer readable medium 1808 may include web interface instructions 1850 corresponding to the web interface 1820 system/function/module/device. For example, the non-transient computer readable medium 1808 may include a data storage instruction 1852 corresponding to the data storage 1822 system/function/module/device. For example, the non-transient computer readable medium 1808 may include file system instructions 1854 corresponding to the file system 1824 system/function/module/device. For example, the non-transient computer readable medium 1808 may include merchant processor instructions 1856 corresponding to the merchant processor 1826 system/function/module/device. For example, the non-transient computer readable medium 1808 may include email and email bundler instructions 1858 corresponding to the email and email bundler 1828 system/function/module/device. For example, the non-transient computer readable medium 1808 may include SMS and SMS bundler 1860 instructions corresponding to the SMS bundler 1830 system/function/module/device. For example, the non-transient computer readable medium 1808 may include text-to-speech instructions 1862 corresponding to the text-to-speech 1832 system/function/module/device. For example, the non-transient computer readable medium 1808 may include phone and phone bundler instructions 1864 corresponding to the phone and phone bundler 1834 system/function/module/device. For example, the non-transient computer readable medium 1808 may include user purchase/renew/repurchase instructions 1868 corresponding to the user purchase/renew/repurchase 1838 system/function/module/device. For example, the non-transient computer readable medium 1808 may include set/add event criteria instructions 1870 corresponding to the set/add event criteria 1840 system/function/module/device. For example, the non-transient computer readable medium 1808 may include cancel event, edit event, or extend event instructions 1872 corresponding to the cancel, edit, or extend event 1842 system/function/module/device. For example, the non-transient computer readable medium 1808 may include notification sequence instructions 1874 corresponding to the notification sequence 1844 system/function/module/device. For example, the non-transient computer readable medium 1808 may include state of event sequence instructions 1876 corresponding to the state of the event sequence 1846 system/function/module/device.

According to some aspects, an event scheduling and notification apparatus, such as the server 1800, may include: a processor 1806, a transceiver (e.g., a communication interface 1802) communicatively coupled to the processor 1806, and a memory (e.g., working memory device 1804) communicatively coupled to the processor 1806, wherein the processor 1806 may be configured to: obtain, one or more user communication address(es) associated with a user; obtain an alternate contact identifier and one or more alternate contact communication address(es) associated with the alternate contact; obtain an event type from a list of event types; obtain event details to associate with the obtained event type, including at least an event identifier, an event expected conclusion date, and an event expected conclusion time; obtain a selection of an alternate contact, from a list including at least the alternate contact identifier, to associate with the event identifier; obtain user notification criteria including, at least one user communication address to associate with a notification message to be sent to the user; obtain alternate contact notification criteria, including at least one alternate contact communication address to associate with a notification message sent to the alternate contact; and send, in accordance with the user notification criteria and the alternate contact notification criteria, at least a first notification message to the user, and if the user does not acknowledge receipt of the first notification message, at least a final notification message to the user and the alternate contact.

According to some aspects, the processor 1806 may be further configured to: send the first notification message on the event expected conclusion date at substantially (e.g., approximately) the event expected conclusion time or at a specified time thereafter. According to still other aspects, the processor 1806 may be further configured to: send one or more additional notification message(s) to: the user, or to the user and the alternate contact, before the final notification message is sent to the user and the alternate contact.

Table 1, above, includes one variable that may be used according to aspects of the Second Example (see Section III) as described herein. The variable is: a state (e.g., condition, status) of the event variable.

Figure 19:
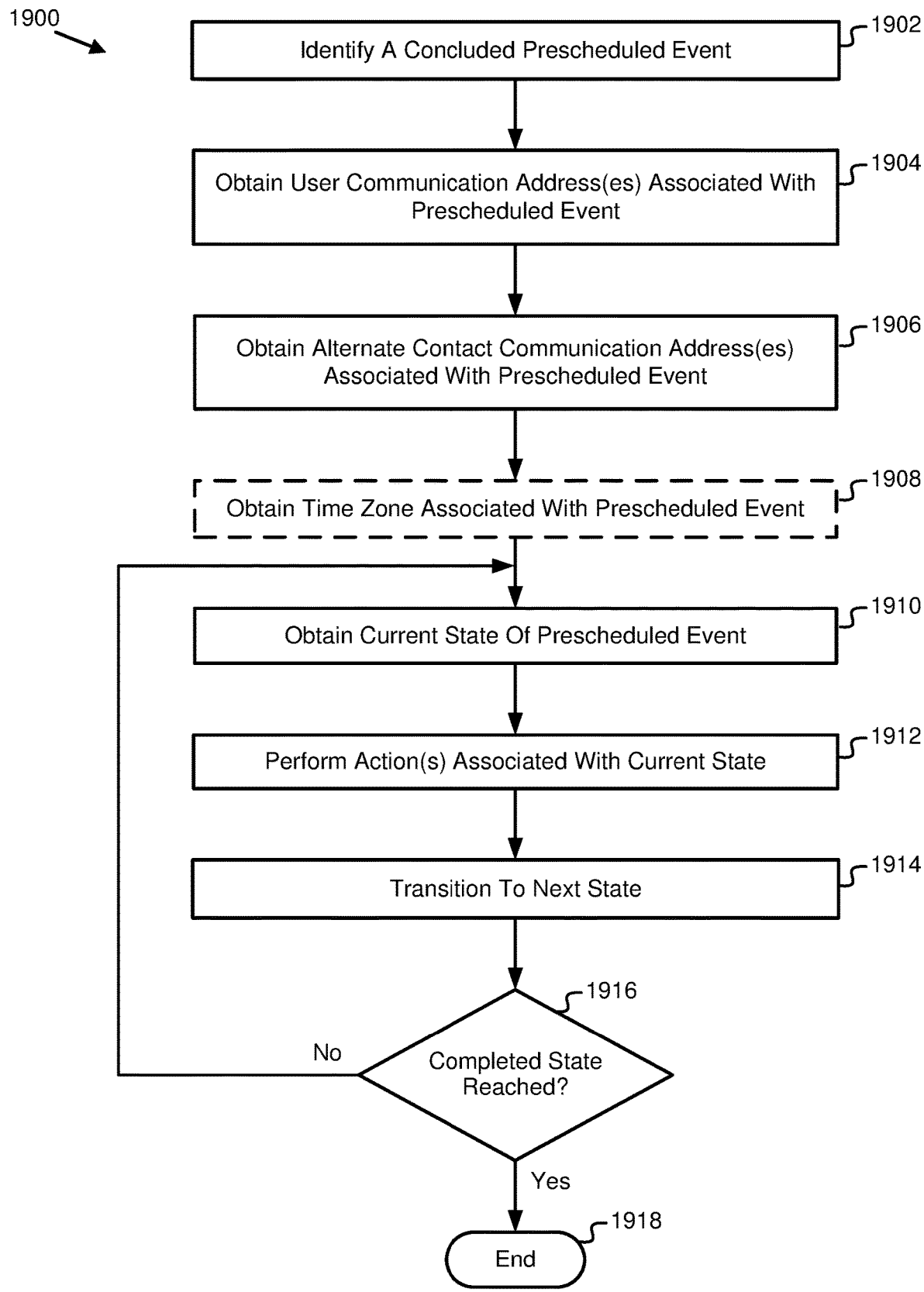
FIG. 19 is a flow diagram illustrating an exemplary method, operational at a server, of notifying a user or the user and a predesignated alternate contact (e.g., an emergency contact) of a conclusion of a prescheduled event in accordance with an embodiment of the present disclosure.

FIG. 19 is a flow diagram illustrating an exemplary method 1900, operational at a server, of notifying a user or the user and a predesignated alternate contact (e.g., an emergency contact) of a conclusion of a prescheduled event in accordance with an embodiment of the present disclosure. According to one example, the server may be configured as at least one of: the system 110 of FIG. 1, the system 210 of FIG. 2, or the server 1800 of FIG. 18. For ease of reference, and without any intent of limiting the disclosure, a reference made to a "system" herein may be considered as a reference made to the at least one of: the system 110 of FIG. 1, the system 210 of FIG. 2, or the server 1800 of FIG. 18.

The system may identify a concluded prescheduled event 1902. The system may identify the concluded prescheduled event through its own operation (e.g., by searching a database, by identifying the concluded prescheduled event). Alternatively, the system may pull the identification from an entity responsible for searching the database, or the entity may push the identification to the system. The system may be different from the entity. As illustrated in the "Exemplary Database Parameters Listing," of Table I, above, the database may include, among other things, the expected date and expected concluding time (may be stored as a local time) of a plurality of prescheduled events associated with a plurality of users. According to one embodiment, the concluded prescheduled event is identified in a database populated with one or more event identifiers and associated event expected conclusion times.

The system or the entity may identify a concluded prescheduled event by, for example, comparing a date and local concluding time of each prescheduled event stored in the database to a current date and time of a clock maintained by the system or the entity, as the case may be. The time of the clock may be adjusted for the time zone at the location of the concluded prescheduled event. The system may be configured to search a database that includes parameters such as those identified in the "Exemplary Database Parameters Listing," of Table 1, above. The system or the entity may be configured, for example, to perform searches of the database in an ongoing manner, where a purpose of the search is to identify one or more concluded prescheduled events. Alternatively, the system or the entity may sort all prescheduled events in the database according to date and time of event conclusion. The system or the entity may determine that an event has concluded by comparing the present time of the system or the entity (e.g., the time of a clock running with the system or the entity) to the conclusion times of the plurality of prescheduled events in the database. The entity may then push the identification of the concluded prescheduled events to the system, or the system or the entity may place the identifications of concluded prescheduled events in a queue or file. The system may pull the identification of the concluded event from the queue or file in chronological order. Other ways for the system or the entity to identify the concluded prescheduled events from a database or other storage mechanism are within the scope of the disclosure.

The system may obtain one or more user communication address(es) associated with the concluded prescheduled event 1904. The user communication address(es) may include at least one of: an email address, a telephone number for an SMS message (e.g., a text message), or a telephone number for an audible telephone message. Additional or alternative address(es) are within the scope of the disclosure. As used herein, the term "obtain" may mean, for example, to get, attain, acquire, take, receive, accept, collect, generate, determine, and/or derive. A thing may be, for example, obtained locally or obtained from a remote file, database, location, and/or source, or combination thereof. In some embodiments, the user communication address(es) may be obtained from a database, a queue, or file, or an entity different from the system. The user communication address(es) may be obtained, for example, by pulling the user communication address(es) from the database, queue, or file, or by having the entity different from the system push the user communication address(es) to the system.

The system may obtain one or more alternate contact communication address(es), different from the user communication address(es), associated with the concluded prescheduled event 1906 (e.g., by obtaining one or more alternate contact communication address(es), different from the user communication address(es), associated with the concluded prescheduled event). The alternate contact communication address(es) may include at least one of: an email address, a telephone number for an SMS message (e.g., a text message), or a telephone number for an audible telephone message. The alternate contact represents a person, group of persons (e.g., recipients of a group message), or business that is different from the user. In some circumstances, the alternate contact may be considered an emergency contact. In some embodiments, the alternate contact communication address(es) may be obtained from a database, a queue or file, or an entity different from the system. The alternate contact communication address(es) may be obtained, for example, by pulling the alternate contact communication address(es) from the database, queue, or file, or by having the entity different from the system push the alternate contact communication address(es) to the system. Additional or alternative address(es) are within the scope of the disclosure. One or more notification messages may be sent to the alternate contact communication address(es) if the user does not respond to one or more notification messages sent to the user communication address(es).

Accordingly, according to one aspect, the one or more user communication address(es) and the one or more alternate contact communication address(es), each correspond to a respective method of communication including at least one of: email communication, short message service (SMS) message communication, or audible telephonic communication. The one or more user communication address(es) may include at least one of: a first telephone number associated with an audible voice telephone account of the user, a second telephone number associated with a short message service (SMS) account of the user, or an email address associated with an email account of the user. According to one aspect, the one or more alternate contact communication address(es) may be associated with an alternate contact, and the alternate contact may be a person, group of persons, or a business entity. According to some aspects, the one or more alternate contact communication address(es) include at least one of: a first telephone number associated with an audible voice telephone account of the alternate contact, a second telephone number associated with a short message service (SMS) account of the alternate contact, or an email address associated with an email account of the alternate contact.

Optionally, the system may obtain a time zone associated with the concluded prescheduled event 1908. The time zone may be provided by the user or determined by the system. The time zone may be used to adjust the ending time of the identified concluded prescheduled event, in the case where the clock running with the system is located in a time zone that is different from the time zone where the identified concluded prescheduled event occurs. The time zone may be obtained in various ways which are within the scope of the disclosure.

The system may obtain a current state of the prescheduled event 1910. For example, the current state may include: no event scheduled, pending event, active event, first notification to user, second notification to user, third notification to user and first notification to alternate contact, 3.5 notification to alternate contact (phone only), final notifications to user and alternate contact, final 0.5 notification to alternate contact (phone only), and completed. Additional or fewer current states are within the scope of the disclosure.

The system may perform action(s) associated with the obtained current state 1912. Exemplary actions associated with exemplary current states are depicted in a state transition table, Table 3, below. The state transition table, Table 3, illustrates states (current and next) and associated action(s) for a single event. The state transition table, Table 3, is an exemplary representation of the set of actions that may occur in a status transition mapping of the prescheduled event.

TABLE 3

State Transition Table - Single Event
State Transition Table - Single Event

| Current State | Action | Next State |
|---|---|---|
| No Event Scheduled | Event is scheduled | Pending Event |
| Pending Event | Return time is reached | Active Event |
| Active Event | Established wait time is reached | 1st Notification to User |
| 1st Notification to User | Established wait time is reached Send notification to user | 2nd Notification to User |
| 2nd Notification to User | Established wait time is reached Send notification to user | 3rd Notification to User & 1st Notification to Alternate Contact |
| 3rd Notification to User & 1st Notification to Alternate Contact | Established wait time is reached Send notification to user Send notification to alternate contact | 3½ Notification to Alternate Contact |
| 3½ Notification to Alternate Contact (phone only) | Check phone log Established wait time is reached Send phone notification to alternate contact | Final Notifications to User & Alternate Contact |
| Final Notifications to User & Alternate Contact | Established wait time is reached Send notification to user Send notification to alternate contact | Final ½ Notification to Alternate Contact |
| Final ½ Notification to Alternate Contact (phone only) | Check phone log Established wait time is reached Send phone alert to alternate contact | Completed |
| Completed | | |

Returning to FIG. 19, after performing the action(s) associated with the obtained current state 1912, the system may transition to a next state 1914. For example, the system may transition from a "no event scheduled" state to a "pending event state" after completion of an "event is scheduled" action. Ten states are illustrated for exemplary purposes in Table 3. A fewer or greater number of states is within the scope of the disclosure. The states proceed from a "no event scheduled" state to a "completed" state. Once a transition to a next state 1914 is made, the system determines if it has reached the "completed" state 1916. If the "completed" state is not reached, the system returns to obtain a current state of the prescheduled event 1910. If the "completed" state is reached, the process may end 1918.

The exemplary method of FIG. 19 and the associated exemplary state transition table, Table 3, describe that a scheduled task, which runs at predetermined intervals, accesses information (exemplified as the information stored in Table 1) stored in one or more databases. For example, this information may include the state of a prescheduled event. The system compares the database information to a set of parameters which then determines which action or set of actions occur next, changing the state of the event. For example, when the system determines that a user has scheduled an event, it transitions the state from "No Event Scheduled" to a "Pending Event." Table 3 is a non-limiting example and represents one example of an embodiment of this disclosure. The status transition mapping utilized in the systems and methods disclosed herein may be edited, expanded, and/or contracted as needed for additional and/or alternative embodiments.

Figure 32:
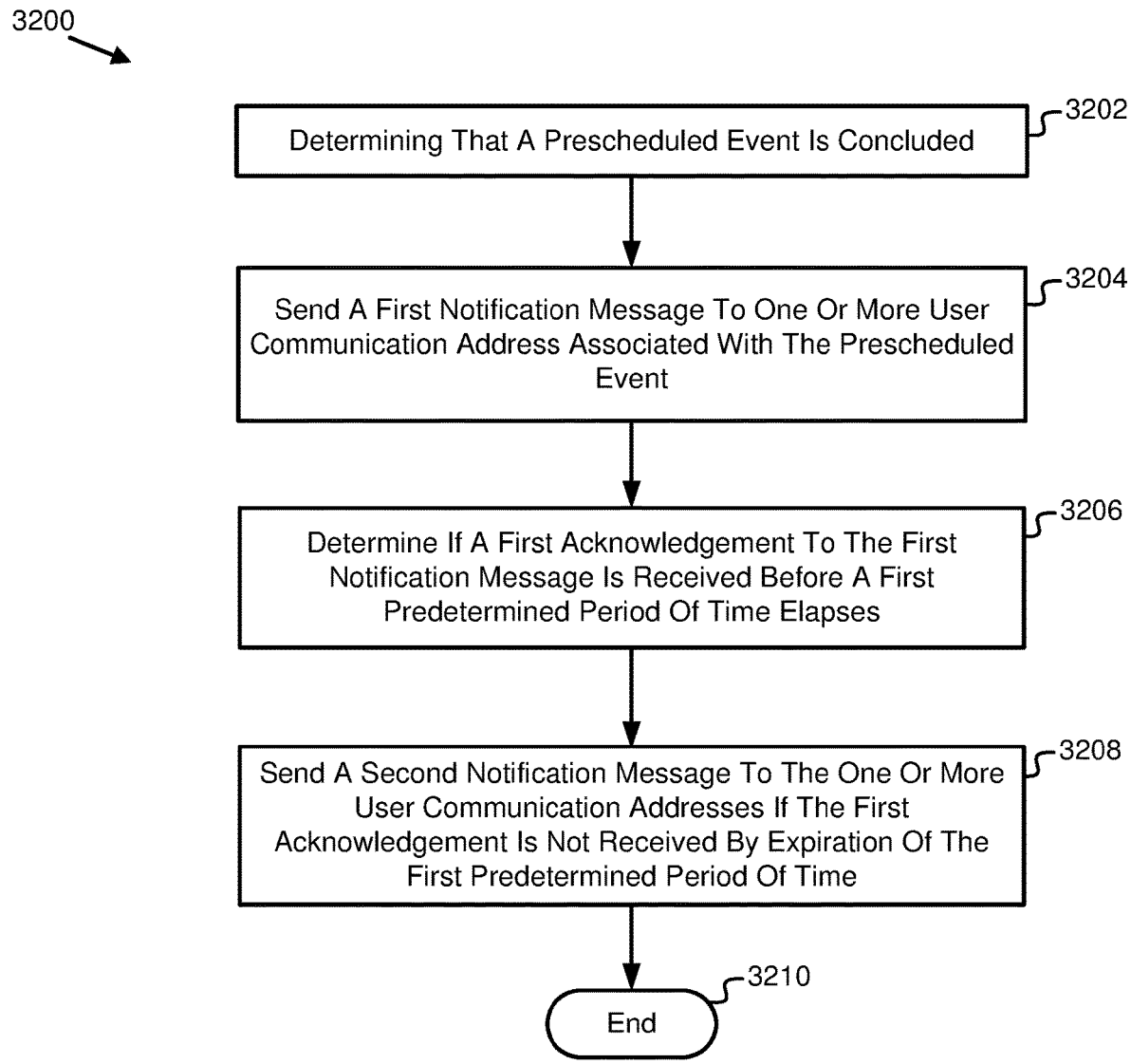
FIG. 32 is a flow diagram illustrating another exemplary method, operational at a server, of notifying a user of a conclusion of a prescheduled event in accordance with an embodiment of the present disclosure.

FIG. 32 is a flow diagram illustrating another method 3200, operational at a server, of notifying a user of a conclusion of a prescheduled event in accordance with an embodiment of the present disclosure. The server may be, for example, the server 300 of FIG. 3 or, by way of another example, may be the server 1800 of FIG. 18.

The server may determine that a prescheduled event is concluded 3202. The server may determine that the prescheduled event is concluded through its own operation (e.g., by searching a database, by identifying the concluded prescheduled event). Alternatively, the server may pull a notification that the prescheduled event is concluded from an entity responsible for searching the database, or the entity may push the notification to the server. The server may be different from the entity. As illustrated in the "Exemplary Database Parameters Listing," of Table I, above, the database may include, among other things, the expected date and expected concluding time (may be stored as a local time) of a plurality of prescheduled events associated with a plurality of users. According to one embodiment, the concluded prescheduled event is identified in a database populated with one or more event identifiers and associated event expected conclusion times.

The server may identify a concluded prescheduled event by, for example, comparing a date and local concluding time of each prescheduled event stored in the database to a current date and time of a clock maintained by the server or the entity, as the case may be. The time of the clock may be adjusted for the time zone at the location of the concluded prescheduled event. The server may be configured to search a database that includes parameters such as those identified in the "Exemplary Database Parameters Listing," of Table 1, above. The server may be configured, for example, to perform searches of the database in an ongoing manner, where a purpose of the search is to identify one or more concluded prescheduled events. Alternatively, the server or the entity may sort all prescheduled events in the database according to date and time of event conclusion. The server or the entity may determine that an event has concluded by comparing the present time of the server or the entity (e.g., the time of a clock running with the server or the entity) to the conclusion times of the plurality of prescheduled events in the database. The entity may then push the identification of the concluded prescheduled events to the server, or the server or the entity may place the identifications of concluded prescheduled events in a queue or file. The server may pull the identification of the concluded event from the queue or file in chronological order. Other ways for the server or the entity to identify the concluded prescheduled events from a database or other storage mechanism are within the scope of the disclosure.

The server may send a first notification message to one or more user communication addresses associated with the prescheduled event 3204. The server may determine if a first acknowledgement to the first notification message is received before a first predetermined period of time elapses 3206. For example, the predetermined period of time may be 2 minutes, 5 minutes, 10 minutes, or any predetermined period of time stored in association with the prescheduled event The first predetermined period of time may be set by the user or may be a default or calculated value set by the system.

As used herein, an acknowledgement to a notification message may be, for example, a message indicating that a recipient has received the notification, a message or instruction to cancel further notifications, or a message or instructions to extend the prescheduled event (e.g., extend the conclusion date and/or conclusion time of the prescheduled event). The receipt of the first acknowledgement may be indicative of a successful conclusion of the event and/or safe return of the user to a home or other location, in which case there would be no need to send additional notifications. The server may send a second notification message to the one or more user communication addresses if the first acknowledgement is not received by expiration of the first predetermined period of time 3208. Thereafter, the method may end 3210 or the method may proceed with sending additional notifications to the user communication address or the user communication address and one or more alternate contact communication address as described herein.

In aspects described herein, the various notifications sent to the one or more user communication addresses may each be different from one another. Furthermore, the various notifications sent the one or more alternate contact communication addresses may each be different from one another and my further still be difference from any of the various notifications sent to the one or more user communication addresses. According to some aspects, the notifications sent to the alternate contact communication addresses may include the inserted name of the user along with an elapsed period of time (e.g., an elapsed period of time since a conclusion time of a prescheduled event). According to some aspects, an alternate contact communication address may correspond to an address of a person, a group of persons, or a business entity.

According to some aspects, the server may store the one or more user communication addresses as, for example a first telephone number associated with an audible voice telephone account, a second telephone number associated with a short message service (SMS) account, or an email address associated with an email account.

According to one aspect, the server may obtain user notification criteria associated with the one or more user communication addresses. The server may then send the first notification message and/or the second notification message in accordance with the user notification criteria.

According to another aspect, the server may obtain event details to associate with the prescheduled event, including at least an event identifier, an event expected conclusion date, an event expected conclusion time, and an event time zone. The server may then determine that the prescheduled event is concluded based on at least the event expected conclusion date, the event expected conclusion time, and the event time zone.

According to one example, the method 3200 may further include identifying, by the server, the prescheduled event as a single event, having one event expected conclusion date and associated event expected conclusion time, or as a recurring event, having a series of conclusion dates and associated conclusion times. The server may then store, if the event is the single event, the one event expected conclusion date and associated event expected conclusion time as an expected conclusion date and expected conclusion time of a first event. The server may alternatively store, if the event is the recurring event, an earliest one of the series of conclusion dates and associated conclusion times as the expected conclusion date and expected conclusion time of the first event, create a respective additional event for each respective subsequent conclusion date and associated conclusion time in the series of conclusion dates and associated conclusion times, and store each respective subsequent conclusion date and associated conclusion time in association with each respective additional event. The server may then determine that the prescheduled event is concluded based on the expected conclusion date and expected conclusion time of the first event, or determine that the respective additional event is concluded based on the respective subsequent conclusion date and associated conclusion time of the respective additional event.

According to still other aspects, the server may determine if a second acknowledgment to the second notification message is received before a second predetermined period of time elapses. If the second acknowledgement is not received by expiration of the second predetermined period of time, the server may send a third notification message to the one or more user communication addresses and a first alternate contact notification message to one or more alternate contact communication addresses.

According to some examples, the server may store the one or more alternate contact communication addresses as at least one of a first telephone number associated with an audible voice telephone account, a second telephone number associated with a short message service (SMS) account, or an email address associated with an email account.

Still further, the server may obtain user notification criteria associated with the one or more user communication addresses and obtain alternate contact notification criteria associated with the one or more alternate contact communication addresses. The server may then send the first notification message and the second notification message in accordance with the user notification criteria and send the first alternate contact notification message to the one or more alternate contact notification addresses in accordance with the alternate contact notification criteria.

Still further, the server may determine if a third acknowledgment to the third notification message is received before a third predetermined period of time elapses and may send, if the third acknowledgment is not received by expiration of the third predetermined period of time, a first final notification message to the one or more user communication addresses and a second final notification message to the one or more alternate contact communication addresses. According to some aspects, the content of the first final notification message may be different from that of the second final notification message. According to some aspects, the server may send the first final notification message and the second final notification message concurrently.

According to one example, the server may send the second final notification message to a telephone number associated with an audible voice telephone account a first time. The server may then determine that a connection to the telephone number was incomplete, i.e. not answered or picked up by either a person or a device, and that delivery of the second final notification message was not completed. As a consequence, the server may send the second final notification message to the telephone number associated with the audible voice telephone account a second time.

The server may at some point, for example after sending the notification(s) a predetermined number of times, send a final notification message as a last one of the predetermined number of further notification messages. According to some aspects, the server may configure the final notification message as a first final notification message sent to the user communication address and a second final notification message sent to the at least one alternate contact communication address. According to some examples, the content of the first final notification message may be different from that of the second final notification message. According to some examples, the first final notification message and the second final notification message may be sent concurrently.

For example, according to some aspects the method 3200 may further include, prior to identifying a conclusion of the prescheduled event, establishing a user account associated with the prescheduled event. Still further, the method 3200 may include obtaining the user communication address associated with the prescheduled event and obtaining the alternate contact communication address associated with the prescheduled event. In some aspects, the method 3200 may further include obtaining an event type from a list of event types from a database and obtaining event details to associate with the prescheduled event, including at least an event identifier, an event expected conclusion date, and an event expected conclusion time. In some examples, the identifying a conclusion of the prescheduled event may be accomplished using at least the event expected conclusion date and event expected conclusion time. Still further, the method 3200 may include obtaining user notification criteria associated with the user and obtaining alternate contact notification criteria associated with the user. The notification criteria may include, among other things, acceptable times for notifications, and preferred and alternate contact communication address for each of the user and the alternate contact.

According to some aspects, the method 3200 may further include sending, in accordance with the user notification criteria and the alternate contact notification criteria, the notification message to the user communication address, and the at least one additional notification message to the user communication address and the alternate contact communication address if the first acknowledgement is not received by expiration of the first predetermined period of time.

Figure 20:
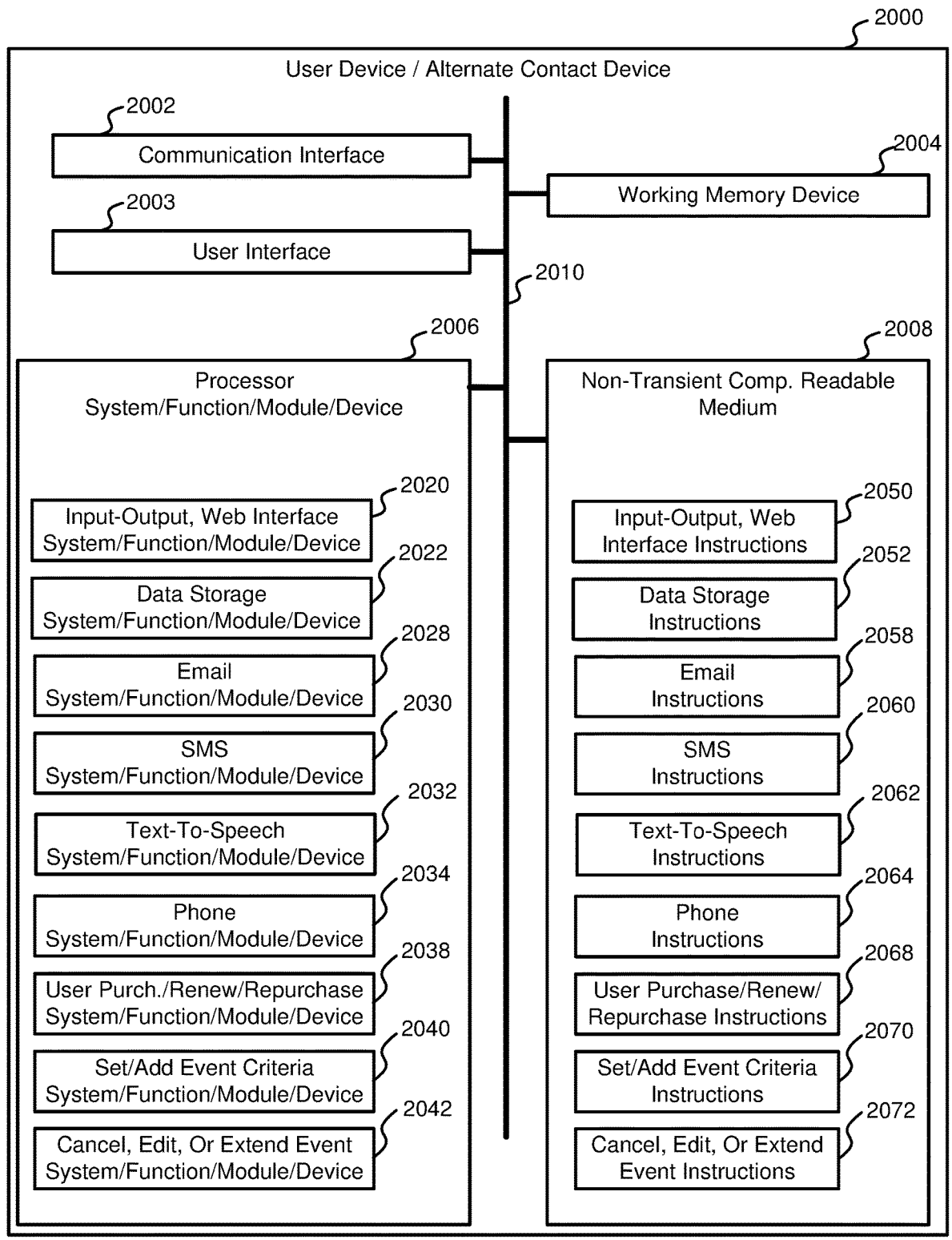
FIG. 20 is a block diagram illustrating an example of a user device or (an alternate contact device) in accordance with an embodiment of the present disclosure.

FIG. 20 is a block diagram illustrating an example of a user device (or an alternate contact device) 2000 in accordance with an embodiment of the present disclosure. For purposes of conciseness, the user device or the alternate contact device will be referred to herein as the device 2000. The device 2000 may be effectively used as an input/output device communicatively coupled to a server 1800 of FIG. 18. The device 2000 may be similar to the user devices such as the devices (e.g., terminal 102, wireless cellular phone 104, personal digital assistant or tablet 106) of FIG. 1 or the terminal 202, the wireless cellular phone 204 (e.g., a smart phone), or the personal digital assistant or tablet 206 of FIG. 2. The device 2000 may include, for example, a communication interface 2002. The communication interface 2002 may enable data and control input and output. The communication interface 2002 may, for example, enable audiovisual input/output with a user as well as enable communication over one or more communication networks, similar to communication network(s) 134 of FIG. 1. The communication interface 2002 may be coupled directly or indirectly to the communication network(s). The device 2000 may include a user interface 2003. The user interface 2003 may include one or more systems/functions/modules/devices configured to permit a user to enter input to, and receive output from, the device 2000. The device 2000 may include a working memory device 2004, and a processor 2006 system/function/module/device. The processor 2006 system/function/module/device may use the working memory device 2004 to store data that is about to be operated on, being operated on, or was recently operated on. The processor 2006 system/function/module/device may store instructions on the working memory device 2004 and/or on one or more other memory devices, such as, for example, a non-transient computer readable medium system/function/module/device (hereinafter non-transient computer readable medium 2008). When executed by the processor 2006, the instructions may cause the processor 2006 to perform, for example, the methods described herein, such as methods associated with FIGS. 19 and 21-32.

The device 2000 may be implemented with a bus architecture, represented generally by the bus 2010. The bus 2010 may include any number of interconnecting buses and bridges depending on the specific application of the device 2000 and the overall design constraints. The bus 2010 may communicatively couple various circuits including one or more processors (represented generally by the processor 2006), the working memory device 2004, the communication interface 2002, and the non-transient computer readable medium 2008. The bus 2010 may also link various other circuits and devices, such as timing sources, peripherals, voltage regulators, and power management circuits and devices, which are well known in the art, and therefore, are not described any further.

The processor 2006 system/function/module/device may be responsible for managing the bus 2010 and general processing, including the execution of software stored on the non-transient computer readable medium 2008. The software, when executed by the processor 2006, causes the processor 2006 to perform the various functions described below for any particular apparatus. The non-transient computer readable medium 2008 and the working memory device 2004 may also be used for storing data that is manipulated by the processor 2006 when executing software.

One or more processors, such as processor 2006 in the device 2000 may execute software. Software may be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a non-transient computer readable medium, such as non-transient computer readable medium 2008. Non-transient computer readable medium may include, by way of example, a magnetic storage device (e.g., hard disk, floppy disk, magnetic tape, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable non-transient medium for storing software, date, and/or instructions that may be accessed and read by a computer or the processor 2006. Computer readable medium may also include, by way of example, a carrier wave, a transmission line, and any other suitable medium for transmitting software and/or instructions that may be accessed and read by a computer or the processor 2006. The non-transient computer readable medium 2008 may reside in the device 2000, external to the device 2000, or distributed across multiple entities including the device 2000. The non-transient computer readable medium 2008 may be embodied in a computer program product. By way of example, a computer program product may include a computer readable medium in packaging materials. Those skilled in the art will recognize how best to implement the described functionality presented throughout this disclosure depending on the particular application and the overall design constraints imposed on the overall system.

In some aspects of the disclosure, the processor 2006 system/function/module/device may include circuitry configured for various functions. For example, the processor 2006 may include a web interface 2020 system/function/module/device configured to manage web page generation and display and to perform input/output operations associated with access to the Internet web and perform, for example, methods associated with FIGS. 19, 20A, 20B, 22A, 22B, 23, and 24. For example, the processor 2006 may include a data storage 2022 system/function/module/device configured to store data including data used to populate user profiles and data obtained, for example, temporarily, from a system database. For example, the processor 2006 may include an email 2028 system/function/module/device configured to configured to serve, for example, email accounts and process email messages. For example, the processor 2006 may include a short message service (SMS) 2030 system/function/module/device configured to serve, for example, SMS message accounts and process SMS messages. For example, the processor 2006 may include a text-to-speech 2032 system/function/module/device configured to convert text to speech. For example, the processor 2006 may include a phone 2034 system/function/module/device configured to serve phone accounts and phone messages. For example, the processor 2006 may include a user purchase/renew/repurchase 2038 system/function/module/device configured to perform, for example, the methods of FIGS. 22A, 22B, 23, and 24. For example, the processor 2006 may include a set/add event criteria 2040 system/function/module/device configured to perform, for example, the methods of FIGS. 21A, 21B, 25A, 25B, and 26. For example, the processor 2006 may include a cancel, edit, or extend event 2042 system/function/module/device configured to perform, for example, the methods of FIGS. 27A and 27B.

In some aspects of the disclosure, non-transient computer readable medium 2008 of the device 2000 may include instructions that may cause the various systems/functions/modules/devices of the processor 2006 to perform aspects of the methods described herein. For example, the non-transient computer readable medium 2008 may include web interface instructions 2050 corresponding to the web interface 2020 system/function/module/device. For example, the non-transient computer readable medium 2008 may include data storage instructions 2052 corresponding to the data storage 2022 system/function/module/device. For example, the non-transient computer readable medium 2008 may include email instructions 2058 corresponding to the email 2028 system/function/module/device. For example, the non-transient computer readable medium 2008 may include SMS 2060 instructions corresponding to the SMS 2030 system/function/module/device. For example, the non-transient computer readable medium 2008 may include text-to-speech instructions 2062 corresponding to the text-to-speech 2032 system/function/module/device. For example, the non-transient computer readable medium 2008 may include phone instructions 2064 corresponding to the phone 2034 system/function/module/device. For example, the non-transient computer readable medium 2008 may include user purchase/renew/repurchase instructions 2068 corresponding to the user purchase/renew/repurchase 2038 system/function/module/device. For example, the non-transient computer readable medium 2008 may include set/add event criteria instructions 2070 corresponding to the set/add event criteria 2040 system/function/module/device. For example, the non-transient computer readable medium 2008 may include cancel event, edit event, or extend event instruction 2072 corresponding to the cancel, edit, or extend event 2042 system/function/module/device.

Figure 21A:
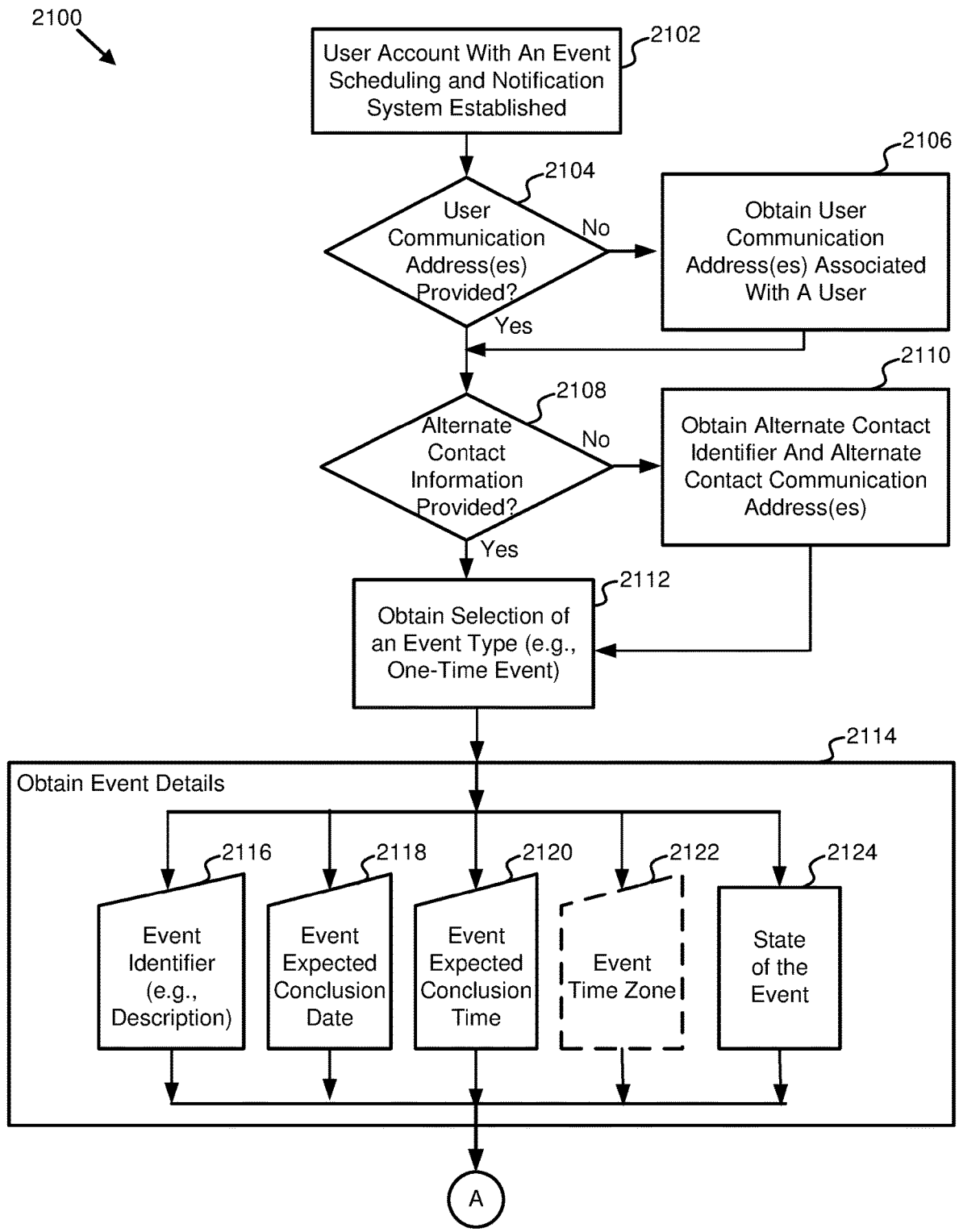
FIG. 21A and FIG. 21B together comprise a flow diagram illustrating an exemplary method, operational at a user device or a server, for receiving user information, alternate contact information, scheduling events and event notifications, and/or sending event notifications in accordance with an embodiment of the present disclosure FIG. 22A and FIG. 22B together comprise a flow diagram illustrating an exemplary method 800, operational at server, for processing a purchase in accordance with an embodiment of the present disclosure.
Figure 21B:
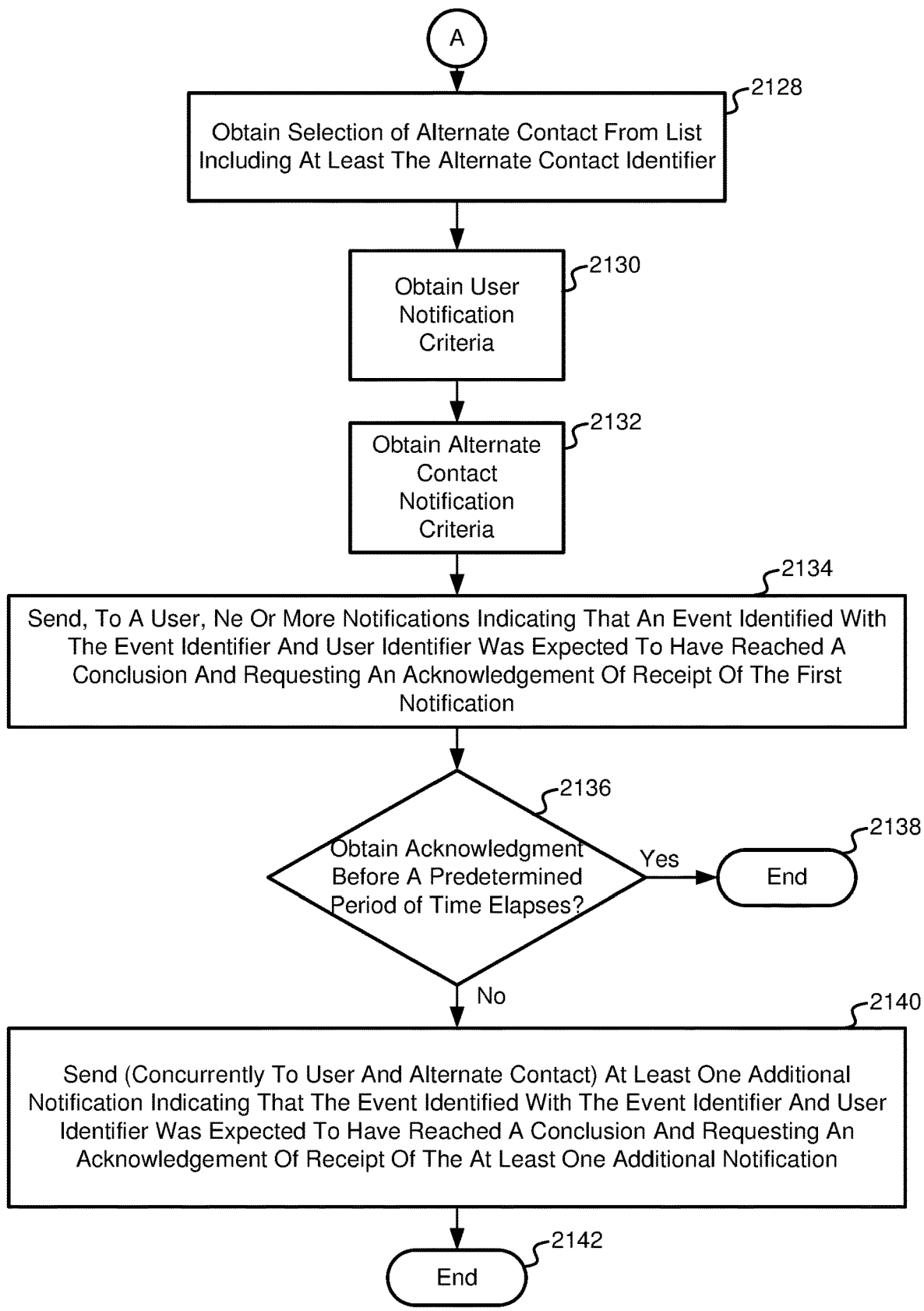

FIG. 21A and FIG. 21B together comprise a flow diagram illustrating an exemplary method 2100, operational at a user device or a server, for obtaining user information, alternate contact information, scheduling events and event notifications, and/or sending event notifications in accordance with an embodiment of the present disclosure. The user device (or alternate contact device) may be exemplified by device 2000 of FIG. 20. The server may be exemplified by the server 1800 of FIG. 18.

A user, using a user device, may establish a user account with an event scheduling and notification system 2102. The event scheduling and notification system may employ methods, such as methods associated with FIGS. 19, 20 and 21-17, to acquire user information.

According to one embodiment, a determination may be made as to whether one or more user communication address(es), such as, for example, an email address, or a telephone number for an SMS or voice account, were previously provided to (or stored with) the event scheduling and notification system 2104. If at least one or more user communication address(es) were not previously provided to (or stored with) the server may obtain one or more user communication address(es) associated with a user 2106. Obtaining one or more user communication address(es) associated with a user may be achieved using, for example, aspects described herein.

If at least one or more user communication address(es) were previously provided to (or stored with) the event scheduling and notification system, or if at least one or more user communication address(es) were just obtained, a determination may be made as to whether alternate contact information, such as, for example, an alternate contact identifier and one or more alternate contact communication address(es) associated with the alternate contact identifier were previously provided to (or stored with) the event scheduling and notification system 2108.

If an alternate contact identifier and one or more alternate contact communication address(es) associated with the alternate contact identifier were not previously provided to (or stored with) the event scheduling and notification system, the server may obtain an alternate contact identifier and one or more alternate contact communication address(es) associated with the alternate contact identifier 2110.

According to some aspects, the one or more user communication address(es) may include at least one of: a first telephone number associated with an audible voice telephone account of the user, a second telephone number associated with a short message service (SMS) account of the user, or an email address associated with an email account of the user. According to some aspects, the one or more alternate contact communication address(es) may include at least one of: a first telephone number associated with an audible voice telephone account of the alternate contact, a second telephone number associated with a short message service (SMS) account of the alternate contact, or an email address associated with an email account of the alternate contact. In some aspects, the alternate contact may be a person, group of persons, or a business entity.

If alternate contact information was previously provided to (or stored with) the event scheduling and notification system, or the device just received the alternate contact identifier and one or more alternate contact communication address(es) associated with the alternate contact identifier, the user may be prompted to select an event type (e.g., one-time event, series event, weekend only event, etc.) from, for example, a list displayed on a display of the user device. Accordingly, the server may obtain an event type from a list of event types 2112. Other ways to obtain an event type are within the scope of the disclosure. According to some aspects, the event type may be one of a single event and a serial event.

A user may schedule events which can be one-time or recurring events. Each event may include an identifier (e.g., a description), an expected conclusion date and conclusion time, a designated alternate contact (e.g., an emergency contact), and communication mechanisms (e.g., email, SMS, voice telephone) used to send/receive notifications. The user may select a different time zone for each event as needed. For example, if a user travels from home in New York to California, the user can set the time zone for the California event to California's time zone.

Recurring events may be scheduled, for example, on a daily, weekly, or monthly basis. When setting up recurring events, the user may select when to start and end the recurring event.

Next, for example, the device may display an event detail input screen, or series of screens. The user may be prompted to enter/select event details. The event type may inform pertinent event details. For example, an event expected conclusion date of a one-time type event may be a single value (e.g., one value representing day, month, and year); however, an event expected conclusion date of a series type event may be a series of values (e.g., a series of unique values beginning with, and including, a first event expected conclusion date followed by a series of dates incremented by 21 days and concluding 19 weeks after the first event expected conclusion date).

Accordingly, the server may obtain event details to associate with the event type, including at least an event identifier, an event expected conclusion date, and an event expected conclusion time 2114. Obtaining event details to associate with the event type, including at least an event identifier, an event expected conclusion date, and an event expected conclusion time may be achieved, for example, by obtaining such data from a database according to aspects described herein. Event details that a user may enter/select may include, for example, an event identifier, such as an event name (e.g., Marine Corp Marathon), event description (e.g., hiking with Jan and Terry), or a unique alphanumeric number provided/generated by the user, the device, or the event scheduling and notification system. The preceding examples are exemplary and non-limiting. Other event details that the user may enter/select include an event expected conclusion date, an event expected conclusion time, and an event time zone (although this detail may be determined by the device, for example, in coordination with a geographic location identification feature that may be native to the device). In some embodiments, the server may obtain one or more additional event details including at least one of: an event time zone or the state of the event 2124. Obtaining one or more additional event details may be achieved by obtaining such information from, for example, a database according to aspects described herein.

Accordingly, the server may obtain an event identifier 2116, an event expected conclusion date 2118, and an event expected conclusion time 2120. Optionally, the server may additionally obtain an event time zone 2122. In some embodiments, the event time zone 2122 may be pre-set and/or derived locally by the device and/or the event scheduling and notification system. The server may additionally obtain a state of the event 2124.

The user may also be prompted to select an alternate contact to associate with the event identifier. Accordingly, the server may obtain a selection of an alternate contact, from a list including at least the alternate contact identifier, to associate with the event identifier 2128. In some embodiments, a plurality of alternate contact identifiers (having different and/or associated alternate contact communication address(es)) may be presented to a user. In other embodiments, one alternate contact may be provided as a default selection to a user.

The server may prompt the user to provide user notification criteria, which may include, for example, the communication address(es) to be associated with each notification sent to the user (e.g., send first user notification to user's SMS account, send all subsequent notification(s) to user's SMS and email accounts). Accordingly, the server may obtain user notification criteria including at least one user communication address to associate with a notification message to be sent to the user 2130. Obtaining user notification criteria including one or more user communication address(es) to associate with a notification message to be sent to the user may be achieved by obtaining such information from the user and/or a database according to aspects described herein, The device may prompt the user to provide alternate contact notification criteria, which may include, for example, the alternate contact communication address(es) to be associated with each notification message sent to the alternate contact (e.g., send all notification messages to alternate contact's SMS and email accounts). Accordingly, the server may obtain alternate contact notification criteria including at least one alternate contact communication address to associate with a notification message to be sent to the alternate contact 2132. Obtaining alternate contact notification criteria including at least one alternate contact communication address to associate with a notification message to be sent to the alternate contact may be performed according to aspects described herein.

Subsequent to receipt of all information and successful scheduling of at least one event, the server may send, in accordance with the user notification criteria and the alternate contact notification criteria, at least a first notification message to the user, and if the user does not acknowledge receipt of the first notification message, at least a final notification message to the user and the alternate contact.

In greater detail, the server may send at least one notification to a user (e.g., if the user acknowledges receipt of the at least one notification (e.g., indicating a safe return home after a hike)) or, if the user does not acknowledge receipt of the notification, at least two notifications to the user and one notification to the alternate contact. In some embodiments, the second notification to the user is sent concurrently (or nearly concurrently) with the first notification to the alternate contact. According to some aspects, the server may send, on the event expected conclusion date and on and after the event expected conclusion time, one or more notification messages to the one or more user communication address(es) indicating that an event identified with the event identifier and user identifier was expected to have reached a conclusion, and request an acknowledgement of receipt of the first notification 2134. According to some aspects, the server may send the first notification message on the event expected conclusion date at substantially the event expected conclusion time.

The user may be given a predetermined period of time to respond to the request to send an acknowledgement of receipt of the first notification 2136. If the server obtains the acknowledgement of receipt of the first notification before the predetermined period of time elapses, the method may end 2138. The sending of the acknowledgement may be indicative of a successful conclusion of the event and/or safe return of the user to a home or other location and there is no need to send additional notifications. If the server does not obtain the acknowledgement of receipt of the first notification before the predetermined period of time elapses, the server may send at least one additional notification message and/or a series of notification messages to the one or more user communication address(es) and the one or more alternate contact communication address(es) indicating that the event identified with the event identifier and user identifier was expected to have reached a conclusion, and request an acknowledgement of receipt of the at least one additional notification 2140. The at least one additional notification may be sent concurrently to a user device and an alternate contact device. If, for example the state of the event is "Final Alerts to User and Alternate Contact(s)" the at least one additional notification sent to the user device would be the second (and final) notification sent to the device, while the notification sent to the alternate contact would be the first (and final) notification sent to the alternate contact. Under such a circumstance, the method would end 2142. According to such an aspect, a final notification message may be two notification messages, one each to the user and alternate contact, and the server may send the two notification messages concurrently to the user and the alternate contact. In some aspects, the final notification message is two notification messages, one each to the user and alternate contact, the notification message to the user may be different from the notification message to the alternate contact. Thus, the final notification message may be two notification messages having different content.

Figure 22A:
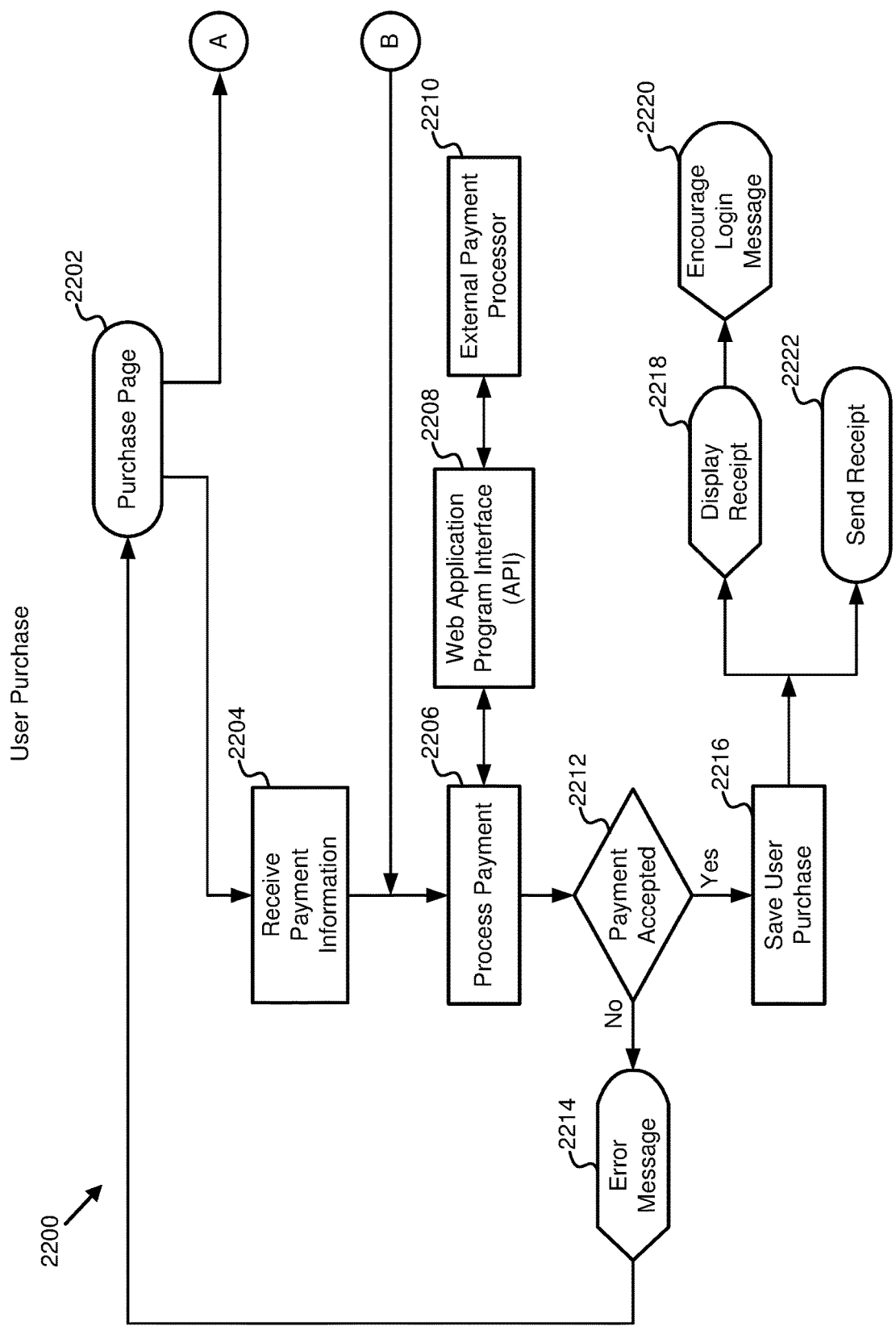
Figure 22B:
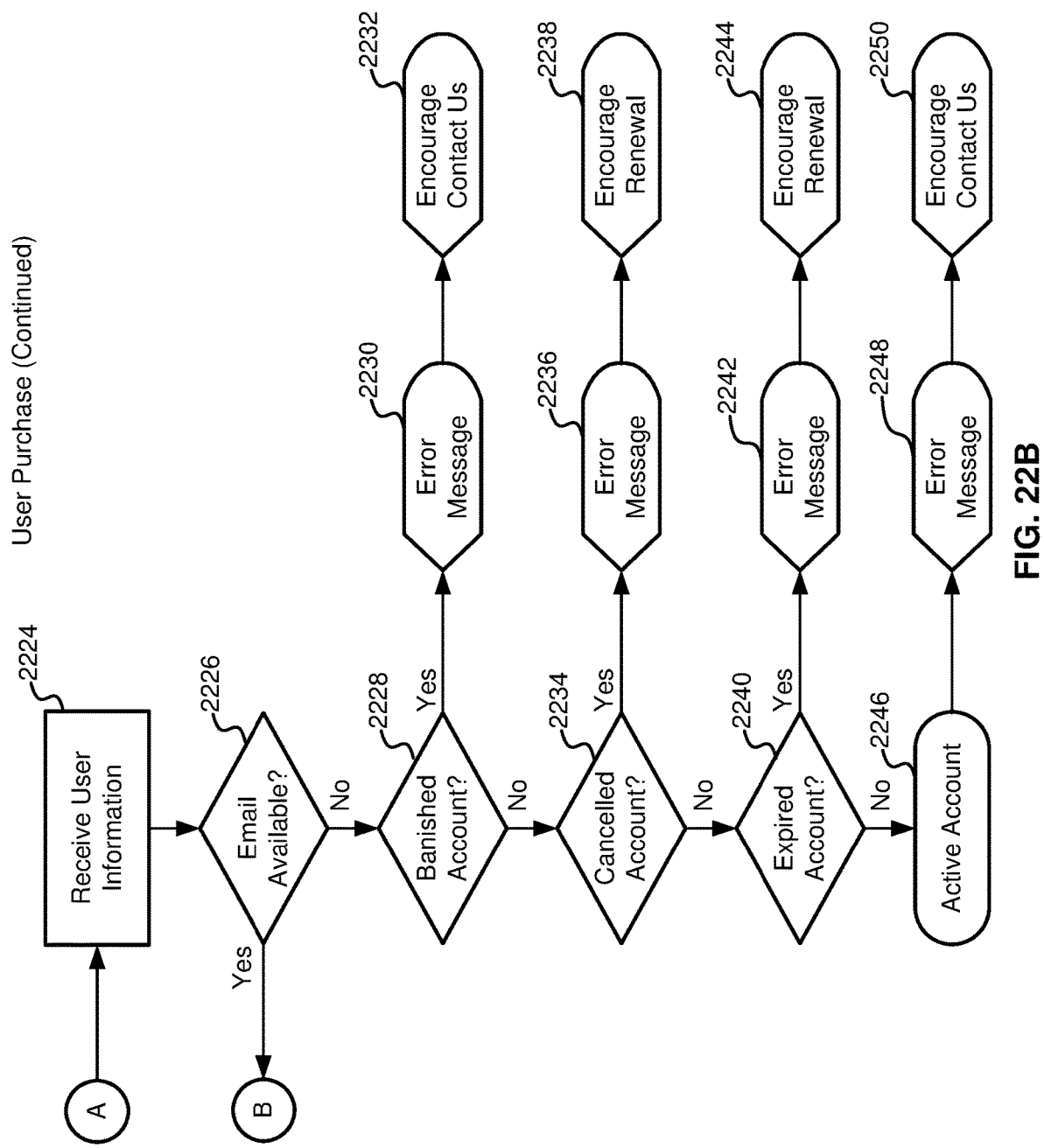

FIG. 22A and FIG. 22B together comprise a flow diagram illustrating an exemplary method 2200, operational at server, for processing a purchase in accordance with an embodiment of the present disclosure. According to some embodiments, the server may be configured as an event scheduling and notification system. According to some embodiments, the purchase may be the purchase of a user account, or a new user account.

Embodiments described herein may allow a user to purchase a product, such as a membership, or a new membership, with any email address that has not been previously associated with an active, banished, cancelled, or expired account. When a membership is purchased, the purchase may be saved, and the event scheduling and notification system may generate a text-to-speech version of the user's name. The event scheduling and notification system may save the user's name (e.g., a user identifier) and email address (e.g., a user communication address) in a memory device associated with the event scheduling and notification system. The event scheduling and notification system may save additional information, such as, user password, user time zone, and user state in the memory device. The event scheduling and notification system may also calculate and/or store an expiration date and populate all received/calculated information in a user profile. The user profile may be stored in a database in the memory device. The memory device, or portions of the memory device, may be secure.

According to an exemplary method, the server may present a purchase page 2202. The purchase page may be presented, for example, to a user via a user device coupled to the server via a communication network. The server may receive payment information 2204. The server may process a payment 2206. The server may perform payment processing. In some embodiments, an external payment processor 2210 (e.g. external merchant processor 122, FIG. 1, and 222, FIG. 2) may perform payment processing via use of a web application program interface (API) 2208. An example of one API is the RESTful Web API.

A determination may be made as to whether payment was accepted 2212. If payment was accepted, the server may save the user purchase 2216. In connection with saving the user purchase 2216, the server may cause a receipt to be displayed on the user device 2218. After, or in conjunction with displaying the receipt on the user device 2218, the server may cause a login screen to be displayed, or otherwise provide for a login activity on a presently displayed screen. The server may cause a notification message to be displayed, which encourages the user to login 2220. After, or in conjunction with displaying the receipt on the user device 2218, the server may send an electronic version of the receipt to the user 2222. If payment was not accepted, the server may cause an error message to be sent to and displayed by the user's device 2214. Thereafter, the method may return to the purchase page 2202.

From the purchase page 2202 a user may provide user information, such as an email address to the server. The email address may serve as an identifier of a user account. Accordingly, the server may receive user information 2224. Exemplary information may include a user name and a user email account. The server may determine if an email address provided by a user is an available email address 2226. If the email address is available, the method may return to process a payment 2206 (e.g., payment processing). If the email is not available, a series of determinations may be made to determine why the email is not available and various error messages may be provided to a user for informational purposes. For example, if the email is not available, a determination may be made as to whether the email is associated with a banished account 2228. If the email is associated with a banished account an error message may be generated 2230. The error message may encourage the user to contact a representative of the event scheduling and notification system 2232. If the account is not a banished account, a determination may be made as to whether the email is associated with a cancelled account 2234. If the email is associated with a cancelled account an error message may be generated 2236. The error message may encourage the user to renew the user's account 2238. If the account is not a cancelled account, a determination may be made as to whether the email is associated with an expired account 2240. If the email is associated with an expired account an error message may be generated 2242. The error message may encourage the user to renew the user's account 2244. If the account is not an expired account, then the email is associated with an active account 2246. If the email is associated with an active account an error message may be generated 2248. The error message may encourage the user to contact a representative of the event scheduling and notification system 2250.

Figure 23:
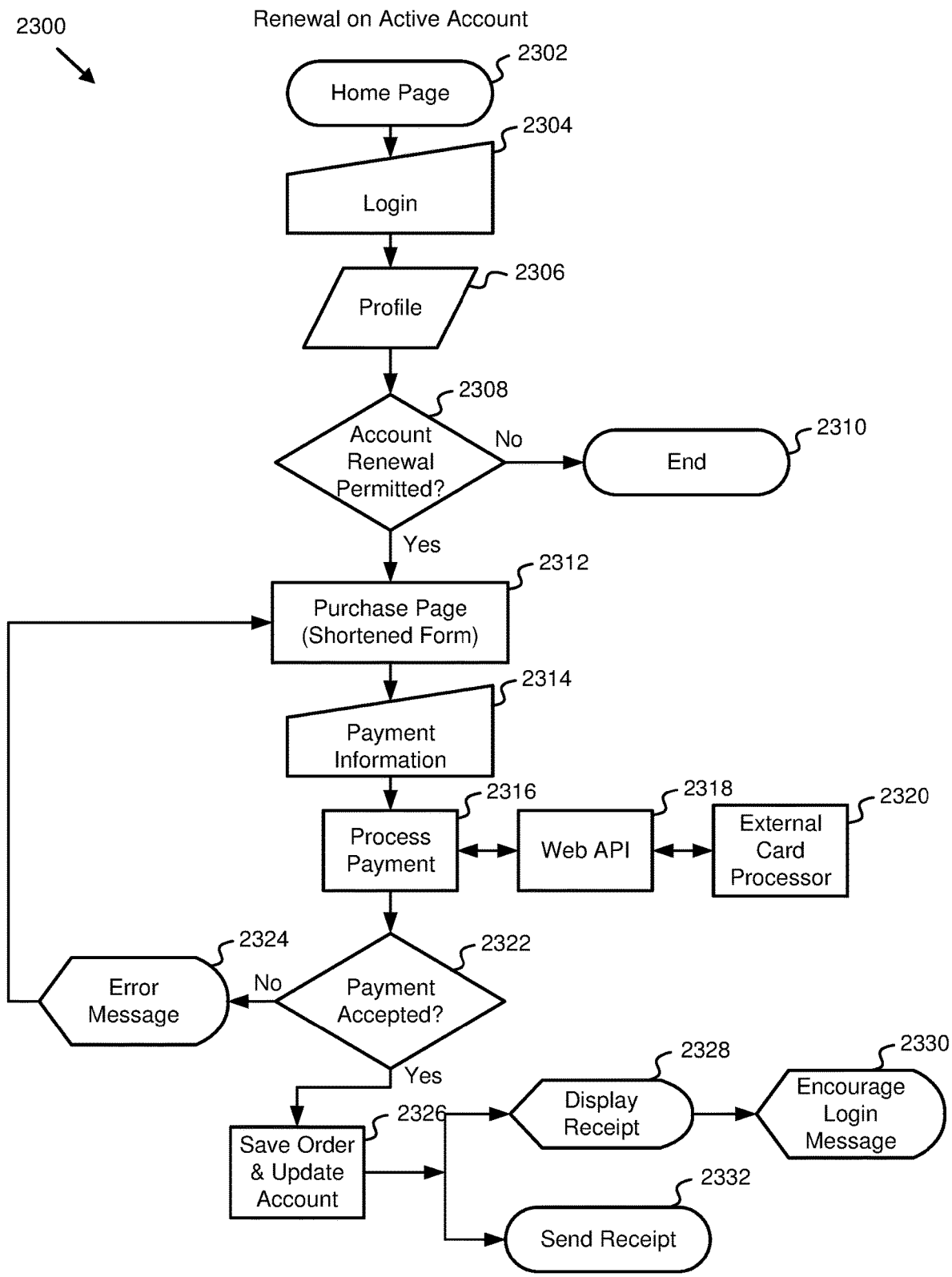
FIG. 23 is a flow diagram illustrating an exemplary method, operational at a server, of renewing an active account in accordance with an embodiment of the present disclosure.
Figure 24:
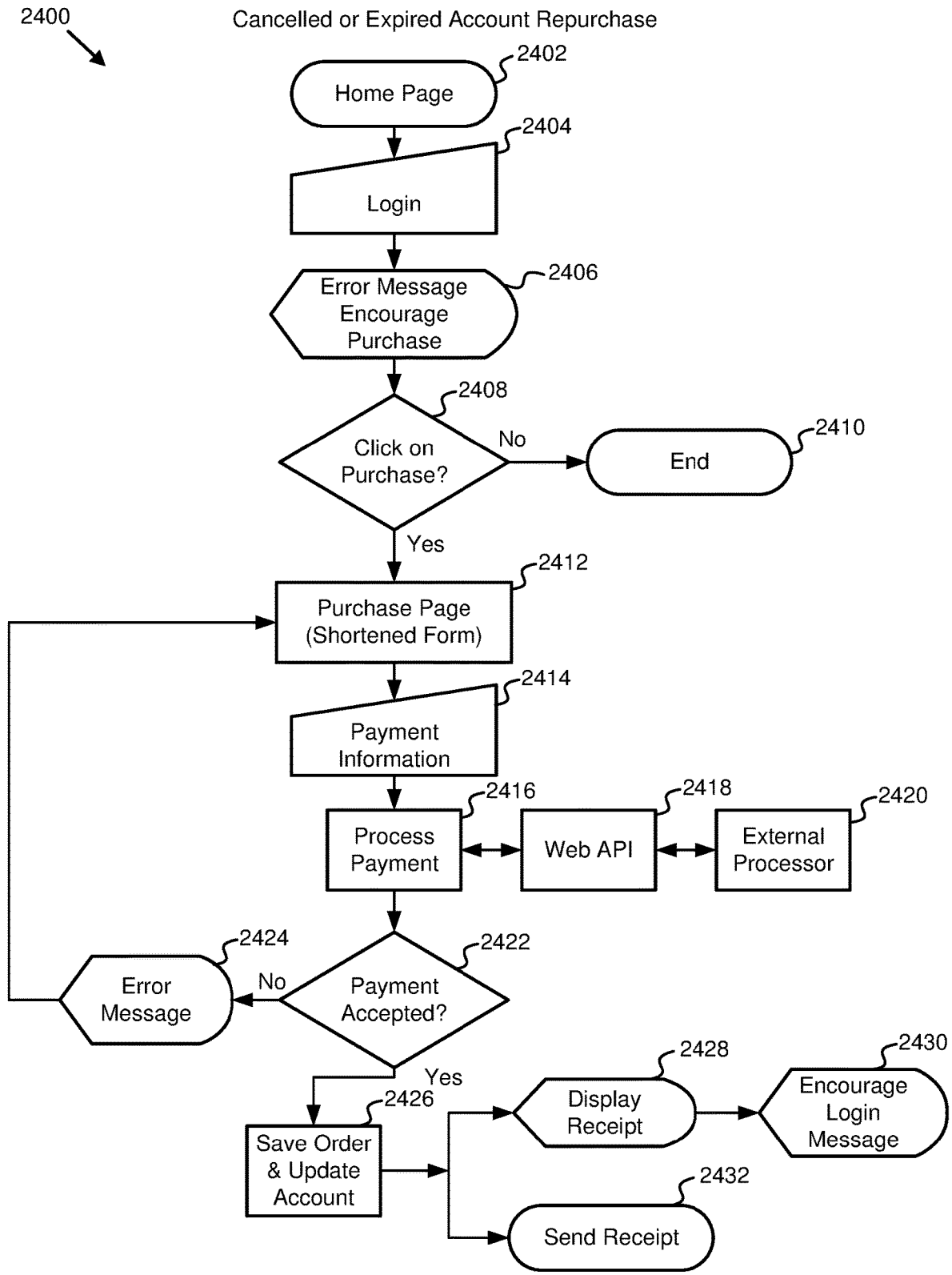
FIG. 24 is a flow diagram illustrating an exemplary method, operational at a server, of repurchasing an account after cancellation or expiry of the account in accordance with an embodiment of the present disclosure.

FIG. 23 is a flow diagram illustrating an exemplary method 2300, operational at a server, of renewing an active account in accordance with an embodiment of the present disclosure. FIG. 24 is a flow diagram illustrating an exemplary method 2400, operational at a server, of repurchasing an account after cancellation or expiry of the account in accordance with an embodiment of the present disclosure.

With a renewal from an active account (FIG. 23) or a repurchase from an expired or cancelled account (FIG. 24), when an order is saved the event scheduling and notification system may calculate an expiration date and populate the expiration date in a profile of the user. According to one example, an active account may be renewed within 180 days of the expiration date. A renewal or repurchase may generate a shortened purchase form, as the application has retained the user's profile information, alternative contact(s) information (e.g., emergency contact(s) information) and previously scheduled events that are still pending. If the user has changed the name associated with the account, a new text-to-speech version of the name may be generated. According to one embodiment, credit card information is not retained and must be resubmitted.

After an initial purchase or a repurchase of an account (e.g., a membership subscription), the user may change any information in his/her profile. According to one embodiment, in a profile page, the user may select a preferred method or methods for being contacted, including email, text, and/or phone notifications. The user may also listen to the text-to-speech version of his/her name. According to one embodiment, at any time thereafter when the user's name is changed (e.g., due to marriage or divorce) and new profile information is saved, a text-to-speech version of the user name is created and stored for insertion into an audible voice phone notification. The text-to-speech service is an on-demand task that tells the system to request that the external service generate a new text-to-speech version of any new name or name that has been changed. According to one embodiment, the text-to-speech version of the user name is included in notification(s) sent to the alternate contact.

After purchase or renewal of an account (e.g., a membership), when the user logs in, he/she is taken to a contacts and events page, where the user may then create events. However, according to one embodiment, before an event may be scheduled, the user may create at least one alternate contact (e.g., emergency contact) and designate how to reach the alternate contact via email, text, and/or phone calls. User information (e.g., name, user communication address(es), etc.) and alternate contact information (e.g., name, alternate contact communication address(es)) may be edited at any time.

According to one embodiment, all user information (e.g., user communication address(es), alternate contact information including alternate contact communication address(es), and scheduled events) may be compiled into a database and stored on a data server, such as the local data storage device 114, FIG. 1, the remote data storage device 118, FIG. 1, and/or the database 218, FIG. 2.

Returning now to FIG. 23, a server may send a home page to, and/or may cause a home page to be displayed at, a user device 2302. The server may receive login information from the device 2304. The server may obtain a user profile, associated with the user being logged in, from a database 2306. A determination may be made as to whether the user is permitted to renew the user's account 2308. If the user is not permitted to renew the user account, the method may end 2310. However, if the user is permitted to renew the user's account, the server may cause a shortened form of a purchase page 2312 to be presented to the user on the user's device. According to some embodiments the shortened form may be a complete purchase page where information from a user's account is pre-populated into the purchase page. The server may receive payment information, such as, for example, credit card, debit card, or electronic check information, from the user's device 2314. The server may process the payment information 2316. For example, according to one embodiment, the server may exchange information with an external payment processor 2320 via a web API 2318. An example of an external payment processor may be an external merchant processor 122, FIG. 1, and 222, FIG. 2. An example of a web API may be a RESTful web API. A determination may be made as to whether the payment was accepted 2322. If payment was not accepted, the server may cause an error message to be displayed on the user's device 2324. Thereafter, the method may return to the purchase page 2312, where the user may provide new (or corrected) payment information to the server. If payment was accepted, the server may save the purchase (e.g., user order) and update the user's account information (e.g., update profile, update database) 2326. In connection with saving the purchase and updating the user's account, 2326, the server may cause a receipt to be displayed on the user's device 2328. After, or in conjunction with displaying the receipt on the user's device 2328, the server may cause a login screen to be displayed, or otherwise provide for a login activity on a presently displayed screen. The server may cause a notification message to be displayed, which encourages the user to login 2330. After, or in conjunction with displaying the receipt on the user's device 2328, the server may send an electronic version of the receipt to the user 2332.

Returning now to FIG. 24, a flow diagram illustrating an exemplary method 2400, operational at a server, of repurchasing an account after cancellation or expiry of the account according to embodiments of the disclosure, a server may send a home page to, and/or may cause a home page to be displayed at, a user device 2402. The server may receive login information from the device 2404. However, the user's attempt to login to a cancelled or expired account may cause the server to cause the user's device to display an error message on the user's device 2406. The error message may, for example, encourage the user to purchase an account. A determination may be made as to whether the server receives a signal indicative of the user wanting to purchase an account 2408. For example, the server may cause a purchase button to be displayed on the user's device. Clicking on the purchase button may send a signal indicative of the user's desire to purchase an account to the server. Not clicking on the purchase button during a predetermined period of time or clicking on a button declining the purchase (e.g., a no thanks button), may send a signal to the server that is indicative of the user's desire not to purchase an account. If a signal is received that is indicative of the user's desire not to purchase an account, the method may end 2410.

However, if a signal is received that is indicative of the user's desire to purchase an account, the server may cause a shortened form of a purchase page 2412 to be presented to the user on the user's device. According to some embodiments the shortened form may be a complete purchase page where information from a user's account is pre-populated into the purchase page. The server may receive payment information, such as, for example, credit card, debit card, or electronic check information, from the user's device 2414. The server may process the payment information 2416. For example, according to one embodiment, the server may exchange information with an external payment processor 2420 via a web API 2418. An example of an external payment processor may be an external merchant processor 122, FIG. 1, and 222, FIG. 2. An example of a web API may be a RESTful web API. A determination may be made as to whether the payment was accepted 2422. If payment was not accepted, the server may cause an error message to be displayed on the user's device 2424. Thereafter, the method may return to the purchase page 2412, where the user may provide new (or corrected) payment information to the server. If payment was accepted, the server may save the purchase (e.g., user order) and update the user's account information (e.g., update profile, update database) 2426. In connection with saving the purchase and updating the user's account, 2426, the server may cause a receipt to be displayed on the user's device 2428. After, or in conjunction with displaying the receipt on the user's device 2428, the server may cause a login screen to be displayed, or otherwise provide for a login activity on a presently displayed screen. The server may cause a message to be displayed, which encourages the user to login 2430. After, or in conjunction with displaying the receipt on the user's device 2428, the server may send an electronic version of the receipt to the user 2432.

Figure 25A:
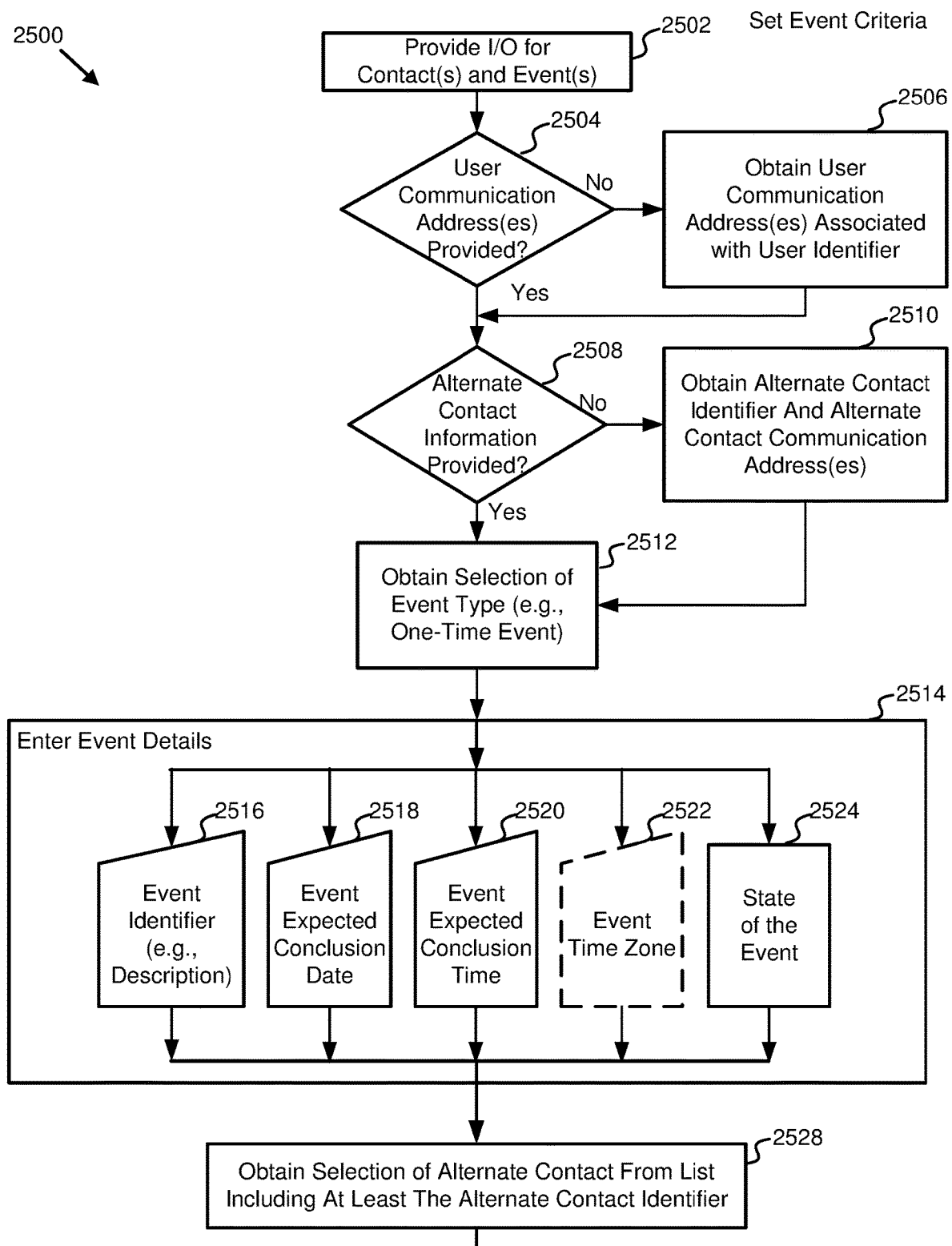
FIG. 25A and FIG. 25B together comprise a flow diagram illustrating an exemplary method, operational at a user device or a server, for receiving user information, alternate contact information, and scheduling events and event notifications in accordance with an embodiment of the present disclosure.
Figure 25B:
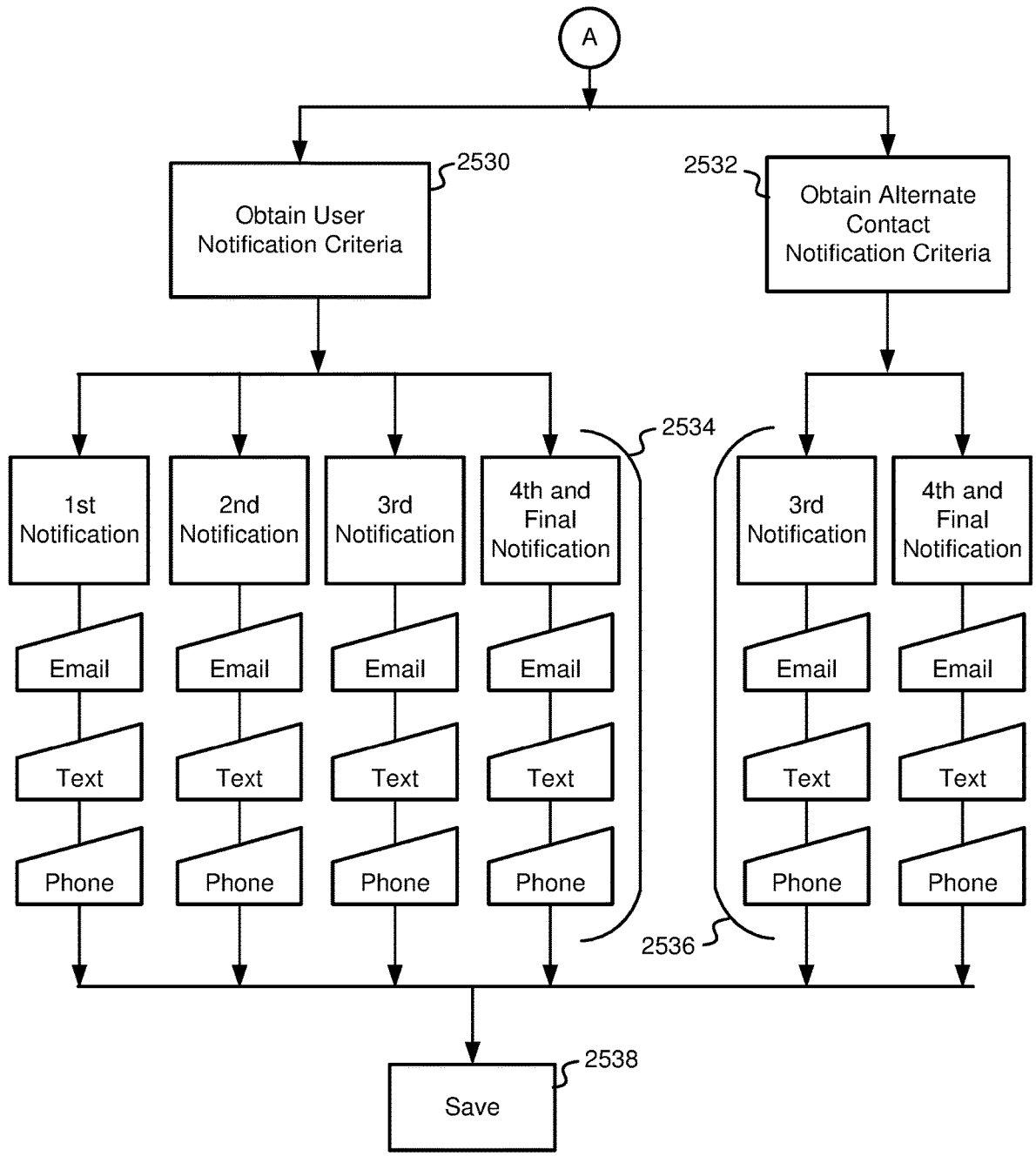

FIG. 25A and FIG. 25B together comprise a flow diagram illustrating an exemplary method 2500, operational at a user device or a server, for entering user information, alternate contact information, and scheduling events and event notifications in accordance with an embodiment of the present disclosure. The user device may be similar to the user devices such as the terminal 102, the wireless cellular phone 104 (e.g., a smart phone), or the personal digital assistant or tablet 106 of FIG. 1, or the devices (e.g., terminal 202, wireless cellular phone 204, personal digital assistant or tablet 206) of FIG. 2. and device 2000 of FIG. 20. The server may be similar to, for example, web server 112 of FIG. 1, server 1800 of FIG. 18, and/or web application server 213 of FIG. 2. The server may be configured as an event scheduling and notification system/function/module/device, such as, for example, the system 110 of FIG. 1. The user device may be communicatively coupled to the server via one or more communication networks, such as communication network(s) 134 of FIG. 1. A user, using the user device, may establish a user account with an event scheduling and notification system. For ease of reference, a server configured as an event scheduling and notification system and a user device acting as an input/output device communicatively coupled to the server may be collectively or individually referred to herein as the "event scheduling and notification system" or the "system." According to one aspect, a method of obtaining user communication address(es) and alternate contact information, including alternate contact identifier(s) and alternate contact communication address(es) associated with the alternate contact identifier(s) may be provided as illustrated in the exemplary method 2500 of FIG. 25A and FIG. 25B.

According to one embodiment, a web page, or some other data interface mechanism, which is used to enter/update user communication address(es), and alternate contact information, including alternate contact identifier(s) and associated alternate contact communication address(es) may be displayed on a device of a user. Accordingly, the system may provide input/output (I/O) that may be arranged or configured to provide a user interface for contact(s) and event(s) 2502. A server may cause the device to display the web page on the device or the device may display the web page at the request of a user. For ease of explanation, a device being used to receive and/or output information related to an event scheduling and notification system, as well as a server configured as the event scheduling and notification system, may be referred to herein as the "event scheduling and notification system" or the "system."

A determination may be made as to whether one or more user communication address(es), such as, for example, an email address, or a telephone number for an SMS or voice account, were previously provided to (or stored with) the event scheduling and notification system 2504. If at least one or more user communication address(es) were not previously provided to (or stored with) the event scheduling and notification system 2504 (negative branch), the user may enter such information to the system (e.g., via the device). The system may obtain one or more user communication address(es) associated with a user identifier of the user 2506.

If at least one or more user communication address(es) were previously provided to (or stored with) the event scheduling and notification system 2504 (affirmative branch), or the system (e.g., via the device) has received one or more user communication address(es) associated with a user identifier of the user 2506, a determination may be made as to whether alternate contact information, such as, for example, an alternate contact identifier and one or more alternate contact communication address(es) such as, for example, an email address, or a telephone number for an SMS or voice account, were previously provided to (or stored with) the event scheduling and notification system 2508. If alternate contact information was not previously provided to (or stored with) the event scheduling and notification system 2508 (negative branch), the user may enter such information to the system (e.g., via the device). The system may obtain an alternate contact identifier and one or more alternate contact communication address(es) associated with the alternate contact identifier 2510.

If alternate contact information was previously provided to (or stored with) the event scheduling and notification system 2508 (affirmative branch), or the system (e.g., via the device) has received the alternate contact identifier and one or more alternate contact communication address(es) associated with the alternate contact identifier 2510, the user may be prompted to select an event type (e.g., one-time event, series event, weekend only event, etc.) from, for example, a list displayed on a display of the device. Accordingly, the system (e.g., via the device) may obtain an event type 2512, which may be selected by the user. Other ways of obtaining an event type are within the scope of the disclosure.

A user may schedule events which can be one-time or recurring. Each event may include an identifier (e.g., a description), an expected conclusion date and conclusion time, a designated alternate contact (e.g., an emergency contact), and communication methods (e.g., email, SMS, voice telephone) used to send/receive notifications. The user may select a different time zone for each event as needed. For example, if a user travels from home in New York to California, the user can set the time zone for the California event to California's time zone.

Recurring events may be scheduled, for example, on a daily, weekly, or monthly basis. When setting up recurring events, the user may select when to start and end the recurring event.

Next, for example, the system may cause the device (or some other input/output device used by the system) to display an event detail input screen, or series of screens. The user may be prompted to enter/select event details. The event details that may be pertinent may be informed by the event type. For example, an event expected conclusion date of a one-time type event may be a single value (e.g., one value representing day, month, and year); however, an event expected conclusion date of a series type event may be a series of values (e.g., a series of unique values beginning with, and including, a first event expected conclusion date followed by a series of dates incremented by 21 days and concluding 19 weeks after the first event expected conclusion date). Accordingly, the system (e.g., via the device) may obtain event details 2514. Event details that a user may enter/select may include, for example, an event identifier, such as an event name (e.g., Mother's Birthday Party), event description (e.g., hiking with Jan and Terry), or a unique alphanumeric number provided/generated by the user, the device, or the event scheduling and notification system (e.g., Event-2018-32). The preceding examples are exemplary and non-limiting. Other event details that the user may enter/select include an event expected conclusion date, an event expected conclusion time, and an event time zone (although this detail may be determined by the device, for example, in coordination with a geographic location identification feature that may be native to the device).

Accordingly, the system (e.g., via the device) may receive an event identifier 2516, an event expected conclusion date 2518, and an event expected conclusion time 2520. Optionally, the system (e.g., via the device) may additionally receive an event time zone 2522. In some embodiments, the event time zone 2522 may be pre-set and/or derived locally by the system (e.g., the device and/or server configured as the event scheduling and notification system). The server may additionally obtain the state of the event 2524.

The user may also be prompted to select an alternate contact to associate with the event identifier. Accordingly, the system (e.g., via the device) may obtain an alternate contact from a list including at least the alternate contact identifier 2528. In some embodiments, a plurality of alternate contact identifiers (having different and/or associated alternate contact communication address(es)) may be presented to a user. In other embodiments, one alternate contact may be provided as a default selection to a user.

The system (e.g., via the device) may prompt the user to provide user notification criteria, which may include, for example, the communication address(es) to be associated with each notification sent to the user (e.g., send first user notification to a user's SMS account address, send all subsequent notification(s) to the user's SMS account address and email account address and/or other communication addresses). The communication address(es) may reflect the various methods of communication, for example SMS and email, which can be used for communication of notifications to the user. Accordingly, the system may obtain user notification criteria 2530. A user notification criteria data matrix 2534 illustrates some of the parameters that may be selected for the user notification criteria.

The system (e.g., via the device) may prompt the user to provide alternate contact notification criteria, which may include, for example, the alternate contact communication address(es) to be associated with each notification message sent to the alternate contact (e.g., send all notification messages to the alternate contact's SMS account address and email account address and/or other communication addresses). The communication address(es) may reflect the various methods of communication, for example SMS and email, which can be used for communication of notifications to one or more of the user's alternate contacts. Accordingly, the system may obtain alternate contact notification criteria 2532. An alternate contact notification criteria data matrix 2536 illustrates some of the parameters that may be selected for the alternate contact notification criteria. The user notification criteria, alternate contact notification criteria, user notification criteria data matrix, and alternate contact notification criteria data matrix may be saved 2538.

Figure 26:
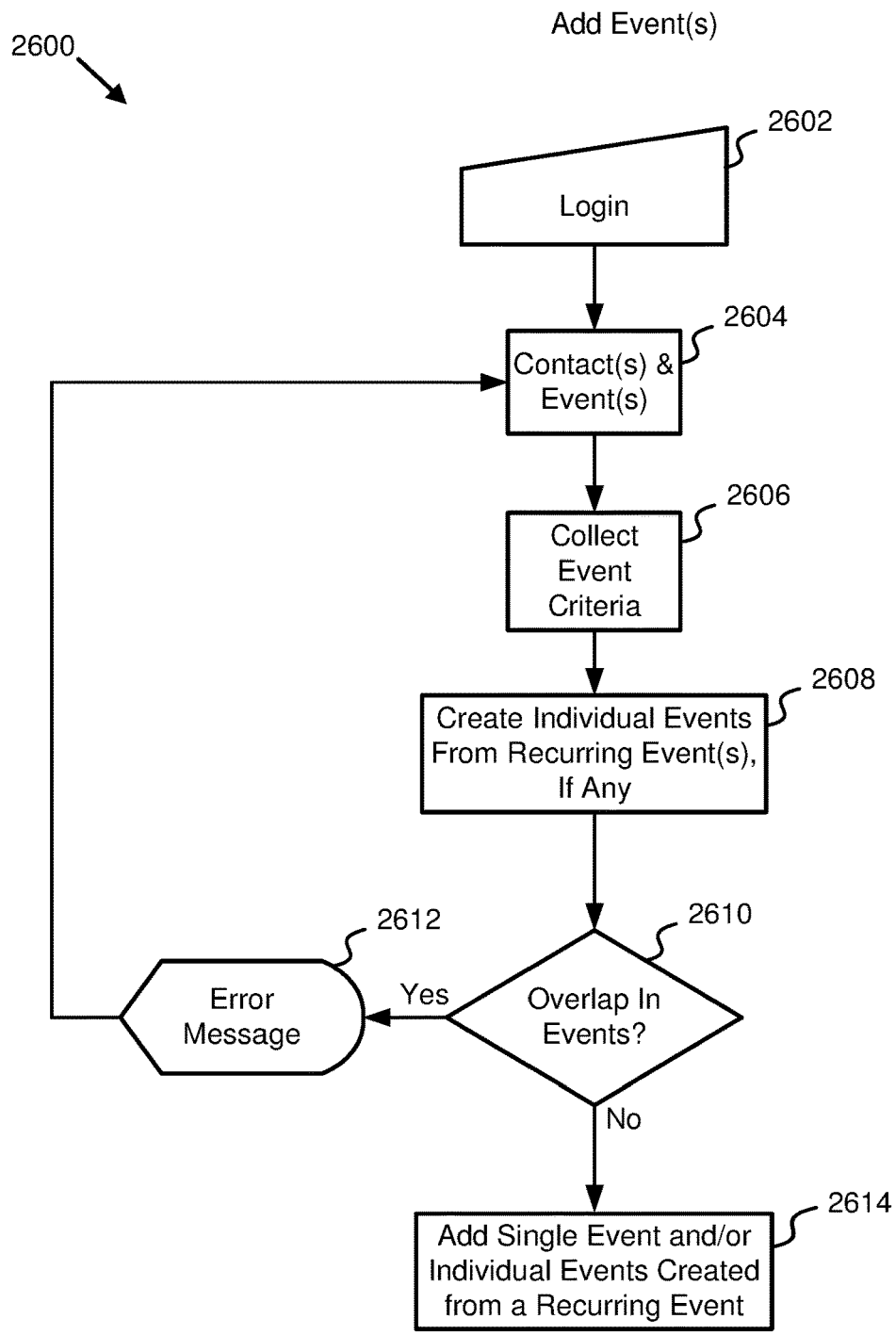
FIG. 26 is a flow diagram illustrating an exemplary method, operational at a user device or a server, for scheduling events (e.g., adding events with associated event criteria), in accordance with an embodiment of the present disclosure.

FIG. 26 is a flow diagram illustrating an exemplary method 2600, operational at a user device or a server, for scheduling events (e.g., adding events with associated event criteria), in accordance with an embodiment of the present disclosure. The user device may be similar to the user devices such as the terminal 102, the wireless cellular phone 104 (e.g., a smart phone), or the personal digital assistant or tablet 106 of FIG. 1, or the devices (e.g., terminal 202, wireless cellular phone 204, personal digital assistant or tablet 206) of FIG. 2, and device 2000 of FIG. 20. The server may be similar to, for example, web server 112 of FIG. 1, web application server 213 of FIG. 2 and/or server 1800 of FIG. 18. The server may be configured as an event scheduling and notification system/function/module/device, such as, for example, the system 110 of FIG. 1. The user device may be communicatively coupled to the server via one or more communication networks, such as communication network(s) 134 of FIG. 1. A user, using the user device, may establish a user account with an event scheduling and notification system. For ease of reference, a server configured as an event scheduling and notification system and a user device acting as an input/output device communicatively coupled to the server may be collectively or individually referred to herein as the "event scheduling and notification server" or the "server." According to one aspect, a method of scheduling events (e.g., adding events with associated event criteria), may be provided as illustrated in the exemplary method 2600 of FIG. 26.

The server may receive login information from a user (e.g., via a user device) and successfully log the user into the system 2602. The system may perform actions consistent with the exemplary method 2600 of FIG. 26 including providing input/output (I/O) for contact(s) and event(s) 2604. The system may collect event criteria 2606.

When a user saves an event, the system collects the event criteria and, if there are any recurring events, the system creates individual events from the recurring events 2608. According to some embodiments this may be performed by an event iterator (not shown) and the creation of the individual events may be referred to as unwinding the event iterator.

A determination may be made as to whether any events scheduled by a user overlap 2610. If there is an overlap in events, an error message may be displayed 2612. The system may then return to providing input/output (I/O) for contact(s) and event(s) 2604. If there is an overlap in scheduled events, the system keeps the original scheduled event and does not save the new overlapping event. The user may be prompted to review the scheduled events to eliminate the overlap or choose which event to retain. If the events do not overlap, the single event, and/or individual events created from a recurring event, may be added 2614.

Figure 27A:
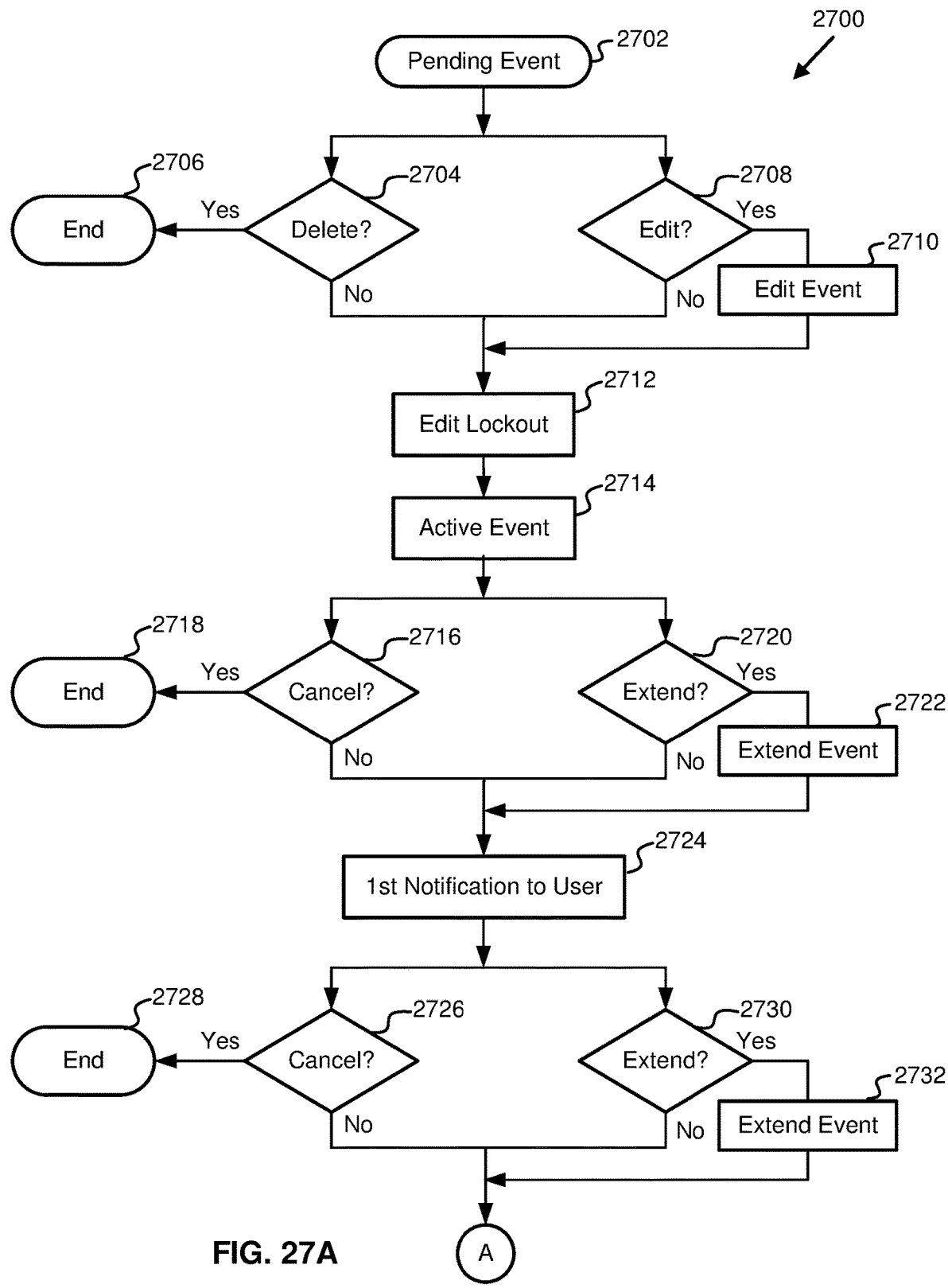
FIG. 27A and FIG. 27B together comprise a flow diagram illustrating an exemplary method, operational at a user device or a server, for canceling, editing, and/or extending events in accordance with an embodiment of the present disclosure.
Figure 27B:
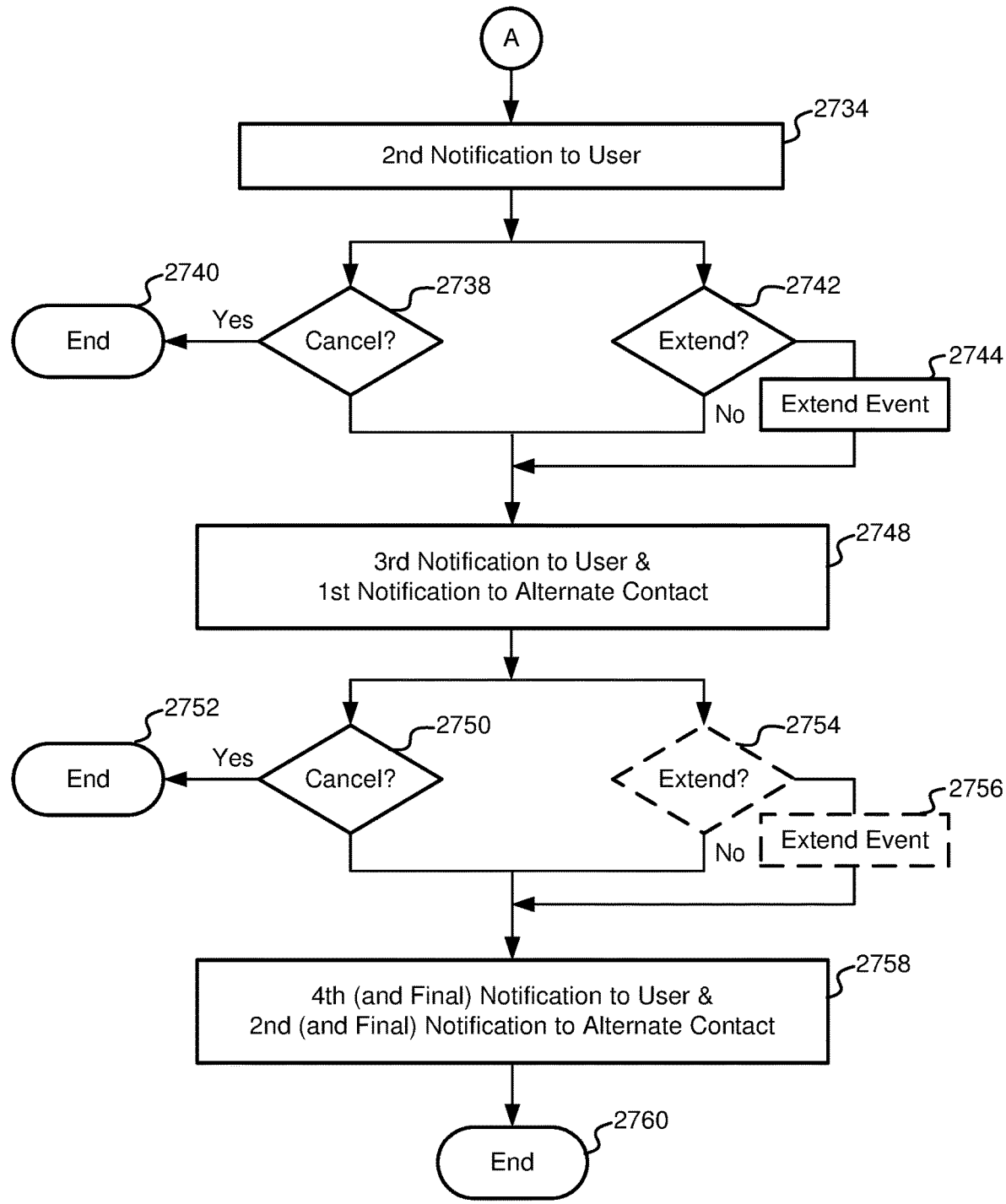

FIG. 27A and FIG. 27B together comprise a flow diagram illustrating an exemplary method 2700, operational at a user device or a server, for canceling, editing, and/or extending events in accordance with an embodiment of the present disclosure. The user device may be similar to the user devices such as the terminal 102, the wireless cellular phone 104 (e.g., a smart phone), or the personal digital assistant or tablet 106 of FIG. 1, or the devices (e.g., terminal 202, wireless cellular phone 204, personal digital assistant or tablet 206) of FIG. 2, and device 2000 of FIG. 20. The server may be similar to, for example, web server 112 of FIG. 1, web application server 213 of FIG. 2 and/or server 1800 of FIG. 18. The server may be configured as an event scheduling and notification system/function/module/device, such as, for example, the system 110 of FIG. 1. The user device may be communicatively coupled to the server via one or more communication networks, such as communication network(s) 134 of FIG. 1. A user, using the user device, may establish a user account with an event scheduling and notification system. For ease of reference, a server configured as an event scheduling and notification system and a user device acting as an input/output device communicatively coupled to the server may be collectively or individually referred to herein as the "event scheduling and notification system" or the "system." According to one aspect, a method of canceling, editing, and/or extending events may be provided as illustrated in the exemplary method 2700 of FIG. 27A and FIG. 27B.

According to one embodiment, once a user creates an event, the event may be edited up to some predetermined period of time (e.g., one minute) before the pending event becomes an active event. (If the pending event is deleted prior to becoming active, the process ends.) The definition of an active event is when the expected conclusion time occurs. Once the event becomes active, it may be extended up to some predetermined period of time (e.g., one minute) prior to the next to last notification is sent to the user and/or prior to the first notification is sent to the alternate contact (e.g., emergency contact). The event may be extended for a period of time either selected by the user or dictated by the system. In one embodiment, the event may be extended in increments of one, two, and four hours. The user may cancel an active event up to some predetermined period of time (e.g., one minute) before the final notifications are sent to the user and alternate contact communication address(es).

According to one embodiment, a pending event may be considered 2702. Concurrent determinations may be made as to whether the system should delete the event 2704 or edit the event 2708. If the system is directed (e.g., via a user input received by the system) to delete the event, the event may be deleted, and the method may end 2706. If, however, the system is directed (e.g., via a user input received by the system) to edit the event, the event may be edited 2710. If the system is directed (e.g., via a user input received by the system) to not delete the event and/or to not edit the event, and/or after the event is edited, the event may be considered for an event edit lockout 2712 (where the user or the system may prevent further edits to the event).

A pending event becomes an active event when the event expected conclusion time is reached 2714. Once the event first becomes active, a user may either cancel or extend the event up until some predetermined period of time prior to sending the first event notification to the user. Accordingly, concurrent determinations may be made as to whether the user cancels the event 2716 and/or extends the event 2720. If the system is directed (e.g., via a user input received by the system) to cancel the event, the event may be deleted and the method may end 2718. If, however, the system is directed (e.g., via a user input received by the system) to extend the event, the system extends the event 2720. If the system is directed (e.g., via a user input received by the system) to not cancel the event and/or to not extend the event, and/or after the event is extended, the first notification may be sent to the user 2724.

In the exemplary method of FIG. 27A and FIG. 27B, the exemplary notification sequence conditions are set as follows. A total of four notifications are sent to the user. Additionally, in the exemplary method of FIG. 27A and FIG. 27B, a first notification is sent to the alternate contact one notification prior to the last notification sent to the user. A user may pay an additional amount of money to have additional notifications with the first notification being sent to the alternate contact concurrently with the second notification being sent to the user.

The user may either cancel or extend the event up until some predetermined period of time prior to sending the next event notification to the user. Accordingly, concurrent determinations may be made as to whether the user cancels the event 2726 and/or extends the event 2730. If the system is directed (e.g., via a user input received by the system) to cancel the event, the event may be deleted, and the method may end 2728. If, however, the system is directed (e.g., via a user input received by the system) to extend the event, the event may be extended 2732. If the system is directed (e.g., via a user input received by the system) to not cancel the event and/or to not extend the event, and/or after the event is extended, the next notification may be sent to the user 2734. In the exemplary method 2700, this next notification is the second notification that is sent to the user 2734.

This sequence can be iterated in accordance with the state table established for the exemplary embodiment. For example, the user may either cancel or extend the event up until some predetermined period of time prior to sending the next event notification to the user. Accordingly, concurrent determinations may be made as to whether the user cancels the event 2738 and/or extends the event 2742. If the system is directed (e.g., via a user input received by the system) to cancel the event, the event may be deleted, and the method may end 2740. If, however, the system is directed (e.g., via a user input received by the system) to extend the event, the event may be extended 2744. If the system is directed (e.g., via a user input received by the system) to not cancel the event and/or to not extend the event, and/or after the event is extended, the next notification may be sent to the user. In the exemplary method 2700, this next notification is the third notification that is sent to the user 2748, and, a first notification is sent to the alternate contact concurrently with the third notification being sent to the user 2748.

Eventually a final notification will be sent to the user and the alternate contact. For example, the user may either cancel or extend the event up until some predetermined period of time prior to sending the next (and final) event notification to the user. A determination may be made as to whether the user cancels the event 2750 or optionally extends the event 2754. If the system is directed (e.g., via a user input received by the system) to cancel the event, the event may be deleted, and the method may end 2752. If, however, the system is directed (e.g., via a user input received by the system) to optionally extend the event, the event may be extended 2756. If the system is directed (e.g., via a user input received by the system) to not cancel the event and/or to not optionally extend the event, and/or after the event is optionally extended, the next (and final) notification may be sent to the user. In the exemplary method 2700, this next (and final) notification is the fourth notification that is sent to the user, and, a second (and final) notification is sent to the alternate contact concurrently with the fourth (and final) notification being sent to the user 2758. Thereafter, the method may end 2760.

Figure 28A:
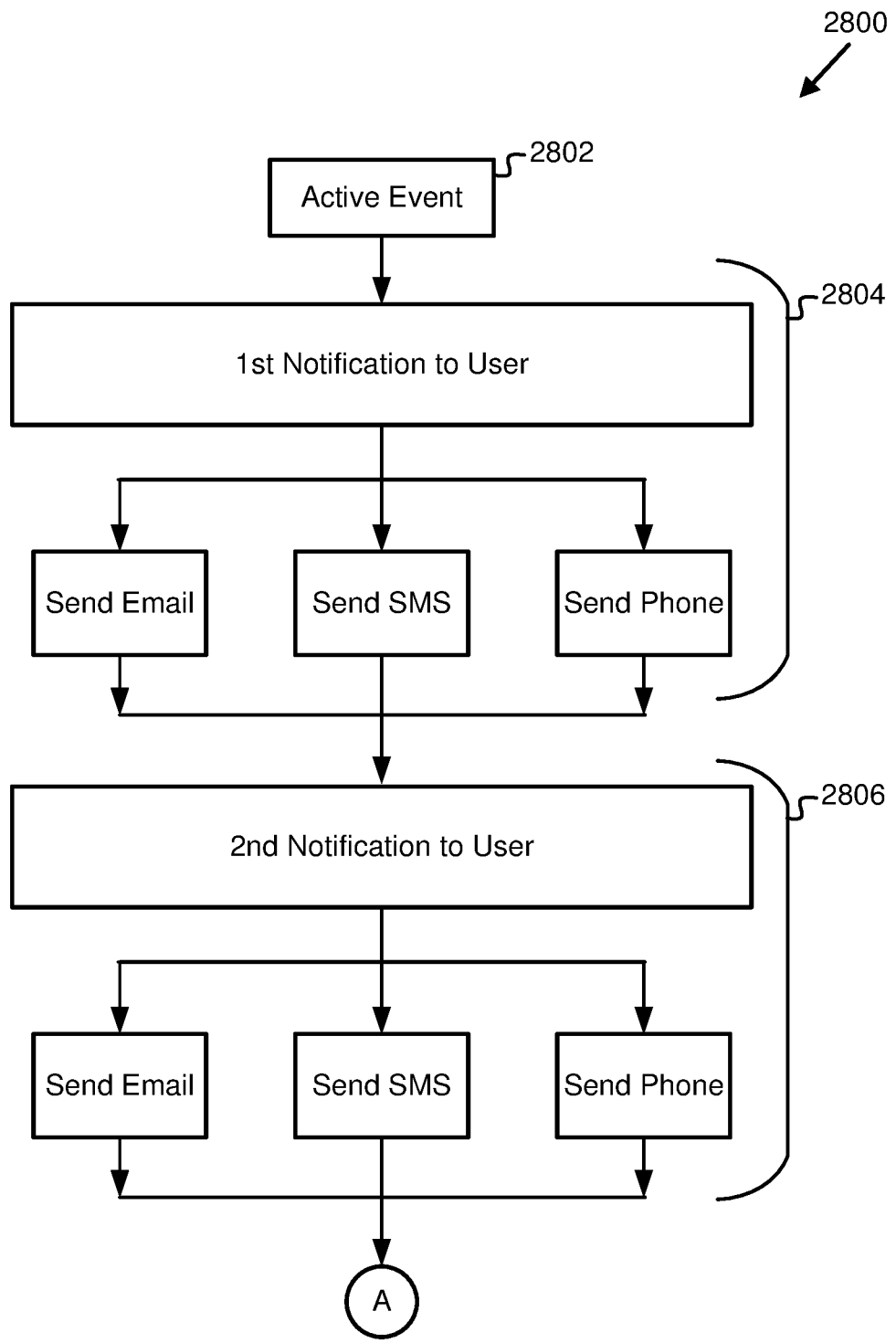
FIG. 28A and FIG. 28B together comprise a flow diagram illustrating an exemplary method, operational at a user device or a server, for a notification sequence (e.g., alert sequence) in accordance with an embodiment of the present disclosure.
Figure 28B:
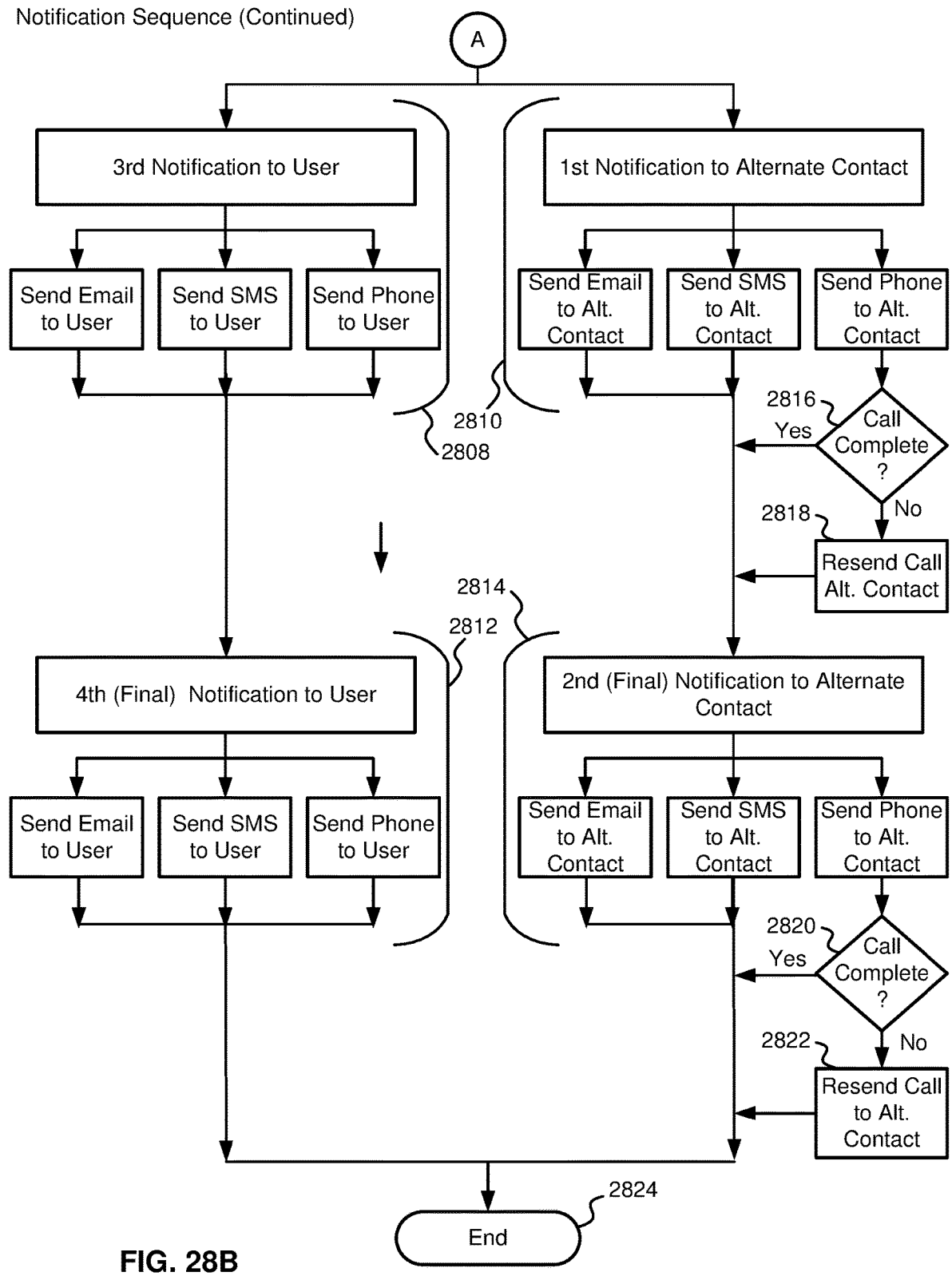

FIG. 28A and FIG. 28B together comprise a flow diagram illustrating an exemplary method 2800, operational at a user device or a server, for a notification sequence (e.g., alert sequence) in accordance with an embodiment of the present disclosure. The user device may be similar to the user devices such as the terminal 102, the wireless cellular phone 104 (e.g., a smart phone), or the personal digital assistant or tablet 106 of FIG. 1, or the devices (e.g., terminal 202, wireless cellular phone 204, personal digital assistant or tablet 206) of FIG. 2, and device 2000 of FIG. 20. The server may be similar to, for example, web server 112 of FIG. 1, web application server 213 of FIG. 2 and/or server 1800 of FIG. 18. The server may be configured as an event scheduling and notification system/function/module/device, such as, for example, the system 110 of FIG. 1. The user device may be communicatively coupled to the server via one or more communication networks, such as communication network(s) 134 of FIG. 1. A user, using the user device, may establish a user account with an event scheduling and notification system. For ease of reference, a server configured as an event scheduling and notification system and a user device acting as an input/output device communicatively coupled to the server may be collectively or individually referred to herein as the "event scheduling and notification system" or the "system." According to one aspect, a method of providing a notification sequence is illustrated in the exemplary method 2800 of FIG. 28A and FIG. 28B.

At predetermined intervals of time (e.g., every several minutes, every few minutes) the system (e.g., system application) generates a scheduled task to determine if and when to start a notification sequence. Once an event becomes active 2802, the system automatically sends a first notification to the user 2804. The system then automatically sends a second notification to the user 2806. Still further according to the exemplary sequence conditions established for the exemplary method 2800 the system automatically sends a third notification to the user 2808 concurrently with a first notification to the alternate contact 2810. As graphically depicted, services (e.g., outside services) are utilized to send email, text, and phone calls simultaneously. When a phone (voice account) is used to send a notification to the alternate contact, the system may determine if the call was completed 2816. If it is determined that the call was not completed, the call is resent to the alternate contact 2818. As depicted, the determination of whether the call was completed 2820 and resending the call to the alternate contact if the call was not completed 2822 may be repeated in the second (and final) notification sent to alternate contact 2814. In the exemplary method 2800, the user receives up to twelve alert notifications (four each of three methods of communication). In the exemplary method 2800, the alternate contact (e.g., emergency contact) receives up to eight notifications (two each of three methods of communication plus two additional phone calls if necessary). Once the final notifications are sent to the user and the alternate contact, the method may end 2824.

Figure 29:
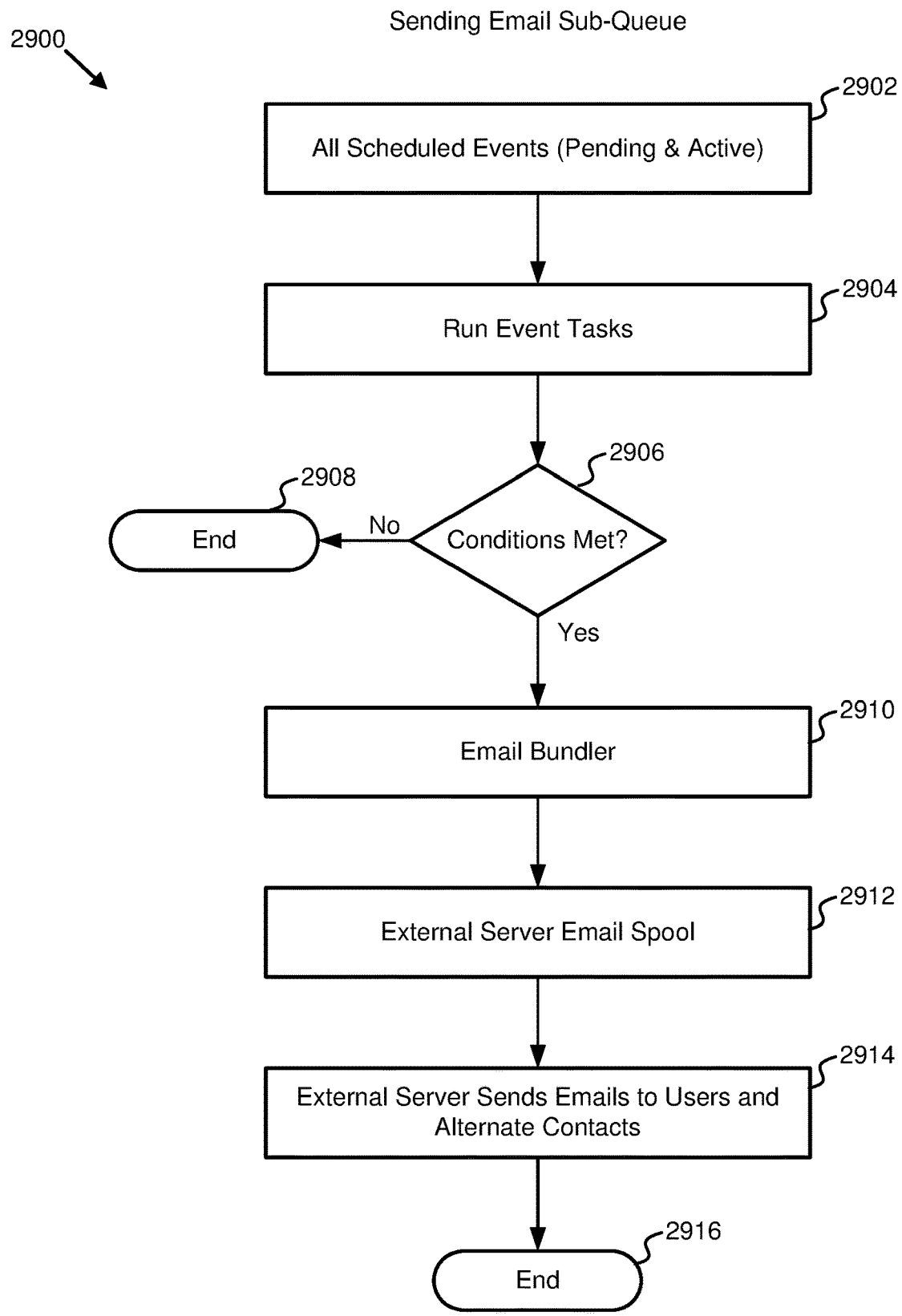
FIG. 29 is a flow diagram illustrating an exemplary method, operational at a server, for sending email in accordance with an embodiment of the present disclosure.
Figure 30:
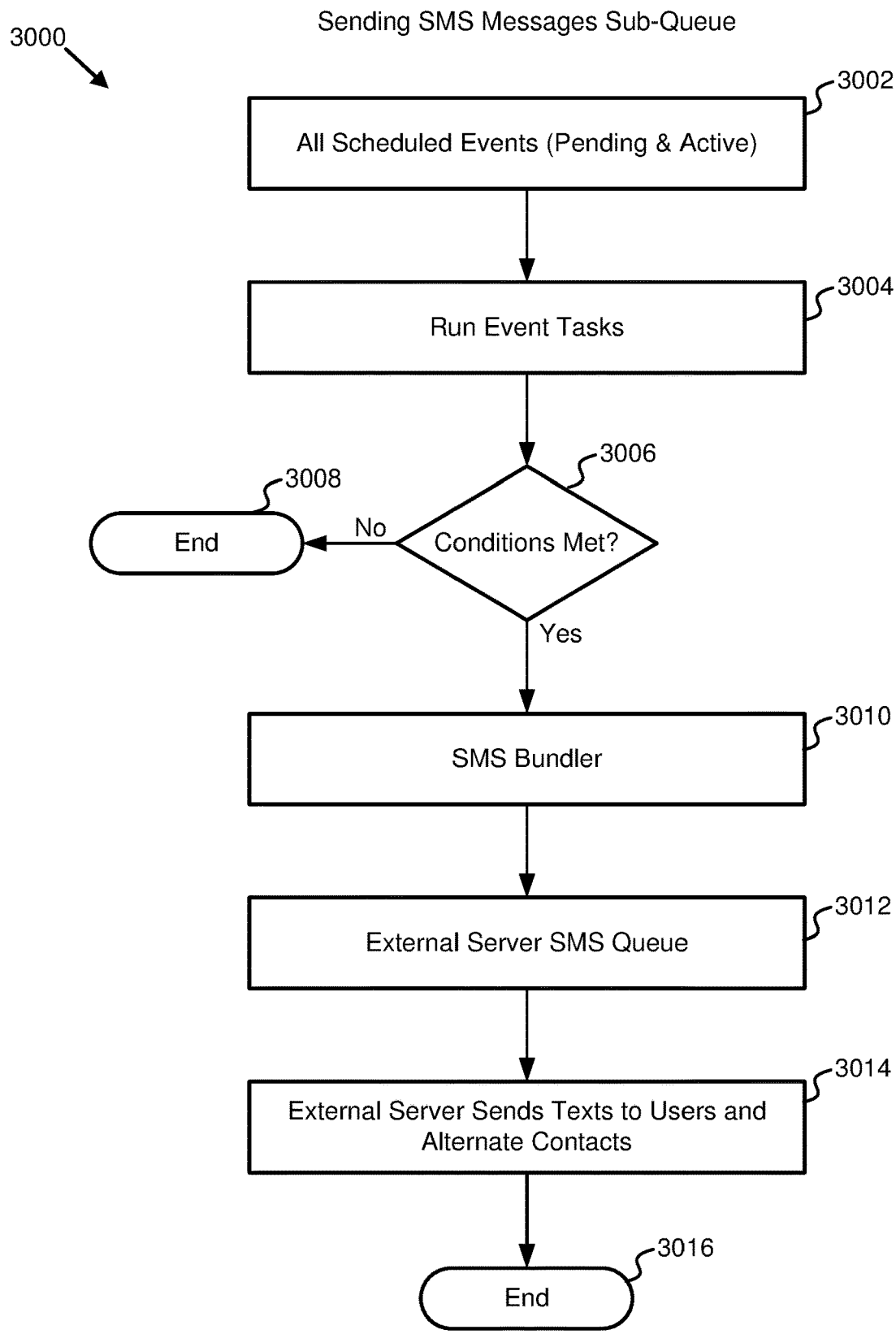
FIG. 30 is a flow diagram illustrating an exemplary method, operational at a server, for sending an SMS message in accordance with an embodiment of the present disclosure.
Figure 31A:
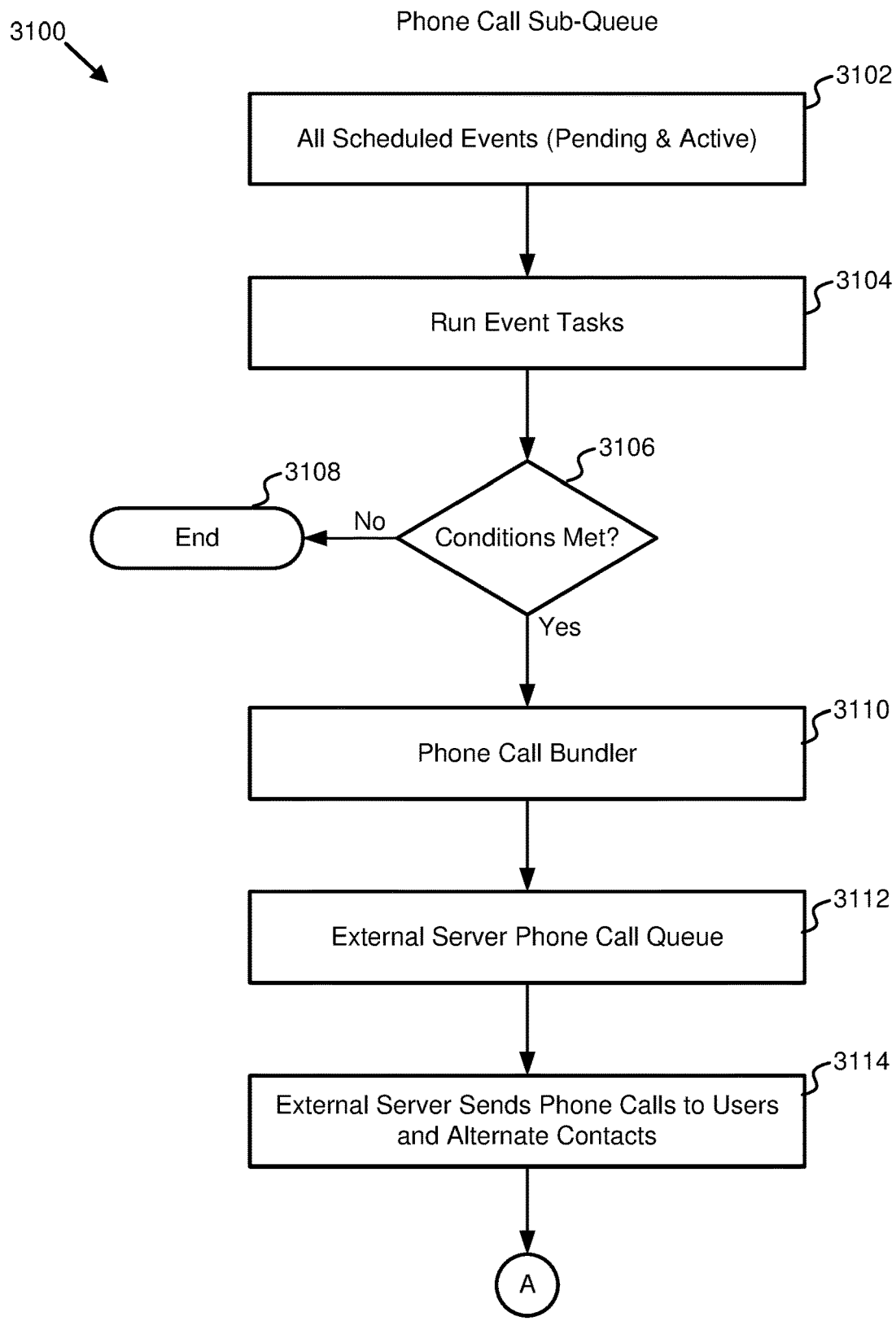
FIG. 31A and FIG. 31B together comprise a flow diagram, operational at a server, for sending a phone call in accordance with an embodiment of the present disclosure.
Figure 31B:
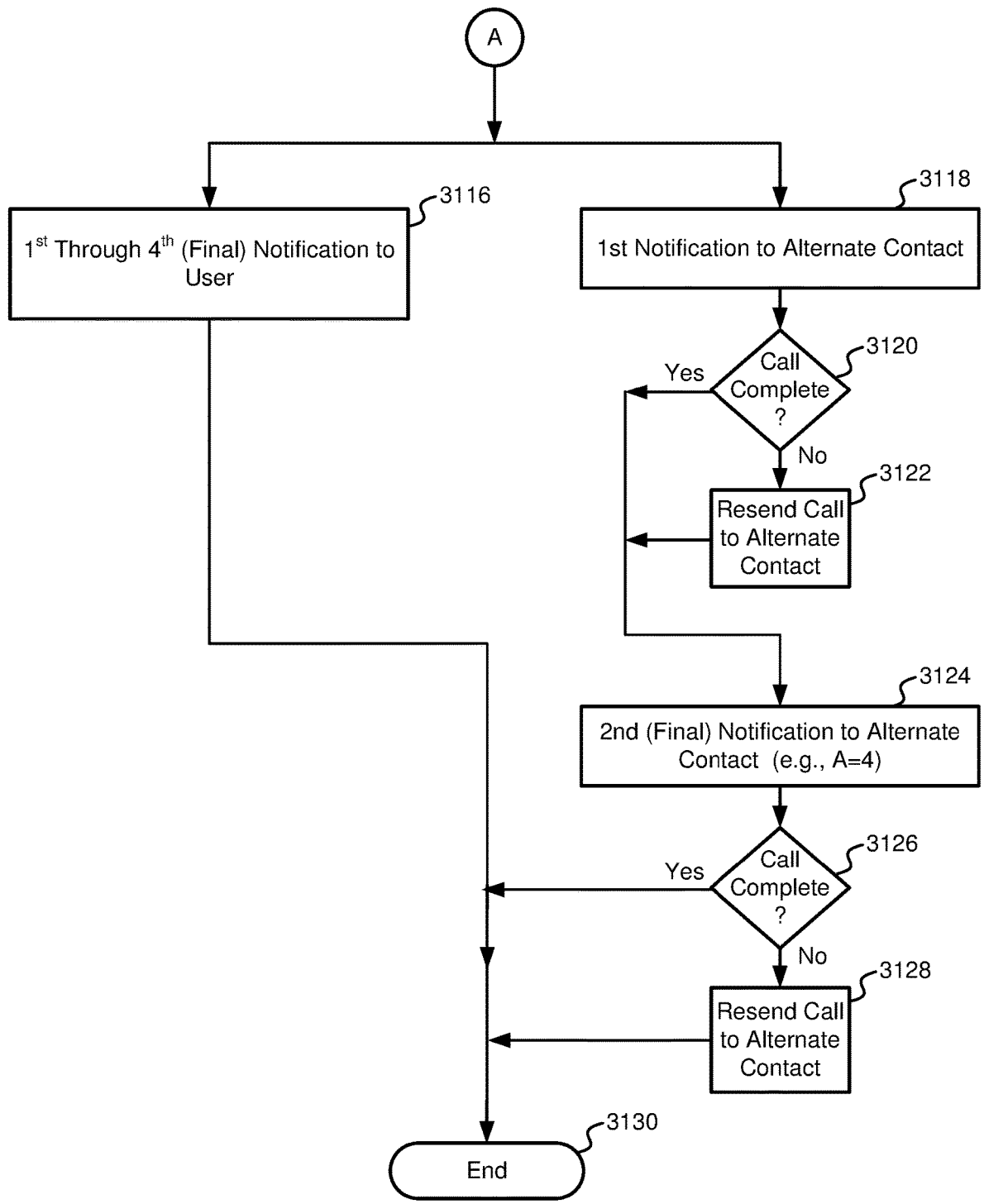

FIG. 29 is a flow diagram illustrating an exemplary method 2900, operational at a server, for sending email in accordance with an embodiment of the present disclosure. FIG. 30 is a flow diagram illustrating an exemplary method 3000, operational at a server, for sending an SMS message in accordance with an embodiment of the present disclosure. FIG. 31A and FIG. 31B together comprise a flow diagram, operational at a server, for sending a phone call in accordance with an embodiment of the present disclosure. FIGS. 29, 30, 31A, and 31B each relate to methods of sending notifications to the user and/or the alternate contact and share some similar features. The user device may be similar to the user devices such as the terminal 102, the wireless cellular phone 104 (e.g., a smart phone), the personal digital assistant or tablet 106 and the wired phone 108 of FIG. 1, or the devices (e.g., terminal 202, wireless cellular phone 204, personal digital assistant or tablet 206) of FIG. 2, and device 2000 of FIG. 20. The server may be similar to, for example, web server 112 of FIG. 1, web application server 213 of FIG. 2 and/or server 1800 of FIG. 18. The server may be configured as an event scheduling and notification system/function/module/device, such as, for example, the system 110 of FIG. 1. The user device may be communicatively coupled to the server via one or more communication networks, such as communication network(s) 134 of FIG. 1. A user, using the user device, may establish a user account with an event scheduling and notification system. For ease of reference, a server configured as an event scheduling and notification system and a user device acting as an input/output device communicatively coupled to the server may be collectively or individually referred to herein as the "event scheduling and notification system" or the "system."

According to one embodiment, for notifications to the alternate contact, an email bundler 2910, FIG. 29, an SMS bundler 3010, FIG. 30, or a phone call bundler 3110, FIG. 31A, operating in the system may insert information, such as, for example, the user's name and hours elapsed since the event expected conclusion time, into the notifications. According to one embodiment, the email and text bundlers insert a printed version of the user's name into these notification messages along with the hours elapsed since the expected conclusion time (e.g., expected return time). The phone bundler inserts the text-to-speech version of the user's name plus the hours elapsed since the expected return time into the phone messages. In the exemplary notification sequence, the phone bundler does this a total of three times into one phone message, as the phone message is repeated twice to compensate for any answering device truncating the initial part of the phone message. According to one embodiment, once the notifications are assembled and bundled, they are pushed to external services, such as, for example, email service 124, SMS service 126, text-to-speech service 128, and phone service 130 of FIG. 1 and/or email service 224, SMS service 226, text-to-speech service 228, and phone service 230 of FIG. 2. These services may run on or be hosted by one or more servers.

According to one embodiment, the phone calls to the alternate contact(s) are monitored by the system to determine if the calls are completed (meaning the call has been answered by a person or a machine). If the status of the phone call to the alternate contact is incomplete, a second phone call to the alternate contact is generated. That is, the phone call or message has not been received, answered or picked up by a person or a device. This process of monitoring and calling may occur with all, or fewer than all, notifications sent to an alternate contact.

An exemplary method 2900 of sending email, according to one exemplary embodiment includes making all scheduled events (pending and active) available for system evaluation(s) 2902. Event tasks may be executed 2904. A determination of whether certain conditions are met may be made for each event 2906 by the system. If the certain conditions are not met for a given event, the method may end 2908 for the given event. However, if the certain conditions are met for a given event, the information for an email may be sent to an email bundler 2910. The email bundler may send the compiled email to an external server email spool 2912. The external server may then send emails to users and alternate contacts 2914. Thereafter the method may end 2916.

An exemplary method 3000 of sending SMS messages, according to one exemplary embodiment includes making all scheduled events (pending and active) available for system evaluation(s) 3002. Event tasks may be executed 3004. A determination of whether certain conditions are met may be made for each event 3006 by the system. If the certain conditions are not met for a given event, the method may end 3008 for the given event. However, if the certain conditions are met for a given event, the information for an SMS message may be sent to an SMS bundler 3010. The SMS bundler may send the compiled SMS message to an external server SMS queue 3012. The external server may then send SMS messages to users and alternate contacts 3014. Thereafter the method may end 3016.

An exemplary method 3100 of sending voice messages by phone, according to one exemplary embodiment includes making all scheduled events (pending and active) available for system evaluation(s) 3102. Event tasks may be executed 3104. A determination of whether certain conditions are met may be made for each event 3106 by the system. If the certain conditions are not met for a given event, the method may end 3108 for the given event. However, if the certain conditions are met for a given event, the information for a voice message may be sent to a phone call bundler 3110. The phone call bundler may send the compiled voice message to an external server phone call queue 3112. The external server may then send phone calls to users and alternate contacts 3114.

According to one embodiment, all phone calls to users may be sent without further consideration 3116. Thereafter the method may end 3130 for the phone call notification to users. However, phone call notifications to alternate contacts may, as shown in the exemplary method of FIG. 31B, undergo further consideration. For example, a first phone call notification may be sent to an alternate contact 3118. A determination may be made as to whether the phone call was completed 3120. If the phone call was not completed, the phone call may be resent to the alternate contact 3122. If the phone call was completed, or the phone call was sent to the alternate contact, a second (final) phone call notification may be sent to the alternate contact 3124. A determination may be made as to whether the phone call was completed 3126. If the phone call was not completed, the phone call may be resent to the alternate contact 3128. Thereafter, if the phone call was completed, or the phone call was sent to the alternate contact, the method may end 3130. In other embodiments, additional notifications to the alternate contacts may include notification methods in addition to phone calls An illustrative and non-limiting example of the complete process according to one embodiment follows:

A user schedules an event with an expected return time of 6:00 p.m. At 7 p.m. if the user has not cancelled or extended the event, notification messages (e.g., alert messages) may be automatically sent to the user via email, text, and/or phone (whichever methods have been selected by the user) reminding the user to cancel or extend the event. At 8 p.m., if the user has not cancelled or extended the event, secondary notifications may be sent reminding the user to cancel or extend the event. At 9 p.m., if the user has not cancelled or extended the event, notifications are sent to the user's alternate contact(s) (e.g., emergency contact(s)) as well as a third set of notifications being sent to the user. The notifications to the alternate contact(s) via email, text, and/or phone include the user's name and state that the user was supposed to return home 3 hours ago from a scheduled event. If the alternate contact phone was busy and thus unable to receive this notification (which is an important phone call to receive), the system captures the non-receipt of the notification message and automatically triggers another phone call notification to the alternate contact in approximately 15 minutes. This phone call notification, like the last, may include the user's name and states that he/she was supposed to be home 3½ hours ago. At 10 p.m., if the user has not cancelled the event, final notifications are sent to the emergency contact(s) with a final set of notifications also being sent to the user. Again, if the alternate contact phone was busy and thus unable to receive this phone call notification, the system captures the non-receipt of the notification message and may automatically trigger another phone call to the alternate contact in approximately 15 minutes.

According to some exemplary embodiments, a set of notifications may, for example, ask the alternate contact(s) to look after the user's pet(s); however, the notifications can be customized to recite different messages (e.g., pertaining to picking up children from school, looking after a loved one/elderly parent/friend/neighbor, searching for the user after a hike/date/traveling, etc.). Also, the example above is in hourly increments. However, the system may be set to any increments of time. For example, the system may be set with increments of time ranging from 10 to 60 minutes.

Once a user sets an event, the system does not rely on software installed on the user's devices; it functions separately from his/her devices. For example, if the customer's phone is damaged or lost in a car accident, the notifications will automatically be sent. Devices, such as smart phones, may not be required by the users or alternate contacts; however, they allow for easier remote accessibility of emails and SMS (text) messages.

For security reasons, in accordance with one example, a user's physical address is not required or used. User profiles, contacts and events are stored on remote secure servers and accessed by the system as needed. Also, by way of example, any time the user leaves the contacts and events page (see, for example, FIG. 25A and FIG. 25B) or closes his/her Internet browser, he/she is automatically logged out of the account. This is so confidential information about being away from home at specific times is protected.

IV. Conclusion

In general, embodiments disclosed herein include a system and method for scheduling multiple events and sending automated multiple notifications (e.g., alert notifications) via multiple methods to multiple recipients. Any device with access to the Internet may be used to access the system(s) disclosed herein and to utilize the capabilities of the system(s). A user may provide information to be stored in a user profile. This information may include the user's time zone and preferred methods for being contacted, including email, text, and phone. The user also creates alternate contact(s) (e.g., emergency contact(s)), their preferred methods of receiving notifications, and schedules events. The system monitors the scheduled events and determines when notifications are to be sent, accesses and inserts information into the notification messages, and provides for the transmission of the notification messages. When the user neglects to cancel the scheduled event, the system automatically sends notifications to the user and predesignated alternate contact(s).

The following is a list of examples of benefits that may be achieved through use of an event scheduling and notification system such as that disclosed in the embodiments described herein:

In one example, the system utilizes the Internet, a web server service, application scripting and server, responsive web pages, and five separate outside services (four of which utilize RESTFUL Web API technology) to function.

In one example, the system utilizes a third-party text-to-speech API to generate the subscriber's name.

In one example, every time the user updates his/her name and saves the updated profile, another text-to-speech version of his/her name is created.

In one example, the system allows the purchase of a membership from any new email address that has not been previously associated with an active, banished, cancelled, or expired account.

In one example, a system administrator may banish a user from purchasing an account if the system has been used in an inappropriate manner as outlined in a set of terms and conditions provided at the outset of the establishment of an account with a user.

In one example, the system updates the user's account and retains previously scheduled events when the user renews the subscription and the order is saved.

In one example, the system allows the user to renew his/her account from a profile page when a renewal button is active (for example, within 30 days of expiration). In another example, the system allows the user to renew his/her account at any time.

In one example, the system can reinstate a user's previously-created events once the cancelled or expired user account/subscription has been renewed and the order is saved.

In one example, the system provides for at least one alternate contact (e.g., emergency contact) to be created before allowing the user to schedule events.

In one example, the system can schedule events in a different time zone from the customer's home time zone.

In one example, the system allows the user to select which methods of notifications to be used for the user and the alternate contact(s). This selection may be updated at any time other than during an active event sequence.

In one example, the system can schedule multiple events per user as long as the event time spans do not overlap. According to some embodiments, only one event may be active at a time.

In one example, the system may schedule events that are either one-time events or recurring events (e.g., daily, weekly, or monthly).

In one example, the system allows events to be edited up to some predetermined time (e.g., one minute) before the event starts.

In one example, the system allows events to be extended up to some predetermined time (e.g., one minute) prior to when a next-to-last notification to the user (e.g., the third notification in the exemplary embodiments illustrate herein) and first notification to the alternate contact(s) (which, using the exemplary embodiments illustrated herein, is concurrent with the third notification set to the user) are scheduled to be sent. However, the examples described herein are for illustration and are non-limiting. In some embodiments, for example, the system may allow events to be extended up to some predetermined time prior to when a last notification is sent to the user and/or the alternate contact.

In one example, the system allows events to be cancelled up to some predetermined time (e.g., one minute) prior to the final notifications to the user and alternate contact(s) are scheduled to be sent.

In one example, the system sends notification messages (e.g., alert messages) via email, text, and/or phone utilizing internal or external services.

In one example, the system sends notifications to the user and emergency contact(s) simultaneously or nearly simultaneously.

In one example, the system's email, SMS, and phone call bundlers may automatically insert the user's name into the notifications to the alternate contact(s) or to both the user and alternate contact(s).

In one example, the system's email, SMS, and phone call bundlers may automatically insert the duration of time that has elapsed from the event expected conclusion time (e.g., return time) into the notifications to the alternate contact(s) or to both the user and alternate contact(s).

In one example, the system may determine if a voice phone call to an alternate contact was incomplete, triggering back-up phone calls to the alternate contact. That is, the phone call or message has not been received, answered or picked up by a person or a device.

In one example, the system may customize the timing of scheduled notifications. Customization may be made by the system internal to the system, by the user, or by the user and the system. The granularity of the notifications can have some predetermined range. For example, the granularity of the notifications can range from every 10 minutes to 60 minutes. Other ranges of granularity are within the scope of embodiments described herein.

In one example, the system may customize the content of the notifications. Customization may be made by the system internal to the system, by the user, or by the user and the system.

The various concepts presented throughout this disclosure may be implemented across a broad variety of systems, networks, and architectures. Components are shown in block diagram form in order to avoid obscuring such concepts.

Several aspects of an event scheduling and notification system have been presented with reference to exemplary implementations. As those skilled in the art will readily appreciate, various aspects described throughout this disclosure may be extended to other systems and network architectures.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage, or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure. The terms "at least one" and "one or more" may be used interchangeably herein.

Within the present disclosure, use of the construct "A and/or B" may mean "A or B or A and B" and may alternatively be expressed as "A, B, or a combination thereof" or "A, B, or both". Within the present disclosure, use of the construct "A, B, and/or C" may mean "A or B or C, or any combination thereof" and may alternatively be expressed as "A, B, C, or any combination thereof".

One or more of the components, steps, features and/or functions illustrated in FIGS. 1, 2, 3, and 6 may be rearranged and/or combined into a single component, step, feature, or function or embodied in several components, steps, or functions. Additional elements, components, steps, and/or functions may also be added without departing from novel features disclosed herein. The apparatus, devices, and/or components illustrated in FIGS. 1, 2, 3, and 6 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of:" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of event scheduling and notification, operational at a server, comprising:
   determining that a prescheduled event is concluded;
   sending a first notification message to one or more user communication addresses associated with the prescheduled event;
   determining if a first acknowledgement to the first notification message is received before a first predetermined period of time elapses;
   sending a second notification message to the one or more user communication addresses if the first acknowledgement is not received by expiration of the first predetermined period of time;
   obtaining user notification criteria associated with the one or more user communication addresses;
   sending the first notification message and the second notification message in accordance with the user notification criteria;
   obtaining event details to associate with the prescheduled event, including at least an event identifier, an event expected conclusion date, an event expected conclusion time, and an event time zone; and
   determining that the prescheduled event is concluded based on at least the event expected conclusion date, the event expected conclusion time, and the event time zone.

2. The method of claim 1, further comprising:
   storing the one or more user communication addresses as at least one of:
      a first telephone number associated with an audible voice telephone account,
      a second telephone number associated with a short message service (SMS) account, or
      an email address associated with an email account.

3. The method of claim 1, further comprising:
   identifying the prescheduled event as a single event, having one event expected conclusion date and associated event expected conclusion time, or as a recurring event, having a series of conclusion dates and associated conclusion times;
   storing, if the event is the single event, the one event expected conclusion date and associated event expected conclusion time as an expected conclusion date and expected conclusion time of a first event; and
   storing, if the event is the recurring event, an earliest one of the series of conclusion dates and associated conclusion times as the expected conclusion date and expected conclusion time of the first event, creating a respective additional event for each respective subsequent conclusion date and associated conclusion time in the series of conclusion dates and associated conclusion times, storing each respective subsequent conclusion date and associated conclusion time in association with each respective additional event; and at least one of:

determining that the prescheduled event is concluded based on the expected conclusion date and expected conclusion time of the first event, or determining that the respective additional event is concluded based on the respective subsequent conclusion date and associated conclusion time of the respective additional event.

4. The method of claim 1, further comprising:
determining if a second acknowledgment to the second notification message is received before a second predetermined period of time elapses; and
sending, if the second acknowledgement is not received by expiration of the second predetermined period of time, a third notification message to the one or more user communication addresses and a first alternate contact notification message to one or more alternate contact communication addresses.

5. The method of claim 4, further comprising:
storing the one or more alternate contact communication addresses as at least one of:
a first telephone number associated with an audible voice telephone account,
a second telephone number associated with a short message service (SMS) account, or
an email address associated with an email account.

6. The method of claim 4, further comprising:
obtaining user notification criteria associated with the one or more user communication addresses;
obtaining alternate contact notification criteria associated with the one or more alternate contact communication addresses;
sending the first notification message and the second notification message in accordance with the user notification criteria; and
sending the first alternate contact notification message to the one or more alternate contact notification addresses in accordance with the alternate contact notification criteria.

7. The method of claim 4, further comprising:
determining if a third acknowledgment to the third notification message is received before a third predetermined period of time elapses; and
sending, if the third acknowledgment is not received by expiration of the third predetermined period of time, a first final notification message to the one or more user communication addresses and a second final notification message to the one or more alternate contact communication addresses.

8. The method of claim 7, wherein content in the first notification message, the second notification message, the third notification message, the first alternate contact notification message, the first final notification message and the second final notification message are all different.

9. The method of claim 7, further comprising:
sending the first final notification message and the second final notification message concurrently.

10. The method of claim 7, further comprising:
sending the second final notification message to a telephone number associated with an audible voice telephone account a first time;

determining that a connection to the telephone number was incomplete; and
sending the second final notification message to the telephone number associated with the audible voice telephone account a second time.

11. An event scheduling and notification apparatus, comprising:
an input-output device;
a memory; and
a processor communicatively coupled to the input-output device and the memory, wherein the processor and the memory are configured to:
determine that a prescheduled event is concluded;
send a first notification message to one or more user communication addresses associated with the prescheduled event;
determine if a first acknowledgement to the first notification message is received before a first predetermined period of time elapses;
send a second notification message to the one or more user communication addresses if the first acknowledgement is not received by expiration of the first predetermined period of time;
obtain user notification criteria associated with the one or more user communication addresses;
send the first notification message and the second notification message in accordance with the user notification criteria;
obtain event details to associate with the prescheduled event, including at least an event identifier, an event expected conclusion date, an event expected conclusion time, and an event time zone; and
determine that the prescheduled event is concluded based on at least the event expected conclusion date, the event expected conclusion time, and the event time zone.

12. The event scheduling and notification apparatus of claim 11, wherein the processor and the memory are further configured to:
store the one or more user communication addresses as at least one of:
a first telephone number associated with an audible voice telephone account,
a second telephone number associated with a short message service (SMS) account, or
an email address associated with an email account.

13. The event scheduling and notification apparatus of claim 11, wherein the processor and the memory are further configured to:
identify the prescheduled event as a single event, having one event expected conclusion date and associated event expected conclusion time, or as a recurring event, having a series of conclusion dates and associated conclusion times;
store, if the event is the single event, the one event expected conclusion date and associated event expected conclusion time as an expected conclusion date and expected conclusion time of a first event; and
store, if the event is the recurring event, an earliest one of the series of conclusion dates and associated conclusion times as the expected conclusion date and expected conclusion time of the first event,
create a respective additional event for each respective subsequent conclusion date and associated conclusion time in the series of conclusion dates and associated conclusion times, store each respective subsequent conclusion date and associated conclusion time in association with each respective additional event; and at least one of:

determine that the prescheduled event is concluded based on the expected conclusion date and expected conclusion time of the first event, or determine that the respective additional event is concluded based on the respective subsequent conclusion date and associated conclusion time of the respective additional event.

14. The event scheduling and notification apparatus of claim 11, wherein the processor and the memory are further configured to:

determine if a second acknowledgment to the second notification message is received before a second predetermined period of time elapses; and send, if the second acknowledgement is not received by expiration of the second predetermined period of time, a third notification message to the one or more user communication addresses and a first alternate contact notification message to one or more alternate contact communication addresses.

15. The event scheduling and notification apparatus of claim 14, wherein the processor and the memory are further configured to:

store the one or more alternate contact communication addresses as at least one of:

a first telephone number associated with an audible voice telephone account, a second telephone number associated with a short message service (SMS) account, or an email address associated with an email account.

16. The event scheduling and notification apparatus of claim 14, wherein the processor and the memory are further configured to:

obtain user notification criteria associated with the one or more user communication addresses;

obtain alternate contact notification criteria associated with the one or more alternate contact communication addresses;

send the first notification message and the second notification message in accordance with the user notification criteria; and send the first alternate contact notification message to the one or more alternate contact notification addresses in accordance with the alternate contact notification criteria.

17. The event scheduling and notification apparatus of claim 14, wherein the processor and the memory are further configured to:

determine if a third acknowledgment to the third notification message is received before a third predetermined period of time elapses; and send, if the third acknowledgment is not received by expiration of the third predetermined period of time, a first final notification message to the one or more user communication addresses and a second final notification message to the one or more alternate contact communication addresses.

18. The event scheduling and notification apparatus of claim 17, wherein content in the first notification message, the second notification message, the third notification message, the first alternate contact notification message, the first final notification message and the second final notification message are all different.

19. The event scheduling and notification apparatus of claim 17, wherein the processor and the memory are further configured to:

send the first final notification message and the second final notification message concurrently.

20. The event scheduling and notification apparatus of claim 17, wherein the processor and the memory are further configured to:

send the second final notification message to a telephone number associated with an audible voice telephone account a first time;

determine that a connection to the telephone number was incomplete; and send the second final notification message to the telephone number associated with the audible voice telephone account a second time.

\* \* \* \* \*